(12) United States Patent
Tokui et al.

(10) Patent No.: US 11,521,070 B2
(45) Date of Patent: Dec. 6, 2022

(54) INFORMATION PROCESSING DEVICE AND INFORMATION PROCESSING METHOD

(71) Applicant: Preferred Networks, Inc., Tokyo (JP)

(72) Inventors: Seiya Tokui, Tokyo (JP); Yuya Unno, Tokyo (JP); Kenta Oono, Tokyo (JP); Ryosuke Okuta, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 1162 days.

(21) Appl. No.: 15/771,979

(22) PCT Filed: Sep. 2, 2016

(86) PCT No.: PCT/JP2016/004027
§ 371 (c)(1),
(2) Date: Apr. 27, 2018

(87) PCT Pub. No.: WO2017/073000
PCT Pub. Date: May 4, 2017

(65) Prior Publication Data
US 2018/0349772 A1 Dec. 6, 2018

(30) Foreign Application Priority Data
Oct. 29, 2015 (JP) .............................. JP2015-213293

(51) Int. Cl.
*G06N 3/08* (2006.01)
*G06N 3/10* (2006.01)
(Continued)

(52) U.S. Cl.
CPC ............. *G06N 3/084* (2013.01); *G06F 8/311* (2013.01); *G06N 3/0445* (2013.01); *G06N 3/082* (2013.01); *G06N 3/105* (2013.01)

(58) Field of Classification Search
CPC ...... G06N 3/0445; G06N 3/105; G06N 3/084; G06N 3/082; G06N 3/08; G06N 3/0472;
(Continued)

(56) References Cited

U.S. PATENT DOCUMENTS 5,621,862 A 4/1997 Nakahira et al.
10,221,671 B1 * 3/2019 Zhang .................... G06N 3/084
(Continued)

FOREIGN PATENT DOCUMENTS

JP H03-237557 A 10/1991
JP H06-89171 A 3/1994
(Continued)

OTHER PUBLICATIONS

Seiya Tokui et al., "The framework Chainer of Deep Learning was exhibited," (Jun. 9, 2015) Available online, URL: http://research.preferred.jp/2015/06/deep-learning-chainer.
(Continued)

*Primary Examiner* — Mouloucoulaye Inoussa
(74) *Attorney, Agent, or Firm* — Foley & Lardner LLP

(57) ABSTRACT

There is provided an information processing device which efficiently executes machine learning. The information processing device according to one embodiment includes: an obtaining unit which obtains a source code including a code which defines Forward processing of each layer constituting a neural network; a storage unit which stores an association relationship between each Forward processing and Backward processing associated with each Forward processing; and an executing unit which successively executes each code included in the source code, and which calculates an output value of the Forward processing defined by the code based on an input value at a time of execution of each code, and generates a reference structure for Backward processing
(Continued)

in a layer associated with the code based on the association relationship stored in the storage unit.

26 Claims, 33 Drawing Sheets

(51) Int. Cl.
  *G06N 3/04* (2006.01)
  *G06F 8/30* (2018.01)
(58) Field of Classification Search
  CPC .... G06N 3/0635; G06N 3/0454; G06N 3/063; G06F 8/311; G06F 9/45558; G06F 8/31; G06F 9/44505; G06F 9/45541; H04L 67/1095; H04N 19/119; H04N 19/176; H04N 19/593; H04N 19/117; H04N 19/105; H04N 19/50; H04N 19/184; G06T 9/002; G16Z 99/00; G16H 50/20; C12Q 1/6883; G01N 33/54373; G01N 33/6893
  USPC ..................................... 706/31, 25; 709/220
  See application file for complete search history.

(56) References Cited

U.S. PATENT DOCUMENTS

| | | | | |
|---|---|---|---|---|
| 2003/0191728 | A1* | 10/2003 | Kulkarni | G06N 3/086 706/21 |
| 2007/0288407 | A1* | 12/2007 | Nishimoto | G06N 3/08 706/16 |
| 2008/0319933 | A1* | 12/2008 | Moussa | G06N 3/084 706/31 |
| 2009/0113049 | A1* | 4/2009 | Nasle | G05B 19/0428 709/224 |
| 2011/0202639 | A1* | 8/2011 | Suzuki | G06N 3/08 709/220 |
| 2012/0078436 | A1* | 3/2012 | Patel | H02J 3/06 700/298 |
| 2013/0122819 | A1 | 5/2013 | Vuyyuru et al. | |
| 2013/0218821 | A1 | 8/2013 | Szatmary et al. | |
| 2014/0142929 | A1* | 5/2014 | Seide | G06N 3/08 704/202 |
| 2014/0257803 | A1* | 9/2014 | Yu | G10L 15/16 704/232 |
| 2014/0365195 | A1* | 12/2014 | Lahiri | G06N 3/02 703/12 |
| 2015/0324690 | A1* | 11/2015 | Chilimbi | G06N 3/08 706/25 |
| 2016/0321777 | A1* | 11/2016 | Jin | G06N 3/0454 |
| 2016/0328643 | A1* | 11/2016 | Liu | G06N 3/084 |
| 2016/0379115 | A1* | 12/2016 | Burger | G06N 3/08 706/25 |
| 2017/0061281 | A1* | 3/2017 | Gokmen | G06N 3/084 |
| 2017/0109628 | A1* | 4/2017 | Gokmen | G06N 3/0472 |
| 2018/0039881 | A1* | 2/2018 | Frank | G06N 3/0635 |
| 2018/0039883 | A1* | 2/2018 | Kurata | G10L 15/16 |
| 2018/0046916 | A1* | 2/2018 | Dally | G06N 3/063 |
| 2019/0378018 | A1 | 12/2019 | Tokui et al. | |

FOREIGN PATENT DOCUMENTS

| | | |
|---|---|---|
| JP | H07-044515 A | 2/1995 |
| JP | 2012-208843 A | 10/2012 |
| JP | 2013-106343 A | 5/2013 |
| JP | 2018-173672 A | 11/2018 |
| WO | WO-2010/047388 A1 | 4/2010 |
| WO | WO-2017/038104 A1 | 3/2017 |

OTHER PUBLICATIONS

Chainer / chainer, Available online, URL: https://github.com/pfnet/chainer (accessed on Mar. 27, 2020).

"Chainer—A flexible framework of neural networks," Available online, URL: http://docs.chainer.org/ (accessed on Mar. 27, 2020).
"Chainer—A flexible framework of neural networks," Available online, URL: https://web.archive.org/web/20150613031224/http://docs.chainer.org/en/latest/ (archived on Jun. 13, 2015).
International Search Report dated Oct. 18, 2016 in International Application No. PCT/JP2016/004028 (WO2017/038104).
Written Opinion dated Oct. 18, 2016 in International Application No. PCT/JP2016/004028 (WO2017/038104).
Nicholas Leonard "Torch7: Applied Deep Learning for Vision and Natural Language," Element Inc. (dated Oct. 8, 2015) Available online, URL: http://on-demand.gputechconf.com/gtc/2015/webinar/torch7-applied-deep-learning-for-vision-natural-language.mp4.
Torch7 Scientific computing for Lua (JIT), Available online, URL: https://github.com/soumith/cvpr2015/blob/master/cvpr-torch.pdf (committed on Jun. 7, 2015).
Ronan Collobert et al., Torch: A Modular Machine Learning Software Library, IDIAP Research Report (Oct. 30, 2002) Available online, URL: http://publications.idiap.ch/downloads/reports/2002/rr02-46.pdf.
Yangqing Jia et al., "Caffe: Convolutional Architecture for Fast Feature Embedding", (Jun. 20, 2014) Available online, URL: https://arxiv.org/pdf/1408.5093.pdf.
Dougal Maclaurin et al., "Modeling, Inference and Optimization with Composable Differentiable Procedures," (Apr. 13, 2016) Available online, URL: https://dougalmaclaurin.com/phd-thesis.pdf.
Autograd / docs / tutorial.md, Available online, URL: https://github.com/HIPS/autograd/blob/6ecce63011871b3f7c117b4dd5bfabfe3f142572/docs/tutorial.md (updated on Apr. 17, 2015 JST).
Autograd / README.md, Available online, URL: https://github.com/HIPS/autograd/blob/33ad7206fb1de4f322b14e90be6b57161e69e908/README.md (updated on Apr. 17, 2015 JST).
Autograd / examples / neural_net.py, Available online, URL: https://github.com/HIPS/autograd/blob/bb522a8e944cc01e674a62b6771d03b1ddfd807f/examples/neural_net.py (updated on Apr. 9, 2015 JST).
Autograd / examples / convnet.py, Available online, URL: https://github.com/HIPS/autograd/blob/d97873be02cfa265914dd44ca33e41259a283091/examples/convnet.py (updated on Apr. 17, 2015 JST).
Autograd / examples / rnn.py, Available online, URL: https://github.com/HIPS/autograd/blob/d97873be02cfa265914dd44ca33e41259a283091/examples/rnn.py (updated on Apr. 17, 2015 JST).
Autograd / examples / lstm.py, Available online, URL: https://github.com/HIPS/autograd/blob/d97873be02cfa265914dd44ca33e41259a283091/examples/lstm.py (updated on Apr. 17, 2015 JST).
Autograd / examples / fluidsim / fluidsim.py, Available online, URL: https://github.com/HIPS/autograd/blob/47f005c09ff7fa5c83fbf5a90b64abfa08b78255/examples/fluidsim/fluidsim.py (updated on Apr. 17, 2015 JST).
Autograa / docs / tutorial.md, Avallable online, URL: https://github.com/HIPS/autograd/blob/master/docs/tutorial.md (accessed on Mar. 27, 2020).
Autograd / README.md, Available online, URL: https://github.com/HIPS/autograd/blob/master/README.md (accessed on Mar. 27, 2020).
Autograd / examples / neural_net.py, Available online, URL: https://github.com/HIPS/autograd/blob/master/examples/neural_net.py (accessed on Mar. 27, 2020).
Autograd / examples / convnet.py, Available online, URL: https://github.com/HIPS/autograd/blob/master/examples/convnet.py (accessed on Mar. 27, 2020).
Autograd / examples / rnn.py, Available URL: https://github.com/HIPS/autograd/blob/master/examples/rnn.py (accessed on Mar. 27, 2020).
Autograd / examples / lstm.py, Available online, URL: https://github.com/HIPS/autograd/blob/master/examples/lstm.py (accessed on Mar. 27, 2020).

(56) References Cited

OTHER PUBLICATIONS

Autograd / examples / fluidsim / fluidsim.py, Available online, URL: https://github.com/HIPS/autograd/blob/master/examples/fluidsim/fluidsim.py (accessed on Mar. 27, 2020).
Python, Available online, URL: http://web.archive.org/web/20150603065421/https://www.python.org/ (archived on Jun. 3, 2015).
Theano, Available online, URL: http://web.archive.org/web/20150415224355/http://www.deeplearning.net/software/theano/ (archived on Apr. 15, 2015).
Torch, Available online, URL: http://web.archive.org/web/20150527220838/http://torch.ch/ (archived on May 27, 2015).
Keras: Theano-based Deep Learning library, Available online, URL: http://web.archive.org/web/20150530140550/https://keras.io/ (archived on May 30, 2015).
Caffe, Available online, URL: https://web.archive.org/web/20150601082201/http://caffe.berkeleyvision.org/ (archived on Jun. 1, 2015).
"Torch," Scientific computing for LuaJIT, (Archived on Oct. 21, 2015), Available online, URL: http://web.archive.org/web/20151021015824/http://torch.ch/.
Maclaurin et al., "Autograd: Effortless gradients in Pure Python," Available Online, URL: https://indico.lal.in2p3.fr/event/2914/contributions/6483/subcontributions/180/attachments/6059/7184/talk.pdf.
Office Action dated Dec. 30, 2019, in U.S. Appl. No. 16/551,435 (US 2019-0378018).
E. Salari et al., "Integrated recurrent neural network for image resolution enhancement from multiple image frames," IEE Proc.-Vis. Image Signal Process., vol. 150, No. 5 (Oct. 2003).
"Chainer", A flexible framework for neural networks, (Archived on Jun. 9, 2015) Available online, URL: http://web.archive.org/web/20150609051613/http://chainer.org/.
"Pfnet/chainer," GitHub (Archived on Jun. 9, 2015) Available online, URL: http://web.archive.org/web/20150609131250/github.com/pfnet/chainer.
"Python," Functions Defined (Archived on Oct. 28, 2015) Available online, URL: http://web.archive.org/web/20151028112634/https://www.python.org/.
"Theano," Welcome—Theano 0.7 documentation,(Archived on Oct. 28, 2015), Available online, URL: http://web.archive.org/web/20151028130745/http://deeplearning.net/software/theano/.
"Torch," Scientific computing for LuaJIT, (Archived on Oct. 28, 2015), Available online, URL: http://web.archive.org/web/20151021015824/http://torch.ch/.
Jia et al., "Caffe", Deep Learning Framework by the BVLC (Archived on Oct. 22, 2015) Available online, URL: http://web.archive.org/web/20151022060455/http://caffe.berkeleyvision.org/.
Jia et al., "Caffe", Deep Learning Framework by the BVLC (Archived on Oct. 28, 2015) Available online, URL: http://web.archive.org/web/20151028115649/http://caffe.berkeleyvision.org/.
JP-2015-174205, filed Sep. 3, 2015, Preferred Networks, Inc., with English translation of specification and drawings.
JP-2015-213293, filed Oct. 29, 2015, Preferred Networks, Inc., English translation of specification and drawings.
JP-2015-213294, filed Oct. 29, 2015, Preferred Networks, Inc., with English translation of specification and drawings.
PCT/JP2016/004028, filed Sep. 2, 2016, Preferred Networks, Inc., English translation of specification and drawings.
Written Amendment, Japanese Patent Application No. 2017-547348, dated Apr. 16, 2020, with English translation.
Written Amendment (with declaration), Japanese Patent Application No. 2017-547348, dated Dec. 26, 2019, with English translation.
Written Amendment, Japanese Patent Application No. 2017-547348, dated Nov. 13, 2019, with English translation.
Written Amendment (with declaration), Japanese Patent Application No. 2017-547348, dated Jul. 7, 2020, with English translation.
ISR and Written Opinions of the International Searching Authority of PCT Application No. PCT/JP2016/004027 filed Feb. 9, 2016, 8 pages.
"Chainer", Seiya Tokui, cited reference of ISR, Sep. 3, 2015, 20 pages.
"Gradient-based Hyperparameter Optimizaton through Reversible Learning", Dougal Maclaurin et al., proceedings of the 32nd International Conference on Machine Learning, Litte, France, 2015. JMLR: W&CP vol. 37. 10 pages.
"Caffe", Deep learning framework by BAIR, created by Yangqing Jia et al., http://caffe.berkeleyvision.org/, 4 pages.
"Python", a programming language, http://www.python.org/, 3 pages.
"Torch", Scientific Computing Framework For LuaJIT, http:/torch.ch/, 6 pages.
"Theano", Welcome-Theano 1.0.0 documentation, May 9, 2018, http://deeplearning.net/software/theano/, 5 pages.
"Restructuring of deep neural network acoustic models with singular value decomposition", Jian Xue et al., published 2013 in Interspeech, 8 pages.
"Chainer", A flexible framework for neural networks, May 9, 2018, https://chainer.org/, 3 pages.
"Chainer", GitHub—A flexible framework of neural networks for deep learning, May 9, 2018, https://github.com/chainer/chainer/, 2 pages.
Chainer: a Next-Generation Open Source Framework for Deep Learning:, Seiya Tokui et al., 6 pages.
"Introduction to Chainer: A Flexible Framework for Deep Learning", Jun. 18, 2015 PFI/PFN Weekly Seminar, Seiya Tokui, 36 pages.
"GitHub—HIPS/autograd: Efficiently computes derivatives of numpy code", May 9, 2018, https://github.com/HIPS/autograd/, 3 pages.
Office Action dated Aug. 23, 2021, in co-pending U.S. Appl. No. 16/551,435 (US 2019-0378018).
Seiya Tokui et al., "Chainer: Next-generation open source framework for deep learning," At the 18th Information Theory Learning Theory Workshop (IBIS), 2015. (Nov. 26, 2015 released) https://ibisml.org/ibis2015/poster1/.
Seiya Tokui et al., "Deep Learning Implementations and Frameworks", at the 20th Pacific Asia Conference on Knowledge Discovery and Data Mining (PAKDD), 2016. (Apr. 19, 2016 released) https://pakdd16.wordpress.fos.auckland.ac.nz/technical-program/tutorials/https://www.slideshare.net/beam2d/differences-of-deep-learning-frameworks.
Jnishi, "Add to docs.",Chainer, v7.7.0 . . . v1.4.0 (Oct. 27, 2015) Available online, URL: https://github.com/chainer/chainer/commit/4940b31d7ee7d2280d02a4710eff38cf1e69dc23.
Jnishi, "Fixes documentation, and indentation of kernel code." Chainer, v7.4.0 . . . v1.4.0 (Oct. 26, 2015), Available online, URL: https://github.com/chainer/chainer/commit/49c4c13a768-1c41bde0d6b755257bf89f2b0ad35.
Jnishi, "Reduces access to device vaiables," Chainer, v7.4.0 . . . v1.4.0 (Oct. 26, 2015), Available online, URL: https://github.com/chainer/chainer/commit/b98956fd3c27f4b50c30f5f9b1e-a9bec64646e4d.
Tscohen, "Add min and max alias for amin and amax, to mimick numpy," Chainer v.7.4.0 . . . v1.4.0 (Oct. 24, 2015), Available online, URL: https://github.com/chainer/chainer/commit/ca5719d6655fe2d8f03274d933ac292d2cd2f8a5.
Jnishi, "Fixes imports," Chainer, v7.4.0 . . . v1.4.0 (Oct. 23, 2015), Available online, URL: https://github.com/chainer/chainer/commit/ee9676450125dae89992ec6ab6bcd699c57e96b0.
Ugwis, "Fix Typo," Chainer, v7.4.0 . . . v1.4.0 (Oct. 16, 2015), Available online, URL: https://github.com/chainer/chainer/commit/eb5d08318f293bcfa31016542e2e4223e9dcc993.
Tscohen, "Added alias abs = absolute for numpy-compatibility. Numpy has np.abs . . . ," Chainer, v7.4.0 . . . 1.4.0 (Oct. 15, 2015) Available online, URL: https://github.com/chainer/chainer/commit/ac3b1d85618c6c9aa1ab8dda2aed13fe60089269.
Jnishi, "Merge remote-tracking branch 'upstream/master' into add-ctc," Chainer, v.7.4.0 . . . v1.4.0 (Oct. 15, 2015), Available online, URL: https://github.com/chainer/chainer/commit/c91852672f4706be1d9d173b5e65e83d7d6bc15e.
Jnishi, "Checks if input data is (batch x 1-dimention)," Chainer, v7.4.0 . . . v1.4.0 (Oct. 15, 2015), Available online, URL: https://github.com/chainer/chainer/commit/1b674791d3861c85de9c-1a1f091c85914b49e660.

(56) References Cited

OTHER PUBLICATIONS

Jnishi, "Fixes order of inputs," Chainer, v7.4.0 . . . v1.4.0 (Oct. 15, 2015), Available, online, URL: https://github.com/chainer/chainer/commit/cc38d3a3d27f9dfd31cc041d33a5869e6a158de7.

Tscohen, "Added shape() and strides() methods to CArray," Chainer, v7.4.0 . . . v1.4.0 (Oct. 12, 2015), Available online, URL: https://github.com/chainer/chainer/commit/26a6ff0ab30707d-176fbf56cb00e13774458d6af.

Jnishi, "Fixes format," Chainer, v7.4.0 . . . v1.4.0 (Oct. 6, 2015), Available online, URL:https://github.com/chainer/chainer/commit/1524b84c64af5ef6ead6b6d6d5a42e216d95d625.

Jnishi, "Merge pull request #1 from okuta/fix-ctc," Chainer, v7.4.0 . . . v1.4.0 (Oct. 6, 2015), Available online, URL: https://github.com/chainer/chainer/commit/e2eccd2e9c8f60bdd-02e5abf2362de5381c4d492.

Tscohen, "Use snake case for local variables. Use tuple instead of ndarray as a . . . ," Chainer, v7.4.0 . . . v1.4.0 (Oct. 4, 2015), Available online, URL: https://github.com/chainer/chainer/commit/1f6447bcf3c87eef6706de159c50bfe6e11bc19b.

Eulerreich, "Typo," Chainer, v7.4.0 . . . v1.4.0 (Oct. 4, 2015), Available online, URL: https://github.com/chainer/chainer/commit/86abc03e2b6224a68788da6d6c9c03ae31d349e5.

Tscohen, "Remove debug prints and fix line length issue," Chainer, v7.4.0 . . . v.1.4.0 (Oct. 3, 2015), Available online, URL: https://github.com/chainer/chainer/commit/73ee1523ae6851-cc9f94f5049c22db41caa3ee07.

Tscohen, "Add chainer Functions Transpose and Swapaxes," Chainer, v7.4.0 . . . v.1.4.0 (Oct. 3, 2015), Available online, URL: https://github.com/chainer/chainer/commit/0f2e08cf2f228-b7b67be5712ed9b6ed66eac9595.

Jnishi, "Fixes for some comments," Chainer, v7.4.0 . . . v1.4.0 (Sep. 28, 215) Available online, URL: https://github.com/chainer/chainer/commit/927ca44e639a6bc0e60f6fd4d24bccad0902bfe7.

Jnishi, "Apply for comments," Chainer, v.7.4.0 . . . v1.4.0 (Sep. 28, 2015), Available online, URL: https://github.com/chainer/chainer/commit/d286cc0181da9fe5753746b41df2ac9623abfcf3.

Jun-ya Norimatsu, "set offset," Chainer, v7.4.0 . . . v1.3.2 (Sep. 24, 2015) Available online, URL: https://github.com/chainer/chainer/commit/1f55248b187886034dfd0559365116b4ad1c64ce.

Jnishi, "Merge remote-tracking branch 'upstream/master' into add-ctc," chainer, v7.4.0 . . . v1.4.0 (Sep. 24, 2015) Available online, URL: https://github.com/chainer/chainer/commit/ffe41dcf07855463422e047a530fc240f8eb86f9.

Jnishi, "Remove atomicity on label probability computation," Chainer, v7.4.0 . . . v1.4.0 (Sep. 24, 2015) Available online, URL: https://github.com/chainer/chainer/commit/7a7d407d45910d-cb77187d8fa4f184c0f1c51fe0.

Ronekko, "Fix cupy.expand_dim() is missing in the docs," Chainer, v7.4.0 . . . v.1.3.2 (Sep. 22, 2015) Available online, URL: https://github.com/chainer/chainer/commit/0b185ed12b6cf1-1f686fef819223ab5cea627f36.

Jnishi, "Fixes format of references," Chainer, v7.4.0 . . . v1.4.0 (Sep. 17, 2015), Available online, URL: https://github.com/chainer/chainer/commit/59258f05e4d13a25a78567b5740cfd7c11cb94ad.

Jnishi, "Add Nesterov accelerated gradient," Chainer, v7.4.0 . . . v1.4.0 (Sep. 17, 2015), Available online, URL: https://github.com/chainer/chainer/commit/f425a9651569b834a4e4ad8fc57b2f757-9c03619.

Jnishi, "Add type check," Chainer, v7.4.0 . . . v1.4.0 (Sep. 17, 2015) Available online, URL: https://github.com/chainer/chainer/commit/4d4e1a65106d364851fc4db1be940cc99657ac67.

Jnishi, "Merge remote-tracking branch 'upstream/master' into add-ctc," Chainer, v7.4.0 . . . v1.4.0 (Sep. 17, 2015), Available online, URL: https://github.com/chainer/chainer/commit/b4dc4312c5f3ab9a5f0756bd69b28af3e594a1dc.

Eddie Bell, "bugfix: backprop now works when concatenating a single element array," Chainer, v7.4.0 . . . v1.3.1 (Sep. 16, 2015), Available online, URL: https://github.com/chainer/chainer/commit/9056241d5e0b9051de8c594eb249a5b42117fba2.

Jnishi, "Add descriptions," Chainer, v.7.4.0 . . . v1.4.0 (Sep. 15, 2015) Available online, URL: https://github.com/chainer/chainer/commit/d0ab8356232c2b636cd1ff1523125e0c29368581.

Jnishi, "Merge remote-tracking branch 'upstream/master' into add-ctc," Chainer, v7.4.0 . . . v1.4.0 (Sep. 15, 2015), Available online, URL: https://github.com/chainer/chainer/commit/2d81f8eebbed35e13d83df4f14c09b0f4c3ec91d.

Xternalz, "Merge pull request # 1 from pfnet/master," Chainer, v7.4.0 . . . v1.3.1, (Sep. 12, 2015), Available online, URL: https://github.com/chainer/chainer/commit/cb3e6c02dbcce7df-b3328bb3a888bcfee7fcaba8.

Xternalz, "Update convolution_2d.py," Chainer, v7.4.0 . . . v1.3.1 (Sep. 12, 2015), Available online, URL: https://github.com/chainer/chainer/commit/a4064bf1d1640313583cf3bfe5acb0d9d1bd0fff.

Nakatani.sho, "Fixes simple grammatical mistake in tutorial," Chainer, v7.4.0 . . . v1.3.1 (Sep. 12, 2015), Available online, URL: https://github.com/chainer/chainer/commit/b6fcb64b01147fb1e2-07265735ab907d0f4973d9.

Jnishi, "Fixes normarization of loss function and delta," Chainer, v7.4.0 . . . v7.4.0 (Sep. 11, 2015), Available online, URL: https://github.com/chainer/chainer/commit/93f7ce249f633468a9f3-cb1bd77e0158ca26a4f2.

Jnishi, "Support min-batch," Chainer, v7.4.0 . . . v1.4.0 (Sep. 11, 2015), Available online, URL: https://github.com/chainer/chainer/commit/46f4e75112cdef66dec885434bf37a50772de7fd.

Jnishi, "Add backward to retry to avoid numerical error," Chainer, v7.4.0 . . . v1.4.0 (Sep. 11, 2015) Available online, URL: https://github.com/chainer/chainer/commit/a3719524d88e39a192-4f8071d6607b9241229a48.

Jnishi, "Calculate only on GPU when uses GPU," Chainer, v7.4.0 . . . v1.4.0 (Sep. 10, 2015), Available online, URL: https://github.com/chainer/chainer/commit/b1cad5ceeb6728dab-b313f814c342b41ddafbc4e.

Jnishi, "Merge remote-tracking branch 'upstream/mater' into add-ctc," Chainer, v7.4.0 . . . v1.4.0 (Sep. 10, 2015), Available online, URL: https://github.com/chainer/chainer/commit/51c58430c73c87ce0585396c31288a72eb56e0e2.

Xternalz, "Fix to_gpu() of Convolution2D," Chainer, v7.4.0 . . . v1.3.1 (Sep. 10, 2015) Available online, URL: https://github.com/chainer/chainer/commit/0b2921a8bcfc867def65120fe34fb79f-d93f7245.

Choni, "Simplified if clause of_get_sorted_funcs," Chainer, v7.4.0 . . . v1.3.1 (Sep. 9, 2015) Available online, URL: https://github.com/chainer/chainer/commit/28b44beae48604ad09c69-1d6f8697aef943245ac.

Choni, "Fixed typecheck in _get_sorted_funcs," Chainer, v7.4.0 . . . v1.3.1 (Sep. 9, 2015) Available online, URL: https://github.com/chainer/chainer/commit/8a26046d4fbcc590103-b2bd76d53286bd870ca09.

Choni, "Changed from issubclass to isinstance. Fixed for PEP8 E501," Chainer, v7.4.0 . . . v1.3.1 (Sep. 9, 2015) Available online, URL: https://github.com/chainer/chainer/commit/00c2dbdcf2d64fb139990a124cf9024732746eb0.

Choni, "Added typecheck where self._dict_ is used," Chainer, v7.4.0 . . . v1.3.1 (Sep. 9, 2015), Available online, URL: https://github.com/chainer/chainer/commit/6079ed94d5df7434c19-64da8693af169cfe6ecd0.

Jnishi, "Fixes import path from cuda.cupy.get_array_module to cuda.get_array_m . . . ," Chainer, v7.4.0 . . . v1.4.0 (Sep. 3, 2015), Available online, URL: https://github.com/chainer/chainer/commit/eb82b3b77853a2fb9778b4b1f3870edfaea1ec49.

Jnishi, "Fixes type check of array," Chainer, v7.4.0 . . . v1.4.0 (Sep. 2, 2015) Available online, URL: https://github.com/chainer/chainer/commit/3d5bc246bb895905b37668bce84ab7d15a9734dd.

Jnishi, "Merge remote-tracking branch 'upstream/master' into add-ctc," Chainer, v7.4.0 . . . v1.4.0 (Sep. 2, 2015), Available online, URL: https://github.com/chainer/chainer/commit/6b24a37b2f44c1f438e80f9120360116f12bf478.

Jnishi, "Fixes long line, and import order," Chainer, v7.4.0 . . . v1.4.0 (Sep. 1, 2015) Available online, URL: https://github.com/chainer/chainer/commit/1880284896b51dad5ad91684fa8f9-b0d9a47a55e.

(56) References Cited

OTHER PUBLICATIONS

Jnishi, "Merge remote-tracking branch 'upstream/master' into add-ctc," Chainer, v7.4.0 . . . v1.4.0 (Sep. 1, 2015) Available online, URL: https://github.com/chainer/chainer/commit/4e25c9417ae744bcb3a55b270fcd3c6c536eb6da.

Jnishi, "Merge upstream/master," Chainer, v7.4.0 . . . v1.4.0 (Sep. 1, 2015) Available online, URL: https://github.com/chainer/chainer/commit/75a334ff07191f9063f70a72dbaa03b09168579b.

Kashif, "Updated adam solver to v8 of paper," Chainer, v7.4.0 . . . v1.3.0 (Aug. 31, 2015) Available online, URL: https://github.com/chainer/chainer/commit/b6ff6bf16b82d15af3236389b017ea5e4435b6ae.

Mrfuzzybee, "Fixed bug that—out argument in train_imagenet.py dimmed," Chainer, v7.4.0 . . . v1.3.0 (Aug. 30, 2015) Available online, URL: https://github.com/chainer/chainer/commit/304ad75408ff2d9c83bd26e1a11b99d84031ea8e.

Jnishi "Calculate softmax internally," Chainer, v7.4.0 . . . v1.4.0 (Aug. 28, 2015) Available online, URL: https://github.com/chainer/chainer/commit/32a0f18b3eafe7150e2bb2a3643fc8e8af362c99.

Jnishi, "Merge remote-tracking branch 'upstream/mater' into add-ctc," Chainer, v7.4.0 . . . v1.4.0 (Aug. 28, 2015) Available online, URL: https://github.com/chainer/chainer/commit/3e65278be798092f42a659bd98afb9552f967f25.

Jnishi, "Merge epu/gpu process," Chainer, v7.4.0 . . . v1.4.0 (Aug. 28, 2015) Available online, URL: https://github.com/chainer/chainer/commit/35f4d8a56beb5f38a9705307d68e9017e302f1e5.

Jnishi, "Fixes process to log values of zeros," Chainer v7.4.0 . . . v1.4.0 (Aug. 27, 2015) Available online, URL: https://github.com/chainer/chainer/commit/53140c9391350c8cf112db9a929ad76-9c51996be0.

Jnishi, "Fixes—inf when creating log value," Chainer v7.4.0 . . . v1.4.0 (Aug. 27, 2015) Available online, URL: https://github.com/chainer/chainer/commit/b6e083b95bf408690dff6c7e2625693a9c4ea282.

Nushio3, "Update cuda dependency paragraph in README," Chainer, v7.4.0 . . . v1.3.0 (Aug. 26, 2015) Available online, URL: https://github.com/chainer/chainer/commit/c54e852cd0cd0a92a9-29fc1846ec0e4a18093da3.

Hido, "Update comparison.rst," Chainer v7.4.0 . . . v1.3.0 (Aug. 26, 2015) Available online, URL: https://github.com/chainer/chainer/commit/0a658d113e54873316da324ab472e52f5e313fe6.

Kosuki_miyawaki, "Add functions.sum document," Chainer, v7.4.0 . . . v1.3.0 (Aug. 25, 2015) Available online, URL: https://github.com/chainer/chainer/commit/c943c31b246e3-b0598fa71f42d122b7c5795b418.

Kosuki_miyawaki "Fix using expand_dims," Chainer, v7.4.0 . . . v1.3.0 (Aug. 24, 2015) Available online, URL: https://github.com/chainer/chainer/commit/52779384f7577b9cca5ac1cd43653061f2-7377ce.

Umitanuki "Fix wrong device destination in optimizer.accumulate_grads()," Chainer, v7.4.0 . . . v1.3.0 (Aug. 22, 2015) Available online, URL: https://github.com/chainer/chainer/commit/447e1e6aaf5590b7bdce63afb826a754d03274d8.

Kosuki_miyawaki, "Functions/sum add axis option and apply cupy," Chainer, v7.4.0 . . . v1.3.0 (Aug. 21, 2015) Available online, URL: https://github.com/chainer/chainer/commit/264fa94f598-b54cacbee90331a5f347003b504c9.

Jnishi "Refocterd around CuPy," Chainer, v7.4.0 . . . v1.4.0 (Aug. 21, 2015) Available online, URL: https://github.com/chainer/chainer/commit/0182e7bdc26e9177faba33ea896d3e86f72e44d4.

Jnishi, "Remove dependency of SciPy," Chainer, v7.4.0 . . . v1.4.0 (Aug. 21, 2015) Available online, URL: https://github.com/chainer/chainer/commit/2d32287857208c91d629648c549141d7f076a2ab.

Jnishi "Support CyPy," Chainer, v7.4.0 . . . v1.4.0 (Aug. 21, 2015) Available online, URL: https://github.com/chainer/chainer/commit/00ddde133426af41a09c89f07ea3cfcfb0f823e9.

Jnishi "Merge remote-tracking branch 'upstream/master' into add-ctc," Chainer, v7.4.0 . . . v1.4.0 (Aug. 20, 2015) Available online, URL: https://github.com/chainer/chainer/commit/595241a741268215a1dbf3e1a53c874fe0bd2526.

Jnishi, "Force type as float32," Chainer, v7.4.0 . . . v1.4.0 (Aug. 20, 2015) Available online, URL: https://github.com/chainer/chainer/commit/4d45ddc9c93f12ca7bdb777f228e554ce723dbc5.

Jnishi, "Merge remote-tracking branch 'upstream/master' into add-ctc," Chainer v7.4.0 . . . v1.4.0 (Aug. 20, 2015) Available online, URL: https://github.com/chainer/chainer/commit/187a74ef1de7763a1b35d7d8f857ac53cc7426db.

Jnishi, "Support log scale forward and backward computation of cpu," Chainer, v7.4.0 . . . v1.4.0 (Aug. 19, 2015) Available online, URL: https://github.com/chainer/chainer/commit/294d1c9e221745b77475132d9fb035a9672e0934.

Jnishi "Merge remote-tracking branch 'upstream/master' into add-ctc," Chainer, v7.4.0 . . . v1.4.0 (Aug. 18, 2015) Available online, URL: https://github.com/chainer/chainer/commit/b27aa03a9a84b8421788c086e4e894a7cbc3ca6c.

Jnishi, "Remove deprecated function(check_type_backward)," Chainer, v7.4.0 . . . v1.2.0 (Aug. 18, 2015), Available online, URL: https://github.com/chainer/chainer/commit/3e43591b0241d4e4-026ab7ba0f857d5b989be910.

Jnishi "Merge remote-tracking branch 'upstream\master' into add-clipped-relu," Chainer, v7.4.0 . . . v1.2.0 (Aug. 18, 2015), Available online, URL: https://github.com/chainer/chainer/commit/1644e3496d870d40a84a15f0acf35de73a88010f.

Jnishi, "Add documents to reference manuals," Chainer, v7.4.0 . . . v1.2.0 (Aug. 17, 2015), Available online, URL: https://github.com/chainer/chainer/commit/1c68a86b4858f622c84db7c369ced2c1-28be54c7.

Sinhrks, "API: Allow optimizer.setup to accept FunctionSet," Chainer, v7.4.0 . . . v1.2.0 (Aug. 13, 2015) Available online, URL: https://github.com/chainer/chainer/commit/75d4016e4629126cf-6d388c7855bff075b383321.

Mitmul "Fix documentation," Chainer, v7.4.0 . . . v1.2.0 (Aug. 7, 2015) Available online, URL: https://github.com/chainer/chainer/commit/3ccc92b1aa193ae4ffbeefc157cfe90b71bc1b02.

Rezoo, "Fix SoftMax functions according to comments," Chainer, v7.4.0 . . . v1.2.0 (Aug. 6, 2015), Available online, URL: https://github.com/chainer/chainer/commit/baddf968266a58d9d-d84251cd2f7114f703905b2.

Rezoo, "Merge branch 'master' into replicated_softmax," Chainer, v7.4.0 . . . v12.0 (Aug. 6, 2015) Available online, URL: https://github.com/chainer/chainer/commit/01254aa30079c8fb8-6afcda907c9db6401b17039.

Cemoody, "Fixed comparison table," Chainer, v7.4.0 . . . v1.2.0 (Aug. 6, 2015) Available online, URL: https://github.com/chainer/chainer/commit/3370d41cd2cc9f5744b42dcdf76b5e4bb39a6ca2.

Jfsantos, "Merge pull request #1 from pfnet/sincos," Chainer, v7.4.0 . . . v1.2.0 (Aug. 6, 2015) Available online, URL: https://github.com/chainer/chainer/commit/56be1b8595b0c76-cc24b90042882a7cfb8d6f9b8.

Cemoody, "Updated table to parse correctly," Chainer, v7.4.0 . . . v1.2.0 (Aug. 6, 2015) Available online, URL: https://github.com/chainer/chainer/commit/e18223573c3c320cb1beac1d4efe6b8f5-97c74f2.

Cemoody, "Updated table per conversation with Southmith Chintala and Francois C . . . ," Chainer, v.7.4.0 . . . v1.2.0 (Aug. 6, 2015) Available online, URL: https://github.com/chainer/chainer/commit/60e08d8f7fce399436c1c76050c7dcead952a379.

Cemoody, "Added getitem to FunctionSet," Chainer, v7.4.0 . . . v1.2.0 (Aug. 5, 2015, Available online, URL:https://github.com/chainer/chainer/commit/43ec35fc5aae0fb475b9cdf4b155b8fd1b2-b691f.

Jnishi "Remove set modules, and use built-in set module," Chainer, v7.4.0 . . . v1.4.0 (Aug. 4, 2015) Available online, URL: https://github.com/chainer/chainer/commit/fd425798d031b-5c8b26a5aae2c34919e21986ffb.

Jnishi, "Fixes about importing cumisc," Chainer v7.4.0 . . . v1.4.0 (Aug. 4, 2015) Available online, URL: https://github.com/chainer/chainer/commit/1406b5cd770db9ca3cd8359916dcdef4f6aabf35.

Jnishi, "Merge remote-tracking branch 'upstream/master' into add-ctt," v7.4.0 . . . v1.4.0 (Aug. 4, 2015) Available online, URL: https://github.com/chainer/chainer/commit/65a4e35a6bc-9230408d8e5688f8fcf6da34c8913.

(56) References Cited

OTHER PUBLICATIONS

Jnishi, "Add run_module loading," Chainer, v7.4.0 . . . v1.4.0 (Aug. 4, 2015) Available online, URL: https://github.com/chainer/chainer/commit/32092347afa5fc8383fad957ad868f4e6b8c88b0.
Jnishi, "Support backward functions," Chainer, v7.4.0 . . . v1.4.0 (Aug. 4, 2015) Available online, URL: https://github.com/chainer/chainer/commit/b9dd538e0158950420892b276e75908cefee4b00.
Jnishi, "Refactored forward computation," Chainer, v7.4.0 . . . v1.4.0 (Jul. 31, 2015) Available online, URL: https://github.com/chainer/chainer/commit/8b101485e7d6ab578bab2a348bd122c3-6304b160.
Jnishi, "Support forward," Chainer, v7.4.0 . . . v1.4.0 (Jul. 30, 2015) Available online, URL: https://github.com/chainer/chainer/commit/6bfb127944efcec9c00427d14f90a600c85c04af.
Jnishi, "Sort assignment statement by alphabetical order," Chainer, v7.4.0 . . . v1.2.0 (Jul. 28, 2015), Available online, URL: https://github.com/chainer/chainer/commit/afa184aa3342b99a3-bd7bd93f7ef7c35ff46a143.
Jnishi, "use utils.foce_array," Chainer, v7.4.0 . . . v1.2.0 (Jul. 28, 2015) Available online, URL: https://github.com/chainer/chainer/commit/2bedde4e8bd4b6a57c724c241347472f86452d3b.
Jnishi, "Fixes typo of docstrings," Chainer, v.7.4.0 . . . v1.2.0 (Jul. 28, 2015) Available online, URL: https://github.com/chainer/chainer/commit/1038cab501e2f62f3520db763d0cf5c2f7bc80b3.
Jnishi, "Add type check of return value of clipped_relu," Chainer, v7.4.0 . . . v1.2.0 (Jul. 27, 2015) Available online, URL: https://github.com/chainer/chainer/commit/96f8e32ecc9645f2-5f0074576e6e4916af8a4c4f.
Jnishi, "Support 0-dimentional matrix," Chainer, v7.4.0 . . . v.1.2.0 (Jul. 27, 2015) Available online, URL: https://github.com/chainer/chainer/commit/7acbe9e9758a392576f72cf3d18691d211f4cd2c.
Jnishi, "Rename function name to unique name," Chainer, v7.4.0 . . . v1.2.0 (Jul. 27, 2015) Available online, URL: https://github.com/chainer/chainer/commit/f8e94edb7ba91775-50ea1128298c6109c53c08b2.
Jnishi, "Fixed description," Chainer, v7.4.0 . . . v1.2.0 (Jul. 27, 2015) Available online, URL: https://github.com/chainer/chainer/commit/4ad51836cd6987f77c14f6ab6899755b661711e2.
Jnishi, "Initial commit," Chainer, v7.4.0 . . . v1.4.0 (Jul. 27, 2015) Available online, URL: https://github.com/chainer/chainer/commit/854fcd3ca2ccf59b0776ba820215e0049b977e40.
Jheymann85, "Updated test_cross_covariance.py," Chainer, v7.4.0 . . . v1.2.0 (Jul. 24, 2015) Available online, URL: https://github.com/chainer/chainer/commit/ddf4eaf48f1deb06af3-f708b4c56b4c2fa877976.
Jheymann85, "Updated test_cross_covariance.py," Chainer, v7.4.0 . . . v1.2.0 (Jul. 24, 2015) Available online, URL: https://github.com/chainer/chainer/commit/379712bcea15249-8781ce3fc9e51ff3063357a3c.
Jnishi, "Fixes wrong spell," Chainer, v7.4.0 . . . v1.2.0 (Jul. 24, 2015) Available online, URL: https://github.com/chainer/chainer/commit/8975965d905698239bddcaef484a8ecaa7ce5d43.
Jnishi, "Add type check to refuse 0-dementional array," Chainer, v7.4.0 . . . v1.2.0 (Jul. 24, 2015) Available online, URL: https://github.com/chainer/chainer/commit/286aa43cd5c0350e9-324f9abc29629a8d8cb1958.
Jnishi, "Add forward test," Chainer, v7.4.0 . . . v1.2.0 (Jul. 24, 2015) Available online, URL: https://github.com/chainer/chainer/commit/f9f3b4ee3468761c94f3750397b59a2689615f47.
Jnishi, "Fixes notations of equations," Chainer, v7.4.0 . . . v1.2.0 (Jul. 24, 2015) Available online, URL: https://github.com/chainer/chainer/commit/dbc65bab49c7c266de84183f5f72d1db7fbc8c3e.
Jnishi, "Modified notations of equations to TeX," Chainer, v7.4.0 . . . v1.2.0 (Jul. 24, 2015) Available online, URL: https://github.com/chainer/chainer/commit/ea709af9e4423e59d-d337e31935be81db1a3fce6.
Jnishi, "Rename class name of test case," Chainer, v7.4.0 . . . v1.2.0 (Jul. 24, 2015) Available online, URL: https://github.com/chainer/chainer/commit/0421f12181b2e9821b95bdd87e48ab6b7be0b42b.
Jnishi, "Change test input," Chainer, v7.4.0 . . . v1.2.0 (Jul. 24, 2015), Available online, URL: https://github.com/chainer/chainer/commit/725ace6e112ac59acfc70b1e02f38e5de99222ad.
Jnishi, "Add type check," Chainer, v7.4.0 . . . 0 v1.2.0 (Jul. 24, 2105) Available online, URL: https://github.com/chainer/chainer/commit/a4e8d90567cfb7c15865fd7a4bd902f1b5096a7d.
Mitmul, "Make split object not an attribute," Chainer, v7.4.0 . . . v1.2.0 (Jul. 23, 2015) Available online, URL: https://github.com/chainer/chainer/commit/5822c273fd8203358f1d2636a2d7659-f80820b83.
Mitmul, "Raise error when a pooling class except MasPooling2D is passed to SPP," Chainer, v7.4.0 . . . v1.2.0 (Jul. 23, 2015) Available online, URL: https://github.com/chainer/chainer/commit/02948758c92402e1453b010b160f4dc50a52a526.
Mitmul, "Reduce float computation," Chainer, v7.4.0 . . . v1.2.0 (Jul. 23, 2015) Available online, URL: https://github.com/chainer/chainer/commit/fd00ecadc91cbc6e65736190b87c0e92a298532d.
Mitmul, "Delete an unnecessary assert," Chainer, v7.4.0 . . . v1.2.0 (Jul. 23, 2015) Available online, URL: https://github.com/chainer/chainer/commit/95c617c3973351aa20b41703ea80413ddd3107d8.
Jahn Heymann, "Cross-Covariance:," Chainer, v7.4.0 . . . v1.2.0 (Jul. 23, 2015) Available online, URL: https://github.com/chainer/chainer/commit/95afa1296fd922abfb46ee3cce1c49103c7aa2f0.
Jahn Heymann "Cross-Covariance;," Chainer, v7.4.0 . . . v1.2.0 (Jul. 23, 2015) Available online, URL: https://github.com/chainer/chainer/commit/399e4bda3cb96f0a2444288229e708465900fae0.
Jnishi, "Sort import library as alphabetical order," Chainer, v7.4.0 . . . v1.2.0 (Jul. 22, 2015), Available online, URL: https://github.com/chainer/chainer/commit/97f6f3a0f076c93c308-7694908e3f2c7268878c5.
Jnishi, "Fixes flak8' error and warning," Chainer, v7.4.0 . . . v1.2.0 (Jul. 22, 2015) Available online, URL: https://github.com/chainer/chainer/commit/4287e8bdd1b0a9ce4f22ee76e52d908c822e1955.
Jnishi, "Fixes flake8's warning and error," Chainer, v.7.4.0 . . . v1.2.0 (Jul. 22, 2015) Available online, URL: https://github.com/chainer/chainer/commit/979e5f6cc455c1c8d64a93d9d4f0548f4-72bea0f.
Jheymann85 "Merge pull request #1 from jheymann85/master," Chainer, v.7.4.0 . . . v1.2.0 (Jul. 22, 2015) Availableo nline, URL: https://github.com/chainer/chainer/commit/546c53ece2bb101a0-04825ff4d83a07e3525fcd5.
Jahn Heymann, "Flake," Chainer, v7.4.0 . . . v1.2.0 (Jul. 21, 2015) Available online, URL: https://github.com/chainer/chainer/commit/81fe720a9b32ec9a2f47e50f34918ad35b17f0ab.
Jahn Heymann, "Replace xrange with six.moves.xrange for python3," Chainer, 7.4.0 . . . v1.2.0 (Jul. 21, 2015) Available online, URL: https://github.com/chainer/chainer/commit/c7bbc7fc67bbfdae-b2c0ca8d0219a7cc5b6fd927.
Jahn Heymann, "Revert Fix: Import not working on non CUDA machines since the except . . . " Chainer, v.7.4.0 . . . v1.2.0 (Jul. 21, 2015) Available online, URL: https://github.com/chainer/chainer/commit/28989f70993007613db97f6e4e07814457e0e229.
Jnishi, "Fixes short denoted CReLU to ClippedReLU," Chainer, v7.4.0 . . . v1.2.0 (Jul. 21, 2015) Available online, URL: https://github.com/chainer/chainer/commit/2da3b4bfbd8e1b28954-b93d61c9fe373ebb660dc.
Jnishi, "Add clipped Rectifier Linear Unit," Chainer, v7.4.0 . . . v1.2.0 (Jul. 21, 2015) Available online, URL: https://github.com/chainer/chainer/commit/eaca3b5fc3babeae6f5e8ee889667ea86c-992eeb.
Jahn Heymann, "Added backward type check," Chainer, v7.4.0 . . . v1.2.0 (Jul. 21, 2015) Available online, URL: https://github.com/chainer/chainer/commit/b467821c2e66d8d716e7-8d017936ac9b5ad687ac.
Jahn Heymann, "Workaround: shapes as tuples and then as lists again in gpu_background," Chainer, v7.4.0 . . . v1.2.0 (Jul. 21, 2015) Available online, URL: https://github.com/chainer/chainer/commit/63a7f226b788e7af6db24713e25bc6a56bf44d71.
Jahn Heymann, "Fix: Import not working on non CUDA machines since the exception has . . . ," Chianer, v7.4.0 . . . v1.2.0 (Jul. 21, 2015) Available online, URL: https://github.com/chainer/chainer/commit/d91ef565656aa2c023556149b34994e8248739b5.

(56) References Cited

OTHER PUBLICATIONS

Jahn Heymann, "Added sum-squared cross-covariance penalty," Chainer, v7.4.0 . . . v1.2.0 (Jul. 21, 2015) Available online, URL: https://github.com/chainer/chainer/commit/0dc534f775a-aa502d33ca1c7c4d6431f4e13b341.
Jfsantos, "Fixed input indexing," Chainer, v7.4.0 . . . v1.2.0 (Jul. 21, 2015), Available online, URL: https://github.com/chainer/chainer/commit/4626293d1a5aa981191d9a04b752cd23050c954a.
Mitmul, "Make out_dim not an attribute of SPP class," Chainer, v7.4.0 . . . v1.2.0 (Jul. 21, 2015) Available online, URL: https://github.com/chainer/chainer/commit/4b8431a2d43fd-e6b508cf15506cffceb2fe9ebae.
Jfsantos, "Flake8 fixes," Chianer, v7.4.0 . . . v1.2.0 (Jul. 20, 2020) Available online, URL: https://github.com/chainer/chainer/commit/5ab8e7c0e6e429425a159cfe4c123ad759f4126b.
Jfsantos, "Fixed numpy namespace and style," Chainer, v7.4.0 . . . v1.2.0 (Jul. 20, 2015) Available online, URL: https://github.com/chainer/chainer/commit/227af3b11032ced9a138b246ae46534263-1e800f.
Jfsantos "Fixed superclass," Chainer, v7.4.0 . . . v1.2.0 (Jul. 20, 2015) Available online, URL: https://github.com/chainer/chainer/commit/e941c1c49e0686991b44e4df79c0cfbf2ce9c838.
Jfsantos"Added sin and cos to basic_math," Chainer, v7.4.0 . . . v1.2.0 (Jul. 20, 2015), Available online, URL: https://github.com/chainer/chainer/commit/04a5c23f7a34ff17d7a031323c8a6b3d8ab8d8c4.
Rezoo "Convert t to float32 to preserve dtype," Chainer, v7.4.0 . . . v1.1.0 (Jul. 19, 2020) Available online, URL: https://github.com/chainer/chainer/commit/baeff7244bef21773c40-923bc80082b2f2d4b3b2.
Mitmul, "Add SPP function to functions list in reference," Chainer, v7.4.0 . . . v1.2.0 (Jul. 19, 2015) Available online, URL: https://github.com/chainer/chainer/commit/043b8c3972634-cca8e0c8e6bf55a3a8c4bfd36c1.
Mitmul, "Change exception handling about which class is passed to pooling_class," Chainer, v7.4.0 . . . v1.2.0 (Jul. 19, 2015) Available online, URL: https://github.com/chainer/chainer/commit/c52da91f3a0fd9db99d100b01c39fe6da4270f33.
Mitmul, "Fix a comment," Chainer, v7.4.0 . . . v1.2.0 (Jul. 19, 2015) Available online, URL: https://github.com/chainer/chainer/commit/81462fa76da5831272732e1c1cf612890bfbb989.
Mitmul, "Fix division operators," Chainer, v7.4.0 . . . v1.2.0 (Jul. 19, 2015) Available online, URL: https://github.com/chainer/chainer/commit/e099f87431b82d69512c250e9dcdc383857d0574.
Mitmul, "Do not hold concat class as an attribute," Chainer, v7.4.0 . . . v1.2.0 (Jul. 19, 2015) Available online, URL: https://github.com/chainer/chainer/commit/050ec092fa87b-293d9b227b9df5707c3d5722484.
Mitmul, "Fix documentation," Chainer, v7.4.0 . . . v1.2.0 (Jul. 19, 2015) Available online, URL: https://github.com/chainer/chainer/commit/e2b0059cfba777e374486a38c360d4cfbc7be7da.
Mitmul, "Put backward_cpu and backward_gpu into one backward function," Chainer, v7.4.0 . . . v1.2.0 (Jul. 19, 2015) Available online, URL: https://github.com/chainer/chainer/commit/e08f9fb7eeb75221ae16e9eb4d13bf7b3476e4cb.
Mitmul, "Pass the shape of input variable x to SPP class instead of x itself," Chainer, v7.4.0 . . . v1.2.0 (Jul. 19, 20215) Available online, URL: https://github.com/chainer/chainer/commit/9ed1647456431136a73a3ed55e4f345b37ff6ed3.
Rezoo, "Add normalize option," Chainer, v7.4.0 . . . v1.2.0 (Jul. 17, 2015) Available online, URL: https://github.com/chainer/chainer/commit/bc0409074645809e2ccabdfb131df527569d9a41.
Mitmul,, "Fix some typos in documentations," Chainer, v7.4.0 . . . v1.2.0 (Jul. 17, 2015) Available online, URL: https://github.com/chainer/chainer/commit/d32a96265f8d6943ab114cb0f43575f2-3173fc25.
Mitmul, "Put none to stride parameter instead of int," Chainer, v7.4.0 . . . v1.2.0 (Jul. 17, 2015) Available online, URL: https://github.com/chainer/chainer/commit/6811dd25da3d2bf7-888027415aef51b7b276cfd2.
Rezoo, "Add const prefixes," Chainer, v7.4.0 . . . v1.2.0 (Jul. 17, 2015) Available online, URL: https://github.com/chainer/chainer/commit/1fe656383824a1a8b3e949f681e1cb7179296738.
Mitmul, "Add spatial pyramid pooling 2d function," Chainer, v7.4.0 . . . v1.2.0 (Jul. 17, 2015) Available online, URL: https://github.com/chainer/chainer/commit/21cef8072bac8ed114a-9680414ecb4da7d8dc70d.
Rezoo, "Revise documents," Chainer, v7.4.0 . . . v1.2.0 (Jul. 17, 2015) Available online, URL: https://github.com/chainer/chainer/commit/d27942487d47297b3e08a9dd2486094efb585940.
Rezoo, "Follow PEP8," Chainer, v7.4.0 . . . v1.2.0 (Jul. 17, 2015) Available online, URL: https://github.com/chainer/chainer/commit/6da7bc57a2960ec32901f28c70759fcd8dbee1cd.
Rezoo, "Use a conventional impl when y.ndim == 2," Chainer, v7.4.0 . . . v1.2.0 (Jul. 17, 2015), Available online, URL: https://github.com/chainer/chainer/commit/01e6d7bb9a3f9793669-5456aadc57f1a51aadad3.
Rezoo, "Fix some variables to the singular form," Chainer, v7.4.0 . . . v1.2.0 (Jul. 17, 2015) Available online, URL: https://github.com/chainer/chainer/commit/fa90711a82d43d3f-14072574d158beb1e134960d.
Rezoo, "Add testcases w.r.t. ReplicatedSoftmax layer," Chainer, v7.4.0 . . . v1.2.0 (Jul. 16, 2015) Available online, URL: https://github.com/chainer/chainer/commit/56d1f7e326d5a87fc2b-84bd237bbd05d419c14af.
Rezoo, "Support replicated SoftMax layer," Chainer, v7.4.0 . . . v1.2.0 (Jul. 16, 2015) Available online, URL: https://github.com/chainer/chainer/commit/e8747e2c451dc2098d8a71be30adaac301ff8fd4.
Sinhrks, "TST: Made tests executable," v7.4.0 . . . v1.1.1 (Jul. 13, 2015) Available online, URL: https://github.com/chainer/chainer/commit/716bd52a211100de0e12063eadb8e8075bd9825d.
Arne-cl, "Fixed typo," Chainer, v.7.4.0 . . . v1.1.1 (Jul. 11, 2015) Available online, URL: https://github.com/chainer/chainer/commit/04f10d2757012323d054c80e772c6e2f51602e17.
Umitanuki, "Add missing explicit dtype to accum los variable," Chainer, v7.4.0 . . . v1.1.1 (Jul. 9, 2015) Available online, URL: https://github.com/chainer/chainer/commit/18c73160adfedd-e8e88ebbc94cd9a0e59cf6bc87.
Rezoo, "Support a recent specification of caffe," Chainer, v7.4.0 . . . v1.1.0 (Jul. 6, 2020) Available online, URL: https://github.com/chainer/chainer/commit/8c03665630e99228f-05d117c5af578c946c056c3.
Wyouhei, "It is fix batchsize in training and evaluation," Chainer, v7.4.0 . . . v1.1.0 (Jul. 6, 2015) Available online, URL: https://github.com/chainer/chainer/commit/f0a69079070eaa94ca12-8b48a414d152eebf2a90.
Muupan, "Add a blank linke between imports for standard libraries and third-par . . . ," Chainer, v7.4.0 . . . v1.1.0 (Jul. 6, 2015) Available online, URL: https://github.com/chainer/chainer/commit/453babbfe4fe5d065c5c705949bad2a08b92a6aa.
Muupan, "Merge redundant functions," Chainer, v7.4.0 . . . v1.1.0 (Jul. 5, 2015) Available online, URL: https://github.com/chainer/chainer/commit/afbf6f565bc5b2408470726fd14be2463d619dc8.
Muupan, "Improve comments," Chainer, v7.4.0 . . . v1.1.0 (Jul. 5, 2015) Available online, URL: https://github.com/chainer/chainer/commit/2a92251c5cecf3726980c738af5e66e7a45c48f3.
Muupan, "Remove unnecessary cuda.using_cumisc() calls," Chainer, v7.4.0 . . . v1.1.0 (Jul. 5, 2015) Available online, URL: https://github.com/chainer/chainer/commit/b343646c43da94b-792ba756f9077b38ddca33668.
Muupan, "Import and use cytpes directly," Chainer, v7.4.0 . . . v1.1.0 (Jul. 5, 2015) Available online, URL: https://github.com/chainer/chainer/commit/4281c7f8b6797cbf2e076e79734ef8b-1375c05fa.
Muupan, "Implement matrix multiplication," Chainer, v7.4.0 . . . v1.1.0 (Jul. 2, 2015) Available online, URL: https://github.com/chainer/chainer/commit/532a336752cada182b49f4da26e19091-27d8ab75.
Masaki Saito, "Replace self.x[i, j] with xd," Chainer, v7.4.0 . . . v1.1.0 (Jul. 1, 2015) Available online, URL: https://github.com/chainer/chainer/commit/825b17ba371230f6fe22e96ed67d395a-79508631.

(56) References Cited

OTHER PUBLICATIONS

Masaki Saito, "Fix comments and use fabs ()," Chainer, v7.4.0 . . . v1.1.0 (Jul. 1, 2015) Available online, URL: https://github.com/chainer/chainer/commit/6894f81f3b63555c9723d17a28e7115-23073ef67.
Sinhrks, "DOC: Add example to lstm doc," Chainer, v7.4.0 . . . v1.1.0 (Jun. 30, 2015) Available online, URL: 1https://github.com/chainer/chainer/commit/c330408ac1a5109fca0866dbdf15f1a30-5843a9a.
Muupan, "Import optimizer module, not Optimizer class," Chainer, v7.4.0 . . . v1.1.0 (Jun. 30, 2015) Available online, URL: https://github.com/chainer/chainer/commit/56029a90d0c22b-c0b84b282c0d5abcfdf013acc4.
Rezoo, "Use log1p() instead of log()," Chainer, v7.4.0 . . . v1.1.0 (Jun. 29, 2015) Available online, URL: https://github.com/chainer/chainer/commit/35e684ffa737beb5109c3587f9b67113bb5ecb2f.
Muupan, "Add a unit test for RMSpropGraves," Chainer (Jun. 29, 2015) Available online, URL: https://github.com/chainer/chainer/commit/878ca291173e3acbc3de48674cad85810d3dcb21.
Muupan, "Implement Alex Graves's RMSprop," Chainer, v7.4.0 . . . v1.1.0 (Jun. 29, 2015) Available online, URL: https://github.com/chainer/chainer/commit/ea28a23a1e965ed30-a08fcbbd5e377c0a0d43365.
Rezoo, "Fix docstring," Chainer, v7.4.0 . . . v1.1.0 (Jun. 29, 2015) Available online, URL: https://github.com/chainer/chainer/commit/7b0c2a2542b17924d7b6c9266af446483167dbc4.
Rezoo, "Rewrite imports in alphabetical order," Chainer, v7.4.0 . . . v1.1.0 (Jun. 29, 2015) Available online, URL: https://github.com/chainer/chainer/commit/ae30ff22ef54c-1c46a5d95b2c78d10ef496db2ef.
Rezoo, "Follow PEP8 style guide," Chainer, v7.4.0 . . . v1.1.0 (Jun. 29, 2015) Available online, URL: https://github.com/chainer/chainer/commit/d1cbd8ed498d018b7fc1e17639e83de573f7ac46.
Rezoo, "Catch up the latest chainer," Chainer, v7.4.0 . . . v1.1.0 (Jun. 29, 2015) Available online, URL: https://github.com/chainer/chainer/commit/8e297bf7a28795e3f38eacc349335ce94bb20cf5.
Kikusu, "Fix return type of chainer.functions.Accuracy#forward_cpp()," Chainer, v7.4.0 . . . v1.1.0 (Jun. 28, 2015) Available online, URL: https://github.com/chainer/chainer/commit/363071008d0fc2912defdcc11ff3abe651b2fd89.
Shohei Hido, "Fix operations along with six for py3," Chainer, v7.4.0 . . . v1.1.0 (Jun. 28, 2015) Available online, URL: https://github.com/chainer/chainer/commit/7c01d03814504b3fabfc-3d54c322cc04d4004be4.
Shohei Hido, "Remove dependency on scikit-learn's fetch_mldata," Chianer, v7.4.0 . . . v1.1.0 (Jun. 27, 2015) Available online, URL: https://github.com/chainer/chainer/commit/a3b2291b91d-7e89191930ca49886c6d8f8da3f8b.
Y-tag, "Fix a typo in the readme of the sentiment analysis example," Chainer, v7.4.0 . . . v1.1.0 (Jun. 27, 2015) Available online, URL: https://github.com/chainer/chainer/commit/42220d811d-df16d1ebfd11bf60d964c0103a248a.
Rezoo, "Use six.moves.range instead of xrange," Chainer, v7.4.0 . . . v1.1.0 (Jun. 25, 2015) Available online, URL: https://github.com/chainer/chainer/commit/f0ed7d01bba22c193-8048eba530f25089bb8995c.
Rezoo, "Resolve conflicts," Chainer, v7.4.0 . . . v1.1.0 (Jun. 25, 2015) Available online, URL: https://github.com/chainer/chainer/commit/5b1533db94eb025eb6e0b87022958ff71af15fea.
Kikusu, "Fix: cannot call clip_grads() at multi_gpu," Chainer, v7.4.0 . . . v1.1.0 (Jun. 24, 2015) Available online, URL: https://github.com/chainer/chainer/commit/f19bdb8c13b3d60d-3e1b426affcc5a7ab532a313.
Rezoo, "Fix the test to fit chainer v1.1.1 style," Chainer, v7.4.0 . . . v1.1.0 (Jun. 23, 2015) Available online URL: https://github.com/chainer/chainer/commit/491352dec3-161e9a6179d5315e35d04c4e89aab1.
Rezoo, "Merge branch 'master' into sigmoid_cross_entrophy_loss," Chainer, v7.4.0 . . . v1.1.0 (Jun. 23, 2015) Available online, URL: https://github.com/chainer/chainer/commit/06702ba652d4e-a087ec67aa1ab5a2b87e61d4d65.
Shohei Hido, "Fix format," Chainer, v7.4.0 . . . v1.0.1 (Jun. 18, 2015) Available online, URL: https://github.com/chainer/chainer/commit/0572bfea1ee1668c94295e3152f6766490373515.
Shohei Hido, "Remove dependency on wget and unzip," Chainer, v7.4.0 . . . v1.0.1 (Jun. 18, 2015) Available online, URL: https://github.com/chainer/chainer/commit/030c52939def854c093-484f7260f786dd6a74d1d.
Rezoo, "Add sigmoid cross entropy function," Chainer, v7.4.0 . . . v1.1.0 (Jun. 18, 2015) Available online, URL: https://github.com/chainer/chainer/commit/a793d6b857753ed61fd746f12cf07088efbd- 6027.
Muupan, "Implement Alex Graves's RMSprop," Chainer, v7.4.0 . . . v1.0.1 (Jun. 16, 2015) Available online, URL: https://github.com/chainer/chainer/commit/84e5f20666d4aa0f-61f1e62c3fcb3303b48ee097.
Y-tag, "Rewrite the redundant code in sentiment analysis example," Chainer, v7.4.0 . . . v1.0.0 (Jun. 12, 2015) Available online, URL: https://github.com/chainer/chainer/commit/eb08013b5ff9-8063f4970dae0502db1fd744c379.
Ttakamura, "EmbedID function should take a vocabulary size as first argument," Chainer, v7.4.0 . . . v1.0.1 (Jun. 12, 2015) Available online, URL: https://github.com/chainer/chainer/commit/466f3722c912c5c7b611090de0febde78ae65d3c.
Y-tag, "Fix a bug in sentiment analysis example when using GPU," Chainer, v7.4.0 . . . v1.0.1 (Jun. 12, 2015) Available online, URL: https://github.com/chainer/chainer/commit/da29d930ea1bfd9-0eeea738d80bba979a851d1e7.
Eerwitt, "Added missing right parenthesis to example," Chainer, v7.4.0 . . . v1.0.1 (Jun. 11, 2015) Available online, URL: https://github.com/chainer/chainer/commit/eda5bf527bd56079-bd1e3e093941389fbe299d01.
Y-tag, "Fix a gap between codes for CPU and GPU in Adam," Chainer, v7.4.0 . . . v1.0.1 (Jun. 10, 2015) Available online, URL: https://github.com/chainer/chainer/commit/d41dc68f2281cd4-5b98fac6a57585e87ab80a203.
Ttakamura "Fix a typ in the recurrent network tutorial," Chainer, v7.4.0 . . . v1.0.1 (Jun. 9, 2015) Available online, URL: https://github.com/chainer/chainer/commit/49eb56debcdc156179f-7c05ca3fea920fa0573e3.
Tgpfeiffer, "Proofread reference/functions," Chainer, v7.4.0 . . . v1.0.0 (Jun. 2, 2015) Available online, URL: https://github.com/chainer/chainer/commit/ce1efb047d32fddffadaf81ca19774055743be27.
Tgpfeiffer, "Proofread reference/Core section," Chainer, v7.4.0 . . . v1.0.0 (Jun. 1, 2015) Available online, URL: https://github.com/chainer/chainer/commit/21f10551ed38fe1a9d95677720fc05a5-60092516.
Tgpfeiffer, "Proofread the Tutorial section," Chainer, v7.4.0 . . . v1.0.0 (Jun. 1, 2015) Available online, URL: https://github.com/chainer/chainer/commit/ea55cbadbbd9dfb4c94f918d76511d86b273e122.
Chainer v1.0.0, Available online, URL: https://github.com/chainer/chainer/releases/tag/v1.0.0 (released on Jun. 5, 2015), Copyright (c) 2015 Preferred Infrastructure, Inc.; Copyright (c) 2015 Preferred Networks, Inc.
Chainer v1.0.1, Available online, URL: https://github.com/chainer/chainer/releases/tag/v1.0.1 (released on Jun. 23, 2015), Copyright (c) 2015 Preferred Infrastructure, Inc.; Copyright (c) 2015 Preferred Networks, Inc.
Chainer v1.1.0, Available online, URL: https://github.com/chainer/chainer/releases/tag/v1.1.0 (Released on Jul. 7, 2015), Copyright (c) 2015 Preferred Infrastructure, Inc.; Copyright (c) 2015 Preferred Networks, Inc.
Chainer v1.1.1, Available online, URL: https://github.com/chainer/chainer/releases/tag/v1.1.1 (released on Jul. 22, 2015), Copyright (c) 2015 Preferred Infrastructure, Inc.; Copyright (c) 2015 Preferred Networks, Inc.

(56) References Cited

OTHER PUBLICATIONS

Chainer, v1.1.2, Available online, URL: https://github.com/chainer/chainer/releases/tag/v1.1.2 (Aug. 5, 2015), Copyright (c) 2015 Preferred Infrastructure, Inc.; Copyright (c) 2015 Preferred Networks, Inc.
Chainer v1.2.0, Available online, URL: https://github.com/chainer/chainer/releases/tag/v1.2.0 (released on Aug. 19, 2015), Copyright (c) 2015 Preferred Infrastructure, Inc.; Copyright (c) 2015 Preferred Networks, Inc.
Chainer v1.3.0, Available online, URL: https://github.com/chainer/chainer/releases/tag/v1.3.0 (released on Sep. 2, 2015), Copyright (c) 2015 Preferred Infrastructure, Inc.; Copyright (c) 2015 Preferred Networks, Inc.
Chainer v1.3.1, Available online, URL: https://github.com/chainer/chainer/releases/tag/v1.3.1 (released on Sep. 16, 2015), Copyright (c) 2015 Preferred Infrastructure, Inc.; Copyright (c) 2015 Preferred Networks, Inc.
Chainer v1.3.2, Available online, URL: https://github.com/chainer/chainer/releases/tag/v1.3.2 (released on Sep. 30, 2015), Copyright (c) 2015 Preferred Infrastructure, Inc.; Copyright (c) 2015 Preferred Networks, Inc.
Chainer v1.4.0, Available online, URL: https://github.com/chainer/chainer/releases/tag/v1.4.0 (Released on Oct. 28, 2015), Copyright (c) 2015 Preferred Infrastructure, Inc.; Copyright (c) 2015 Preferred Networks, Inc.
Office Action dated Jul. 10, 2020 in U.S. Appl. No. 16/551,435 (US 2019-0378018).
Novelty Exception Certificate Submission Form filed on Jul. 5, 2018 in International Application No. PCT/JP2016/004027.
Novelty Exception Certificate Submission Form filed on Nov. 13, 2015 in Japanese Application No. 2015-213293.
Novelty Exception Certificate Submission Form filed on Nov. 13, 2015 in Japanese Application No. 2015-213294.
Tokui, Seiya, "Introduction to Chainer," Video available online, URL: https://video.ibm.com/recorded/64082997 (Jun. 18, 2015).
"Autograd: Efficiently computes derivatives of numpy code," (Archived on Nov. 7, 2017) Available Online, URL: http://web.archive.org/web/20171107184255/https://github.com/HIPS/autograd.
"DyNet documentation," (Searched on Sep. 6, 2019) Available online, URL: https://dynet.readthedocs.io/en/latest/.
Abadi et al., "TensorFlow: Large-Scale Machine Learning on Heterogeneous Distributed Systems," Preliminary White Paper (Nov. 9, 2015) Available online, URL: http://download.tensorflow.org/paper/whitepaper2015.pdf.
Archive of "DyNet documentation," (Nov. 7, 2016), Available online, URL: http://web.archive.org/web/20161107142312/http://dynet.readthedocs.io/en/latest.
Archive of "Keras: The Python Deep Learning Library," (Oct. 23, 2015) Available online, URL: http://web.archive.org/web/20151023033654/https://keras.io/ (Title shown: "Theano-based Deep Learning library").
Bastien et al., "Theano: new features and speed improvements," arXiv (Nov. 23, 2012) Available online, URL: https://arxiv.org/pdf/1211.5590.pdf.
Chollet et al., "Keras: The Python Deep Learning library" (Searched on Sep. 6, 2019) Available Online, URL: http://keras.io/.
Goodfellow et al., "Pylearn2: a machine learning research library," arXiv (Aug. 20, 2013) Available online, URL: https://arxiv.org/pdf/1308.4214.pdf.

Maclaurin et al., "Autograd: Effortless gradients in Pure Python," Available Online, URL: https://docobook.com/autograd-effortless-gradients-inpure-python-in2p3.html.
Maclaurin et al., "Autograd: Effortless Gradients in Numpy," ICML (2015) AutoML Workshop, Available online, URL: https://indico.lal.in2p3.fr/event/2914/contributions/6483/subcontributions/180/attachments/6060/7185/automlshort.pdf (2015).
Ohno "Recent progress in deep learning and challenges for business applications," May 26, 2015, Deep Learning Forum 2015 (Jun. 4, 2015) Available Online, URL: https://www.slideshare.net/KentaOono/20150526-nvidiapublic.
Ohno, "Introduction of deep learning and deep learning framework," Sep. 1, 2015 Seminar hosted by the Japan Neurological Society "Let's use Deep Learning!" Available Online, URL: https://www.slideshare.net/KentaOono/deeplearning-52072261 (Aug. 26, 2015).
Ohno, "Introduction of deep learning framework Chainer And application to compound activity prediction," Sep. 18, 2015 GTC Japan 2015 (Oct. 1, 2015) Available Online, URL: https://www.slideshare.net/KentaOono/2015918-gtc-japan-2015-chainer.
Ohno, "Introduction to Chainer," Sep. 5, 2015 LL Ring Recursive (Sep. 5, 2015), Available Online, URL: https://www.slideshare.net/KentaOono/introduction-tochainer-ll-ring-recursive.
Tokui, "Use Chainer and apply it to natural language processing," NLP Youth Club Meeting Sep. 3, 2015 (Sep. 3, 2015), Available Online, URL: https://www.slideshare.net/beam2d/chainer-52369222 (translation).
Unno "State-of-the-art use of natural language processing technology in companies," Jun. 19, 2015, Institute of Statistical Mathematics Open House, (Jun. 19, 2015), Available Online, URL: https://www.slideshare.net/unnonouno/ss-49606793.
Tutorial III: Deep Learning Implementations and Frameworks https://pakdd16.wordpress.fos.auckland.ac.nz/technical-program/tutorials/ Retrieval Date: Feb. 8, 2022.
Maclaurin et al., "Gradient-based Hyperparameter Optimizaton through Reversible Learning", Proceedings of the 32nd International Conference on Machine Learning, Lille, France, 2015. JMLR: W&CP vol. 37. 10 pages.
"Torch", Scientific Computing Framework For LuaJIT, http:/torch.ch/, 1 page.
Seiya Tokui, "Depths Study Framework Development of Chainer, and future deployment", at the 19th Image Recognition and Understanding Symposium (MIRU), 2016 (tutorial) with a machine translation into English. (Aug. 1, 2016 released) https://www.slideshare.net/beam2d/chainer-64567959.
Seiya Tokui. "Depths Study Framework, Introduction of Chainer, and expectation for FPGA" with a machine translation into English. (Aug. 2, 2015 released) https://www.slideshare.net/beam2d/chainer-atfpgax7.
Atilim Gunes Baydin et al., "Automatic differentiation in machine learning: a survey", (Feb. 20, 2015) Available online, URL: https://arxiv.org/pdf/1502.05767v1.pdf.
Atilim Gunes Baydin et al., "Automatic differentiation in machine learning: a survey," (Apr. 19, 2015) Available online, URL: https://arxiv.org/pdf/1502.05767v2.pdf.
Eldredge et al., "Density Enhancement of a Neural Network Using FPGAs and Run-Time Reconfiguration", presented at IEEE Workshop on FPGAs for Custom Computing Machines, Napa CA, (Apr. 10-13, 1994) pp. 180-188.
Office Action dated Apr. 15, 2022 in U.S. Appl. No. 16/551,435 (US 2019-0378018).
Office Action dated Sep. 28, 2022 in U.S. Appl. No. 16/551,435.

* cited by examiner

Fig. 5

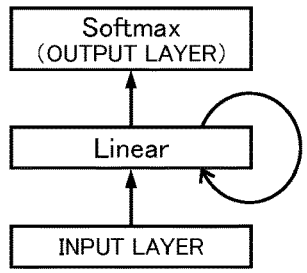

Fig. 6

```
Foward(output[B][O],input[B][I],weight[O][I]):
    ZERO INITIALIZATION OF output()
    for(int b = 0;b < B; b++)
     for(int o = 0;o < O; o++)
      for(int i = 0;i < I; i++)
        output[b][o] += input[b][i]* weight[o][i])
output...OUTPUT VALUE OF THIS LAYER
input...OUTPUT VALUE OF INPUT SIDE LAYER
weight...WEIGHT
B...BATCH SIZE  O...THE NUMBER OF NODES IN LAYER
I...THE NUMBER OF NODES OF INPUT SIDE LAYER
```

Fig. 7

```
Backward(input[B][I],delta[B][O],delta_input[B][I],weight[O][I],delta_weight[O][I]):
    /*ERROR BACK PROPAGATION*/
    ZERO INITIALIZATION OF delta_input()
    for(int b = 0; b < B;b++)
      for(int o = 0; o < O;o++)
        for(int i = 0; i < I;i++)
          delta_input[b][i] += delta[b][o] *weight[o][i]
    /*WEIGHT GRADIENT CALCULATION*/
    ZERO INITIALIZATION OF delta_weight()
    for (int o = 0; o < O;o++)
     for (int i = 0; i < I;i++)
      for (int b = 0; b < B;b++)
        delta_weight[o][i] += delta[b][o]*input[b][i]
``` input...OUTPUT VALUE OF INPUT SIDE LAYER
delta...ERROR FROM OUTPUT SIDE LAYER($\delta_O$)
delta_input...ERROR TO BE PROPAGATED TO INPUT SIDE LAYER($\delta$ )
weight...WEIGHT
delta_weight...WEIGHT GRADIENT($\partial W$)
B...BATCH SIZE  O...THE NUMBER OF NODES IN LAYER
I...THE NUMBER OF NODES OF INPUT SIDE LAYER Fig .8

```
Forward(output[B][N],input[B][N]):
    ZERO INITIALIZATION OF output()
    for (int b = 0; b < B;b++)
     for (int n = 0; n < N;n++)
      output[b][n] += max(0,input[b][n])
output...OUTPUT VALUE OF THIS LAYER
input...OUTPUT VALUE OF INPUT SIDE LAYER
B...BATCH SIZE
N...THE NUMBER OF NODES IN LAYER
(= THE NUMBER OF NODES OF INPUT SIDE LAYER)
```

Fig .9

```
Backward(input[B][N],delta[B][N],delta_input[B][N]):
    for (int b = 0; b < B;b++)
     for (int n = 0; n < N;n++)
      if input[b][n] > 0:
        delta_input[b][n] = delta[b][n]
      else:
        delta_input[b][n] = 0 input...OUTPUT VALUE OF INPUT SIDE LAYER
delta...ERROR FROM OUTPUT SIDE LAYER($\delta_O$)
delta_input...ERROR TO BE PROPAGATED TO INPUT SIDE LAYER($\delta_I$)
B...BATCH SIZE
N...THE NUMBER OF NODES IN LAYER
(= THE NUMBER OF NODES OF INPUT SIDE LAYER)
```

Fig.10

```
Forward(output[B][O][H/SY][W/SX],input[B][I][H][W],weight[O][I][KH][KW]):
ZERO INITIALIZATION OF Output
for(int b = 0; b< B;b++)
 for(int o = 0; o< O;o++)
  for(int i = 0; i< I;i++)
   for(int h = 0; h< H;h+=SY)
    for(int w = 0; w< W;w+=SX)
     for(int kh = 0; kh< KH;kh++)
      for(int kw = 0; kw< KW;kw++)
       output[b][o][h/SY][w/SX]+=input[b][i][h+kh][w+kw]*weight[o][i][kh][kw]
       //OMIT PADDING PROCESSING
output...OUTPUT VALUE OF THIS LAYER
input...OUTPUT VALUE OF INPUT SIDE LAYER
weight...WEIGHT
B...BATCH SIZE
O...THE NUMBER OF OUTPUT CHANNELS
I...THE NUMBER OF INPUT CHANNELS
W...width OF INPUT SIDE LAYER
H...height OF INPUT SIDE LAYER
SX...STRIDE WIDTH IN width DIRECTION
SY...STRIDE WIDTH IN height DIRECTION
KW...width OF FILTER SIZE
KH...height OF FILTER SIZE
```

Fig.11

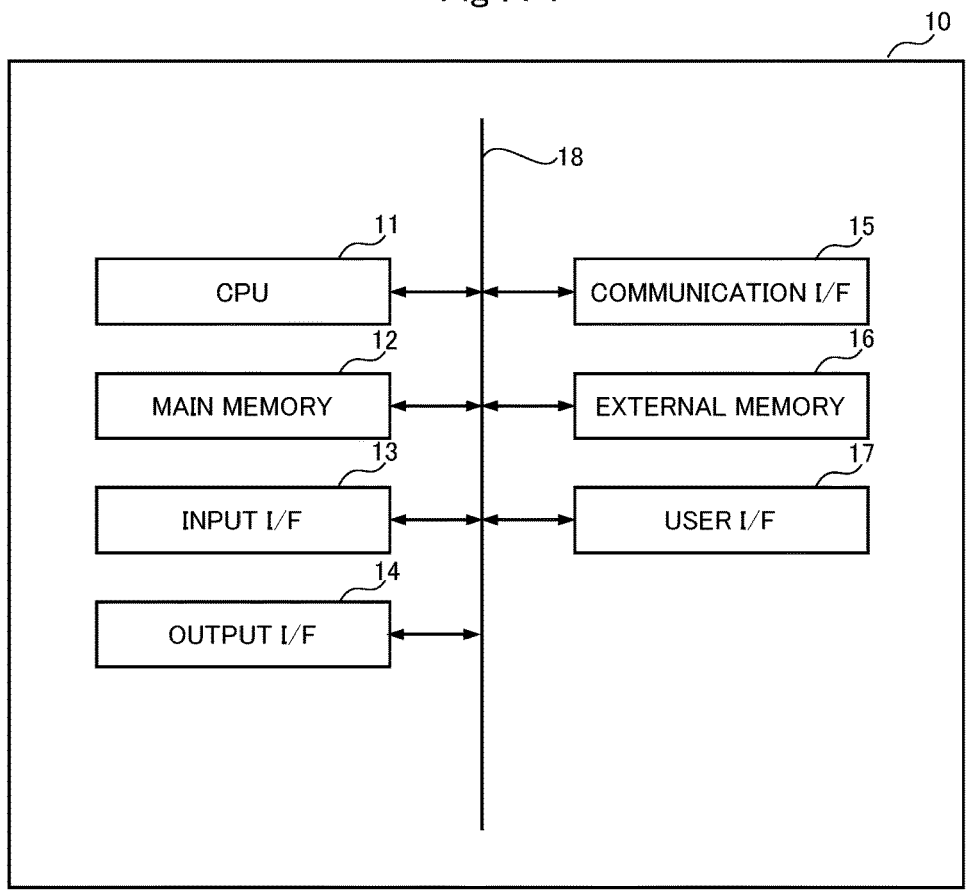

```
1. model = FunctionSet(l1 = F.Linear( 784,1000),
2.                     l2 = F.Linear( 1000,1000),
3.                     l3 = F.Linear( 1000,10))
4. optimizer = optimizers.Adam()
5. optimizer . setup(model)
6. x_data, t_data = load()
7. x, t = Variable(x_data), Variable(t_data)
8. h1 = F.relu(model. l1(x))
9. h2 = F.relu(model. l2(h1))
10. y = model. l3(h2)
11. loss = F.softmax_cross_entropy(y, t)
12. loss. backward()
13. optimizer. update()
```

Fig. 15

```
name: "CaffeSample"
input: "data"
input_dim:784
layer{
 name: "I1"
 type: "InnerProduct"
 bottom: "data"
 top: "relu1"
 inner_product_param{num_output:1000}}
layer{
 name: "relu1"
 type: "ReLU"
 bottom: "I1"
 top: "I2" }
layer{
 name: "I2"
 type: "InnerProduct"
 bottom: "relu1"
 top: "relu2"
 inner_product_param{
          num_output:1000}}
layer{
 name: "relu2"
 type: "ReLU"
 bottom: "I2"
 top: "I3" }
layer{
 name: "I3"
 type: "InnerProduct"
 bottom: "relu2"
 top: "softmax"
 inner_product_param{
          num_output:10}}
layer{
 name: "softmax"
 type: "Softmax"
 bottom: "I3"
 top: "softmax" }
```

Fig. 16

```
1. model = FunctionSet(l1 = F.Linear( 100,100))
2. optimizer = optimizers.Adam()
3. optimizer . setup(model)
4. for i in range(0, 1000):
5.    x_data = load()
6.    x = Variable(x)
7.    y = F.relu(model. l1(x+y))
8.    loss = F.softmax_cross_entropy(y, t)
9.    loss. backward()
10.   optimizer. update()
```

```
1.   model = FunctionSet (l1=F.Linear( 100,100))
2.   optimizer = optimizers.Adam()
3.   optimizer.setup(model)
4.   for i in range (0,1000):
5.       x_data = load()
6.       x = Variable(x)
7.       y = F.relu(model.l1(x+y))
8.       loss = F.softmax_cross_entropy(y,t)
9.       if count & 10 == 0:
10.          loss.backward()
11.          loss.unchain_backward()
12.      optimizer.update()
```

CONFIGURATION ON PC

STRUCTURE DEFINITION EXAMPLE

```
typedef struct MDArray_Tag{
    int num_axis;           /*DIMENSIONALITY*/
    void*data;              /*DATA REGION*/
    int type;               /*TYPE INFORMATION
    int dimensions[MAX_AXIS];/*SIZE INFORMATION*/
}MDArray;
```

MUTUAL CONVERSION AND REFERENCE RELATIONSHIP OF MULTIDIMENSIONAL ARRAY DATA

Fig. 32

```
def forward_cpu(self,x):
        x = _as_mat(x[0])
        Wx = x.dot(self.W.T)
        if self. b is not None:
            Wx += self.b
        return Wx,
```

Fig. 33

STRUCTURE DEFINITION EXAMPLE

```
typedef struct MemoryPool_tag{
  void*buffer_addr[MEM_POOL_MAX_INDEX];/*ADDRESS ARRAY OF MEMORY BUFFER*/
  int buffer_size[MEM_POOL_MAX_INDEX];  /*SIZE ARRAY OF MEMORY BUFFER*/
}MemoryPool;
```

Fig. 34

```
CODING EXAMPLE OF PIPLINING OF PSEUDOCODE

MDArray host_input[100],host_output[100]        //INPUT DATA AND OUTPUT DATA OF HOST DATA REPRESENTATION
MDArray device_input[2],device_output[2]        //INPUT DATA AND OUTPUT DATA OF DEVICE DATA REPRESENTATION
HST2DEVICE(device_input[0],host_input[0])
for i = (1..99):
    HOST2DEVICE_ASYNC(device_input[i%2],host_input[i])
    DEVICE_CALCULATION(device_output[i%2],device_input[(i+1)%2])
    DEVICE2HOST_ASYNC(output_data[i-1],device_output[i%2])
DEVICE_CALCULATION(device_output[1],device_input[0])
DEVICE2HOST(host_output[99],device_output[1])

HOST2DEVICE()...CONVERSION (SYNCHRONIZATION) FROM HOST DATA REPRESENTATION TO DEVICE DATA REPRESENTATION
HOST2DEVICE_ASYNC()...CONVERSION (ASYNCHRONIZATION) FROM HOST DATA REPRESENTATION TO DEVICE DATA REPRESENTATION
DEVICE_CALCULATION()...EXECUTION OF ENTIRE PROCESSING BY OPTIMIZATION IMPLEMENTATION
DEVICE2HOST_ASYNC()...CONVERSION (ASYNCHRONIZATION) FROM DEVICE DATA REPRESENTATION TO HOST DATA REPRESENTATION
DEVICE2HOST()...CONVERSION (SYNCHRONIZATION) FROM DEVICE DATA REPRESENTATION TO HOST DATA REPRESENTATION
```

Fig. 36

```
chnr_forward/backward(FunctionState[]states):
 for s ∈ states : //MEANS THAT states ARE PROCESSED IN ORDER FROM TOP
  switch (s.func_id):
   case id_forward_xxxx_float:
    chnr_forward_xxxx(s.output,s.input,s.weight,s.own_param_xxxx)
    break;
   case id_backward_xxxx_float:
    chnr_backward_xxxx(s.input,s.delta,s.delta_input,s.weight,s.delta_weight,s.own_param_xxxx)
    break;
      :     //COVER ALL FUNCTIONS WHICH EXECUTE Function states...LIST OF Function State
s.func_id...IDENTIFICATION ID OF FUNCTION WHICH EXECUTES Forward/Backward
s.output...ADDRESS OF MULTIDIMENSIONAL ARRAY OUTPUTTED BY Function
s.input...ADDRESS OF MULTIDIMENSIONAL ARRAY INPUTTED BY Function
s.own_param_xxxx...PARAMETER UNIQUE TO Function
s.delta...ERROR FROM OUTPUT SIDE LAYER($\delta$ 0)
s.delta_input...ERROR TO BE PROPAGATED TO INPUT LAYER($\delta$ 1)
s.weight...WEIGHT
s.delta_weight...WEIGHT GRADIENT
```

*THIS PSEUDOCODE INDICATES FLOW OF EXTRACTING, INTERPRETING
AND EXECUTING Function CALL INFORMATION PASSED BY states IN ORDER.
ORDER OF Forward AND Backward PROCESSING IS REVERSE, YET BY PREPARING
LISTS OF Function State FOR Forward AND Backward DURING INTERNAL
STATE INITIALIZATION OF VIRTUAL MACHINE, BOTH PROCESSING
CAN BE EXECUTED BY ONE IMPLEMENTATION

Fig. 37

```
chnr_update_weight(OptimizerState states):
 switch(s.func_id)
   case id_op_update_xxxx_float:
    chnr_op_update_one_xxxx(s.weight,s.delta_weight,s.internal_state,s.own_param_xxxx)
    break;
   case id_op_update_xxxx_fixed:
    chnr_op_update_one_xxxx_fx(s.weight,s.delta_weight,s.internal_state,s.own_param_xxxx)
    break;
      :    //COVER ALL FUNCTIONS WHICH EXECUTE WEIGHT UPDATE s.func_id...IDENTIFICATION ID OF FUNCTION WHICH EXECUTES WEIGHT UPDATE
s.weight...MULTIDIMENSIONAL ARRAY OF WEIGHT
s.delta_weight...MULTIDIMENSIONAL ARRAY OF WEIGHT GRADIENT
s.internal_state...LIST OF INTERNAL STATES OF WEIGHT UPDATE ALGORITHMS
s.own_param...UNIQUE PARAMETER PER WEIGHT UPDATE ALGORITHM
```

Fig. 40

```
from chainer import network_writer as W
writer = W.bytecode_writer
:
:#CODE (INCLUDING node A AND node B) WHICH DEFINES NETWORK CONFIGURATION
:
W.write_network_difinition(nodeA,writer)
W.write_network_difinition(nodeB,writer)
writer.write_network_difinition("./bytecode.bin",DefaultFormat)
```

Fig. 41

```
:#CODE WHICH DEFINES FOLLOWING NETWORK
: A(input)→Convolution2D→B→Linear→C→Softmax→D(output)
:  (A, B, C AND D REPRESENT Variable INSTANCES)
W.write_network_difinition(D,writer) #1
B.unchain_backward()
W.write_network_difinition(D,writer) #2
writer.write_network_difinition("./bytecode.bin",DefaultFormat)
```

Fig .52

CORRESPONDENCE OF OPERABILITY BETWEEN CALCULATOR AND EXECUTING UNIT
(ASSIGNED ○ INDICATES THAT OPERATION IS POSSIBLE)

| | GENERAL-PURPOSE CALCULATOR | GPU | ACCELERATOR |
|---|---|---|---|
| CPU EXECUTING UNIT | ○ | | |
| GPU EXECUTING UNIT(∗) | | ○ | |
| Native EXECUTING UNIT (Python LAYER) | ○ | | |
| IMPLEMENTATION OF Native LAYER | ○ | ○ | ○ |

−∗GPU EXECUTING UNIT CAN BE SEPARATED INTO Python LAYER
AND IMPLEMENTATION UNIQUE TO CALCULATOR OF GPU,
YET THIS IS NOT FUNDAMENTAL ARGUMENT AND THEREFORE IS OMITTED −Native LAYER IS IMPLEMENTED PER CALCULATOR,
AND IS OPERABLE FOR CALCULATORS OF ALL TYPES

−ATTENTION NEEDS TO BE PAID TO THAT ALL OF FOLLOWING INTERFACES ARE DIFFERENT

・INTERFACE WHEN CPU EXECUTING UNIT CALLS IMPLEMENTATION UNIQUE TO CALCULATOR

・INTERFACE WHEN GPU EXECUTING UNIT CALL IMPLEMENTATION UNIQUE TO CALCULATOR

・Native I/F

Fig .53

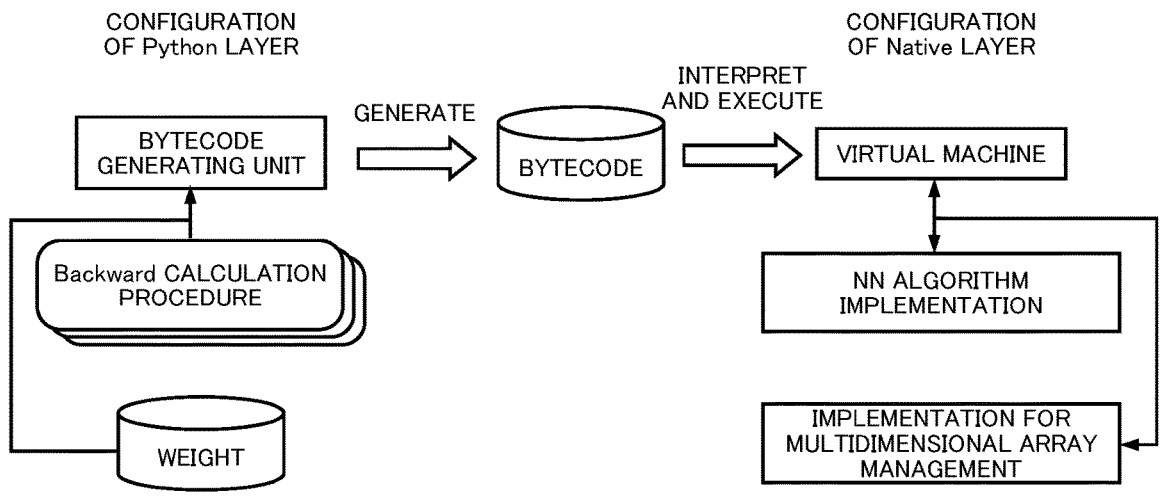

INFORMATION PROCESSING DEVICE AND INFORMATION PROCESSING METHOD

CROSS REFERENCE TO RELATED APPLICATIONS

The present application is a U.S. national phase application under 35 U.S.C. § 371 of PCT Application No. PCT/JP2016/004027, filed on Sep. 2, 2016, and is related to Japanese Patent Application No. 2015-213293, filed on Oct. 29, 2015.

TECHNICAL FIELD

Embodiments disclosed in this description relate to systems and methods for machine learning.

BACKGROUND

In recent years, machine learning which uses neural networks has been used in various fields. When executing such machine learning, developers can create a source code which defines a network structure of a neural network by using a predetermined programming language, cause a personal computer to execute the created source code, and thereby cause this personal computer to execute the machine learning. See non-patent literature: Yangqing Jia, "Caffe", [online], Berkeley Vision and Learning Center, [searched on Sep. 28, 2015], Internet <URL: http://caffe.berkeleyvision.org/>

In a technical problem, in recent years, a framework which enables efficient creation of a source code which defines a network structure of a neural network is necessary.

For a solution, it is therefore an object of various embodiments of the present invention to provide an information processing device and an information processing method which efficiently execute machine learning.

SUMMARY OF EMBODIMENTS

An information processing device according to one aspect includes: an obtaining unit which obtains a source code including a code which defines Forward processing of each layer constituting a neural network; a storage unit which stores an association relationship between each Forward processing and Backward processing associated with each Forward processing; and an executing unit which successively executes each code included in the source code, and which calculates an output value of the Forward processing defined by the code based on an input value at a time of execution of each code, and generates a reference structure for Backward processing in a layer associated with the code based on the association relationship stored in the storage unit.

Furthermore, a computer program according to one aspect causes a computer to function as: an obtaining unit which obtains a source code including a code which defines Forward processing of each layer constituting a neural network; a storage unit which stores an association relationship between each Forward processing and Backward processing associated with each Forward processing; and an executing unit which successively executes each code included in the source code, and which calculates an output value of the Forward processing defined by the code based on an input value at a time of execution of each code, and generates a reference structure for Backward processing in a layer associated with the code based on the association relationship stored in the storage unit.

For advantageous effects, the various embodiments of the present invention can provide an information processing device and an information processing method which efficiently execute machine learning.

BRIEF DESCRIPTION OF THE DRAWINGS

The following drawings depict various examples in which:

FIG. 5 illustrates a schematic view illustrating still another example of the network configuration of the neural network.

FIG. 6 illustrates a view illustrating a pseudocode which realizes calculation executed by Linear during Forward processing.

FIG. 7 illustrates a view illustrating a pseudocode which realizes calculation executed by Linear during Backward processing.

FIG. 8 illustrates a view illustrating a pseudocode which realizes calculation executed by ReLU during Forward processing.

FIG. 9 illustrates a view illustrating a pseudocode which realizes calculation executed by ReLU during Backward processing.

FIG. 10 illustrates a view illustrating a pseudocode which realizes calculation executed by Convolution2D during Forward processing.

FIG. 11 illustrates a schematic view illustrating a hardware configuration example of a learning device according to one embodiment of the present invention.

FIG. 15 illustrates a view illustrating an example of a source code described by Caffe according to the conventional technique.

FIG. 16 illustrates a view illustrating another example of the source code inputted to the learning device according to the one embodiment of the present invention.

FIG. 32 illustrates a view for explaining a memory pool module of the implementing device according to the one embodiment of the present invention.

FIG. 33 illustrates a view for explaining a structure definition example of the memory pool module of the implementing device according to the one embodiment of the present invention.

FIG. 34 illustrates a view illustrating a coding example of pipelining of the implementing device according to the one embodiment of the present invention.

FIG. 36 illustrates a view illustrating an execution flow example of the virtual machine module of the implementing device according to the one embodiment of the present invention.

FIG. 37 illustrates a view illustrating the execution flow example of the virtual machine module of the implementing device according to the one embodiment of the present invention.

FIG. 40 illustrates a view illustrating outputs of a plurality of network configurations of a bytecode generating unit of the implementing device according to the one embodiment of the present invention.

FIG. 41 illustrates a view illustrating a code example of the bytecode generating unit of the implementing device according to the one embodiment of the present invention.

FIG. 52 illustrates a view illustrating an example of cooperation with the existing executing unit according to the one embodiment of the present invention.

FIG. 53 illustrates a view illustrating configuration examples of the bytecode generating unit and a virtual machine according to the one embodiment of the present invention.

DETAILED DESCRIPTION

Figure 1:
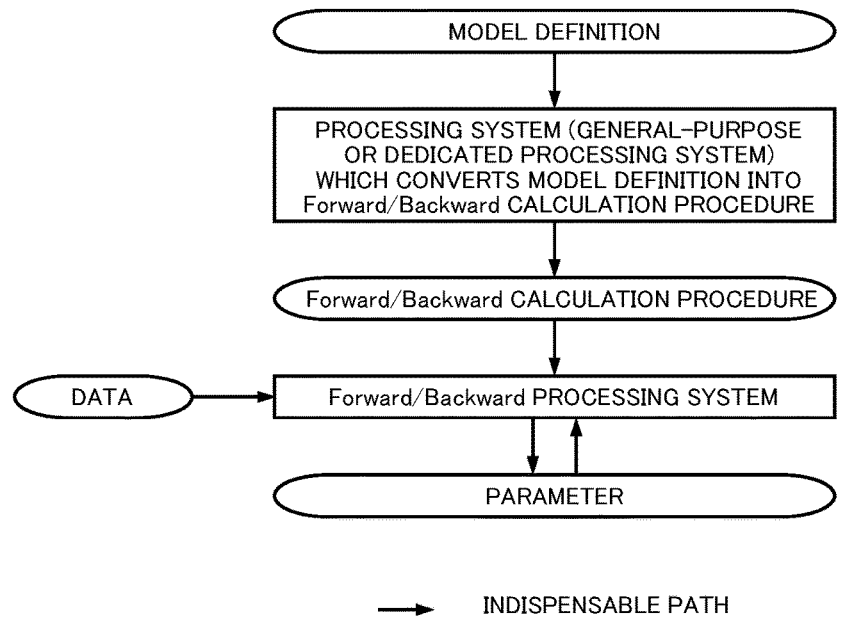
FIG. 1 illustrates a schematic view conceptually illustrating a method called "Define-and-Run" according to a conventional technique.

Various embodiments of the present invention will be described below with reference to the accompanying drawings. In addition, common components in each drawing will be assigned the same reference numerals. First, an information processing device according to an embodiment (a learning device which is an example of the information processing device will be described below) will be described in Part 1. Then, a method for implementing in a built-in chip (built-in semiconductor integrated circuit) an algorithm implemented in the information processing device according to the embodiment will be described in Part 2.

Part 1: Learning Device According to Embodiment

1. Background and Outline

A machine learning algorithm including deep learning is usually formulated as a minimization problem of a total sum of loss functions defined per model. The loss function refers to an index expressed by an error between a model output and a correct answer in a given learning data sample. In this case, a series of processes of inputting data to a model, obtaining an output and comparing the output and a correct answer is referred to as a calculation graph, and a result of this processing is the loss function. The minimization problem of the loss function can be solved by a general method called a gradient method as long as a gradient obtained by differentiating the loss functions can be calculated.

When implemented as a calculator program, there is a method for coding all of the loss function and the gradient by itself. However, it is generally difficult to calculate a gradient of a complicated model, it is usually difficult to explicitly obtain a calculation equation and it is not possible to directly describe the calculation equation as a program. Therefore, there is a second method for using calculation libraries such as Caffe (http://caffe.berkeleyvision.org/), Torch (http://torch.ch/) and Theano (http://deeplearning.net/software/theano/). In addition, the entire contents disclosed in these URLs is incorporated in this description by reference.

According to these libraries, by using a dedicated Mini programming language to describe the loss function as a combination of prepared primitives, it is possible to automatically obtain a gradient function of the loss function, too. This is because a gradient of each primitive is defined, and therefore a gradient of the entire combination can be also obtained by automatic differentiation. That is, when a neural network which is used for deep learning and can be expressed as a large-scale calculation graph can also explicitly express calculation of this loss function by using this Mini programming language, the neural network can perform learning by the gradient method by using a gradient function of the loss functions.

Such calculation libraries have been based on a calculation procedure called "Define-and-Run" by the applicant of this invention. This approach defines (Define) a calculation graph first, derives a gradient by automatic differentiation, and then advances learning (Run) of learning data. This approach has provided an advantage that, when the calculation graph does not have complicated control syntaxes (such as if and for) and does not temporally change, a series of gradient calculations can be compiled as a group at a high speed and prepared during Define, i.e., memory management is unnecessary. However, there is a case of a calculation graph which has increased as a deep learning research has developed and has a complicated control syntax and a case of a model which dynamically changes a calculation graph even under a meta condition which does not depend on data. These cases have had tasks that expressive power of the Mini programming language is low, debug is difficult, a structure cannot be dynamically changed and therefore memory efficiency deteriorates. Therefore, model complexity and a data scale make implementation and execution difficult in some cases.

Therefore, the embodiment proposes a new calculation procedure called "Define-by-Run" by the applicant of this invention. More specifically, the embodiment does not have a graph structure fixed in advance like "Define-and-Run". Alternatively, the embodiment adopts an approach of dynamically extracting and storing the graph structure every learning (Run), adding a meta change and recalculating a gradient as need arises.

Thus, the Mini programming language which defines a graph in advance becomes unnecessary. Consequently, there are effects that cost of design, implementation and maintenance of developers, and learning cost and debug difficulty of the user are removed. Furthermore, the control syntax having a general programming language (C, Java (registered trademark) or Python) can be freely used. Consequently, a neural network having a more complicated graph structure can be easily implemented. By enabling a meta change operation by performing certain conditioning on a graph, it is possible to realize improvement of memory efficiency and flexible learning and application of a model.

Figure 2:
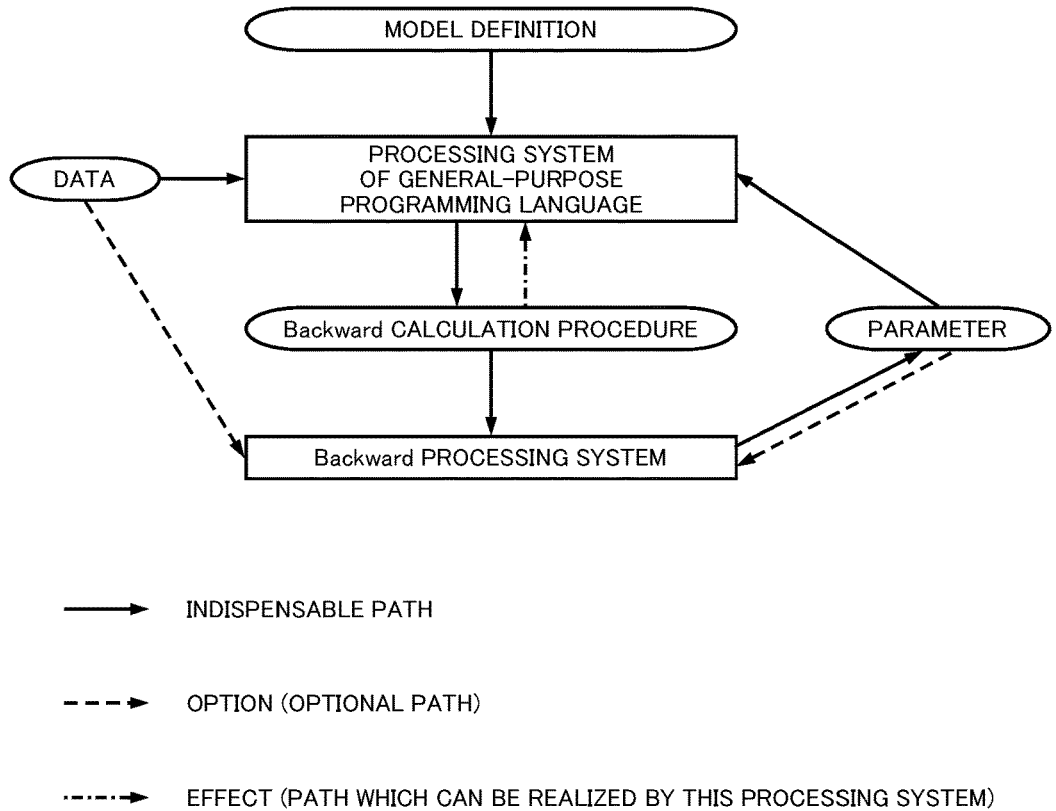
FIG. 2 illustrates a schematic view conceptually illustrating a method called "Define-by-Run" according to an embodiment of the present invention.

A conceptual difference between the method called "Define-and-Run" according to the above conventional technique and the method called "Define-by-Run" according to the embodiment is clear from comparison between FIGS. 1 and 2. FIG. 1 illustrates a schematic view conceptually illustrating the method called "Define-and-Run" according to the conventional technique. FIG. 2 illustrates a schematic view conceptually illustrating the method called "Define-by-Run" according to the embodiment of the present invention. According to a Define-and-run configuration illustrated in FIG. 1, the Mini programming language first inputs only a model definition, and outputs Forward (identification) processing and Backward (learning) processing calculation procedures which are entities of a calculation graph (Define step). In a next step, Forward/Backward processing systems input data and update a parameter (weight) according to the Forward (identification) processing and Backward (learning) processing calculation procedures (Run step). On the other hand, according to a Define-by-run configuration illustrated in FIG. 2, a general-purpose programming language processing system simultaneously executes Forward (identification) processing while inputting a model definition, input data and a parameter, and generates a Backward (learning processing) processing calculation procedure. In this regard, the model definition is defined complying with a grammar of the general-purpose programming language such function call, four arithmetic operations, loop and branch. The Backward (learning) processing calculation procedure can be dynamically changed independently from execution of the Forward (identification) processing. A Backward processing system can be called at an arbitrary timing. The Backward processing system updates the parameter based on the input data and a Forward processing result according to the Backward calculation procedure.

2. Background Art Related to Neural Network 2-1. Basic Processing Flow of Neural Network:

Processing performed by the neural network mainly includes Forward processing, Backward processing and weight update. The Forward processing refers to processing of processing and propagating information from an input layer to an output layer of the neural network.

The Backward processing refers to two processes of error back propagation and weight gradient calculation from the output layer to the input layer of the neural network. The error back propagation refers to processing of propagating an error (δ) obtained from an output side layer to an input side layer. The weight gradient calculation refers to processing of calculating for a layer having a weight a weight gradient (∂W) from the error (∂) obtained from the output side layer and an output value of the input side layer.

The weight update refers to processing of using the weight gradient (∂W) obtained by the weight gradient calculation and updating a weight for a layer having a weight by an algorithm deriving from a stochastic gradient descent method (SGD). This weight update is executed once per batch processing unit.

2-2. Calculation Module which Frequently Appears in Actual Example of Neural Network Each layer constituting the neural network is realized by, for example, layer algorithms listed below.

Linear
ReLu
Dropout
Softmax Cross Entropy
Convolution 2D
Pooling (Average Pooling and Max Pooling)

Typical examples of weight update algorithms are as follows.

momentum-SGD
Adam 2-3. Network Configuration Example of Neural Network (1)

Figure 3:
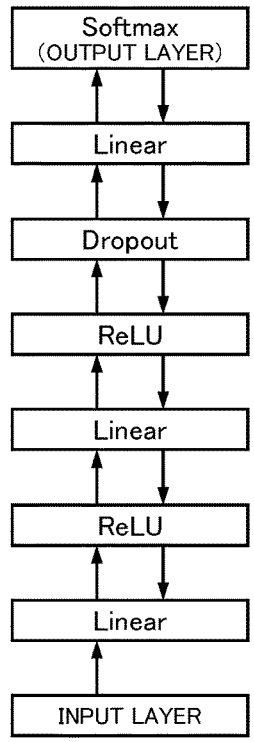
FIG. 3 illustrates a schematic view illustrating an example of a network configuration of a neural network.

FIG. 3 illustrates a schematic view illustrating an example of a network configuration of the neural network. FIG. 3 illustrates the example of the neural network in which six intermediate layers (Linear, ReLU, Linear, ReLU, Dropout and Linear) are arranged between an input layer and an output layer (Softmax). In FIG. 3, rightward arrows indicate Forward processing, and leftward arrows indicate Backward processing. The input layer does not have a weight which needs to be updated. Therefore, the Backward processing is performed on the intermediate layer (the Linear layer arranged adjacent to the input layer in the example illustrated in FIG. 3), too, having the closest weight to this input layer.

2-4. Network Configuration Example of Neural Network (2)

Figure 4:
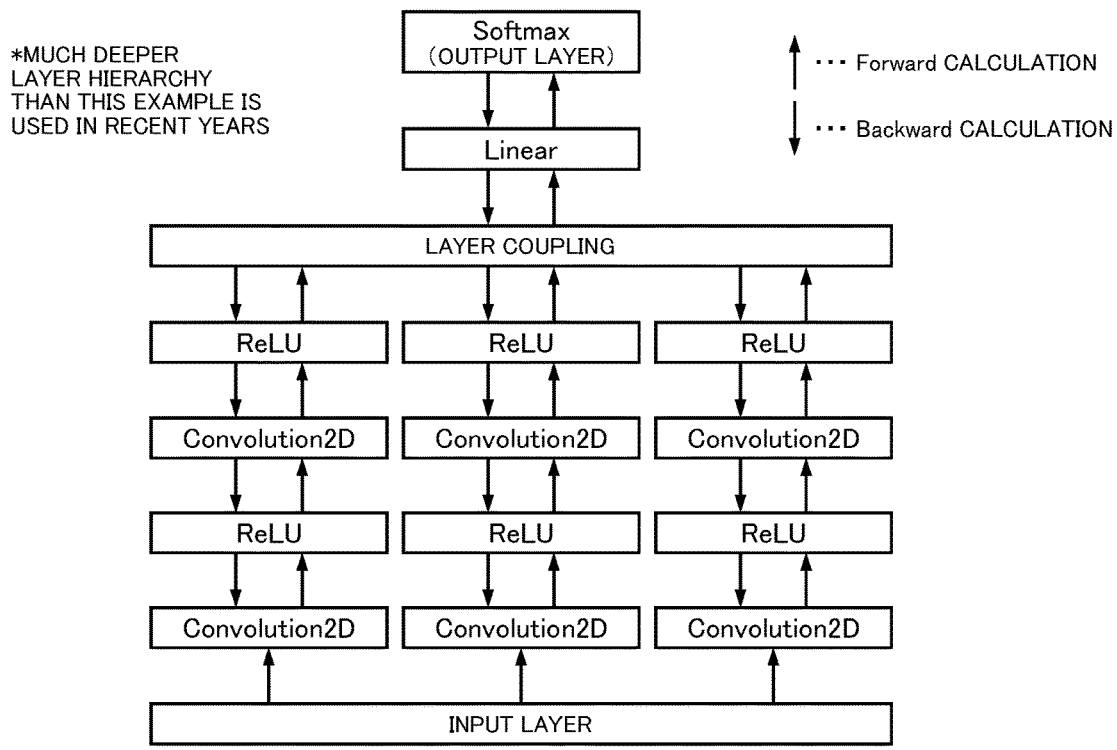
FIG. 4 illustrates a schematic view illustrating another example of the network configuration of the neural network.

FIG. 4 illustrates a schematic view illustrating another example of the network configuration of the neural network. FIG. 4 illustrates the example of the neural network in which a plurality of intermediate layers (Convolution2D, ReLU, Convolution2D and ReLU) arranged in series are arranged in a plurality of (three) rows in parallel between the input layer and the intermediate layer (Linear) arranged adjacent to the output layer (Softmax). In FIG. 4, upward arrows indicate the Forward processing, and downward arrows indicate the Backward processing.

2-5. Network Configuration Example of Neural Network (3)

FIG. 5 illustrates a schematic view illustrating still another example of the network configuration of the neural network. FIG. 5 illustrates the example of the neural network (also referred to as a "Recurrent Neural Network") having a loop. In FIG. 5, a data flow of the Forward processing is indicated by arrows. The intermediate layer (Linear in this case) executes calculation by using as an input of this intermediate layer a value obtained by adding a previous output value of this intermediate layer and a current output value of the input layer. As a method for realizing the Backward processing in this neural network, there is a known method (BPTT) for expanding a network in a time axis direction in advance and converting the network into a network without a loop.

2-6. Layer Algorithm Calculation Contents (Linear)

Linear, which is one of the layer algorithms, executes calculation of repeating an operation of obtaining a weighted average of all nodes of the input side layer a number of times corresponding to the number of nodes in the intermediate layers. FIG. 6 illustrates a view illustrating a pseudocode which realizes calculation executed by Linear during Forward processing. FIG. 7 illustrates a view illustrating a pseudocode which realizes calculation executed by Linear during Backward processing.

2-7. Layer Algorithm Calculation Contents (ReLU)

ReLU, which is one of the layer algorithms, executes calculation of Max (0, val) with respect to each node of the input side layer. This algorithm is a method which is recently used the most for processing (activation function) of adding nonlinearity to calculation of the neural network. FIG. 8 illustrates a view illustrating a pseudocode which realizes calculation executed by ReLU during the Forward processing. FIG. 9 illustrates a view illustrating a pseudocode which realizes calculation executed by ReLU during the Backward processing.

2-8. Layer Algorithm Calculation Contents (Dropout)

Dropout, which is one of the layer algorithms, selects a certain percentage of nodes at random and executes calculation of deactivating an output and error back propagation. This algorithm is unnecessary when only identification is executed (i.e., when learning is not executed).

2-9. Layer Algorithm Calculation Contents (Softmax Cross Entropy):

Softmax Cross Entropy, which is one of the layer algorithms, corrects a value of the input side layer according to a following equation.

$$\frac{\exp(a_i)}{\sum_{j=1}^{n} \exp(a_j)}, i = 1, \ldots, n \qquad \text{[Equation 1]}$$

$a_n$ represents a value of an nth node of the input side layer This layer algorithm is generally used by the output layer. Furthermore, this layer algorithm calculates an error from a difference between a correct answer label (1 or 0) and an output value during the Backward processing.

2-10. Layer Algorithm Calculation Contents (Convolution2D)

Convolution2D, which is one of the layer algorithms, convolutes an image having a data structure of Channel*Width*Height. Both of the input side layer and an output of the input side layer also have a data structure of Channel*Width*Height. This algorithm can also reduce an image size by stride processing. Furthermore, this algorithm inserts a padding in an image of the input side layer. This algorithm has the same calculation structure (which repeats calculating an inner product of an input Channel a number of times corresponding to the number of output Channels) as Linear in a Channel direction.

FIG. 10 illustrates a view illustrating a pseudocode which realizes calculation executed by Convolution2D during the Forward processing. In addition, Convolution2D executes weight gradient calculation and error back propagation during the Backward processing similar to Linear. A loop scale of each processing is the same as the Forward processing.

2-11. Layer Algorithm Calculation Contents (Max Pooling)

Max Pooling, which is one of the layer algorithms, takes a maximum value of an image of the input side layer to reduce the image in vertical and horizontal directions. In addition, a filter size which takes the maximum value and a stride width for image reduction are different in some cases. Furthermore, there is no change in the number of Channels.

2-12. Layer Algorithm Calculation Contents (Average Pooling)

Average Pooling, which is one of the layer algorithms, takes an average value of images of the input side layer to reduce the images in the vertical and horizontal directions. In addition, a filter size which takes the average value and a stride width for image reduction are different in some cases. Furthermore, there is no change in the number of Channels.

2-13. Weight Update Algorithm

The weight update algorithms include various algorithms deriving from the stochastic gradient descent method (SGD). These algorithms are calculated independently per weight element. A calculation equation of the momentum-SGD described above is as follows.

$$\Delta w^{(t)} = \mu \Delta w^{(t-1)} - e \nabla E_t \quad \text{[Equation 2]}$$

$\nabla E_t$ represents a weight gradient calculated during Backward $\Delta W^{(t)}$ represents a weight update amount Furthermore, a calculation equation of Adam described above is as follows.

$$m^{(t)} = \beta_1 m^{(t-1)} + (1-\beta_1) \nabla E_t$$

$$v^{(t)} = \beta_2 v^{(t-1)} + (1-\beta_2) \nabla E_t^2$$

$$\Delta w = \alpha m^{(t)} / (\sqrt{v^{(t)}} + \varepsilon) \quad \text{[Equation 3]}$$

3. Hardware Configuration of Learning Device According to Embodiment

Next, the hardware configuration of the learning device according to the embodiment of the present invention will be described. FIG. 11 illustrates a schematic view illustrating the hardware configuration example of the learning device according to the one embodiment of the present invention.

As illustrated in FIG. 11, a learning device 10 includes a CPU 11, a main memory 12, an input I/F 13, an output I/F 14, a communication I/F 15, an external memory 16 and a user I/F 17. These components are electrically connected with each other via an internal bus 18. In addition, the learning device 10 can also selectively include a GPU (not illustrated).

The CPU 11 loads an operating system and various programs such as a program (a program used to create a source code) which supports a programming language (such as Python) from the external memory 16 to the main memory 12, and executes a command included in the loaded program. The main memory 12 is used to store the programs to be executed by the CPU 11, and is composed of a DRAM, for example.

The input I/F 13 has a function of importing output data of a measuring device (not illustrated) and is connected with each component via the internal bus 18. In this regard, various items of measurement data which are outputs of the measuring device include information obtained by a sensor such as a temperature, a humidity, position information and image data. The various items of measurement data may be time series data such as movie data or a temperature data row obtained by measuring a temperature at certain intervals. The output I/F 14 receives data from each component via the internal bus 18, and outputs the data to an output device (not illustrated) outside the learning device. In this regard, the data outputted to the output device is assumed as, for example, control information for driving a motor and control information for a buzzer, a control switch, an accelerator or a brake of an automobile and an information output device such a liquid crystal display.

The communication I/F 15 is implemented as hardware, firmware, communication software such as a TCP/IP driver or a PPP driver or a combination thereof. The communication I/F 15 is configured to be able to communicate various pieces of information with a server device which is not illustrated via a communication network 20. The external memory 16 is composed of a magnetic disk drive or a flash memory, for example. The external memory 16 stores the operating system and various programs such as a program (a program used to create a source code) which supports a programming language (such as Python).

The learning device 10 according to the one embodiment employing the above configuration can function as a learning device which performs machine learning by causing the CPU 11 (and, in addition, the GPU selectively) to execute a predetermined program loaded from the external memory 16 to the main memory 12. For example, the learning device 10 which performs machine learning can be realized as a learning device which is modeled by the neural network by causing the CPU 11 (and, in addition, the GPU selectively) to execute the various programs.

The learning device 10 employing the above configuration can be mounted on a corresponding individual device (equipment). Furthermore, the learning device 10 can be connected with a corresponding measuring device and a corresponding output device. These measuring device and output device are mounted on a corresponding individual device (equipment) in some cases or connected as other devices by using a communication unit.

In the one embodiment, the learning device 10 is an arbitrary information processing device which can execute machine learning, and includes, for example, personal computers, tablets, mobile telephones, smartphones, mobile information terminals, touch pads and the information processing serves, yet is not limited to these.

4. Function Blocks of Learning Device According to Embodiment

Figures 12, 13:
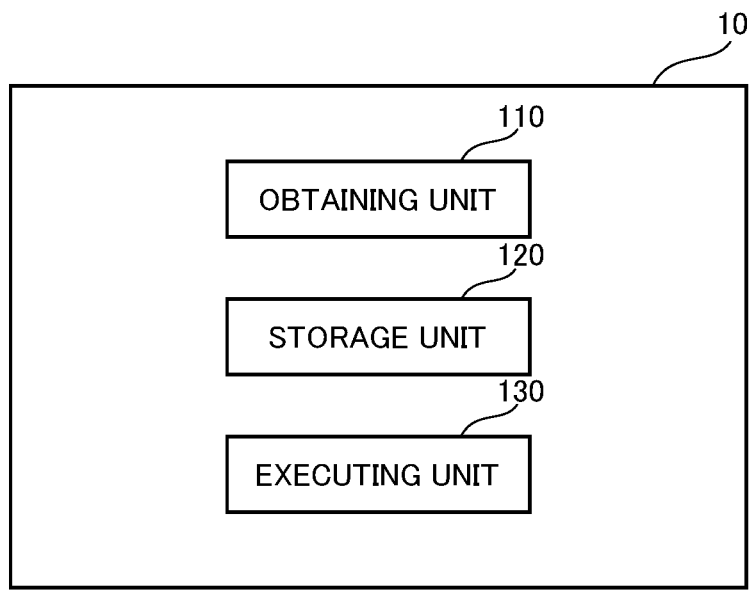
FIG. 12 illustrates a block diagram schematically illustrating a function example of the learning device according to the one embodiment of the present invention.
FIG. 13 illustrates a view illustrating an example of a source code inputted to the learning device according to the one embodiment of the present invention.

Next, the functions of the learning device 10 employing the above configuration will be briefly described. FIG. 12 illustrates a block diagram schematically illustrating a function example of the learning device according to the one embodiment of the present invention.

The learning device 10 according to the embodiment is based on the method called "Define-by-Run" as described above. More specifically, the learning device 10 according to the embodiment includes a mechanism which dynamically generates information of a network configuration which is necessary for Backward processing and weight update processing at a timing to execute Forward processing of the neural network by a general procedural language including branch, loop and function call, and thereby can actually execute the Backward processing and the weight update processing.

To realize such "Define-by-Run", the learning device 10 according to the one embodiment mainly includes an obtaining unit 110, a storage unit 120 and an executing unit 130 as illustrated in FIG. 12. The obtaining unit 110 obtains a source code including a code which defines the Forward processing of each layer constituting a neural network. More specifically, this source code is created by using a predetermined programming language (e.g., Python) by using a text editor by a developer or a user. The obtaining unit 110 obtains this source code. This obtaining unit 110 can be realized by collaboration of, for example, the CPU 11, the main memory 12, the external memory 16 and the user I/F 17 illustrated in FIG. 11.

The storage unit 120 stores an association relationship between each of a plurality of the Forward processing which can be defined by the source code, and the Backward processing associated with each Forward processing. According to the association relationship stored in the storage unit 120, the Forward processing included in a plurality of Forward processing is associated with the corresponding Backward processing on a one-to-one basis. That is, according to the association relationship stored in the storage unit 120, the Forward processing associated with Linear and the Backward processing associated with this Forward processing are associated for the Linear layer (intermediate layer). (An association relationship between the Forward processing and the Backward processing associated on a one-to-one basis is used to execute processing associated with the Forward processing when the Backward processing is executed by using a reference structure for the Backward processing. When, for example, the Forward processing is executed in order of A→B→C, the Backward processing is executed in order of C→B→A. However, both processes of the Forward processing and the Backward processing is as a pair implemented for each function of A to C, so that it is possible to realize this Backward processing.) In addition, the storage unit 120 can store various pieces of information including various libraries used for the source code obtained by the obtaining unit 110 and a program language associated with this source code. This storage unit 120 can be realized by collaboration of, for example, the CPU 11, the main memory 12 and the external memory 16 illustrated in FIG. 11.

The executing unit 130 successively executes each code included in the source code obtained by the obtaining unit 110 (stored in in the storage unit 120). This executing unit 130 can calculate an output value of the Forward processing defined by each code based on an input value at a time of execution of each code. Furthermore, this executing unit 130 can generate a reference structure between objects in a layer associated with each code at a time of execution of each code. This executing unit 130 can be realized by collaboration of, for example, the CPU 11, the main memory 12 and the external memory 16 illustrated in FIG. 11.

Furthermore, to realize the above "Define-by-Run" method, the learning device 10 according to the one embodiment uses the above obtaining unit 110, storage unit 120 and executing unit 130 to use three classes, i.e., three classes of Function, Variable and Optimizer. In addition, these classes are named for the sake of convenience, and are not limited to these names. First, the Function class is a class defined by pairing the Forward processing and the Backward processing. This Function class defines a specific layer algorithm exemplified in above "2-6" to "2-12" as a subclass. Next, the Variable class is a class which manages data inputted and outputted between Functions. This Variable class plays a role of concealing a difference between the GPU and the CPU. Furthermore, this Variable class includes a method (unchain_backward described below) of unchaining the Backward processing of the network including loop within a finite range. Furthermore, the Optimizer class is a class which updates a weight.

5. Operation Example 1

Next, a specific example of an operation performed by the learning device 10 according to the embodiment employing the above configuration will be described. FIG. 13 illustrates a view illustrating an example of a source code inputted to the learning device according to the one embodiment of the present invention. In addition, it needs to be born in mind that the source code illustrated in FIG. 13 is intentionally simplified for a purpose of explaining features of the learning device according to the present embodiment. Furthermore, row numbers described at a left end in FIG. 13 are assigned to explain this specific example and are not included in the actual source code. Hereinafter, the present embodiment will describe a case where the source code is described by Python, for example. However, the source code may be described by a programming language other than Python. Details of Python are disclosed in https://www.python.org/. In addition, the entire contents disclosed in this URL is incorporated in this description by reference.

First, the developers create the source code illustrated in FIG. 13 by using the text editor. The source code created in this way is obtained by the obtaining unit 110 (see FIG. 12) of the learning device 10 and is stored in the storage unit 120. Next, the executing unit 130 executes each code included in the source code stored in the storage unit 120 one row by one row. When the source code illustrated in FIG. 13 does not include the control syntax such as an if sentence or a for sentence, the executing unit 130 successively executes the first row to the last row from the top to the bottom one row by one row. On the contrary, when the source code includes the control syntax, the executing unit 130 executes each code in the order according to the control syntax.

The contents of the source code illustrated in FIG. 13 will be described. The first row to the third row describe registration of Function including a parameter of FunctionSet. More specifically, the first row to the third row register Functions (instances l1, l2 and l3 of a Linear class which are Function subclasses which define a layer algorithm which performs an inner product in this example) which have weights in an object of a FunctionSet class. The weights of Functions having the weights can be updated by Optimizer. FunctionSet is a mechanism which enhances code readability by grouping Functions updated by Optimizer.

The fourth row and the fifth row describe initialization of Optimizer. The fourth row generates an instance of an Optimizer (a class which updates a weight) subclass in which the algorithm Adam has been implemented. Adam processing contents is to execute update of each weight element by the equation described in above "2-13". The fifth row passes a Function list having the weights defined in the first row to the third row to a setup method of the instance of the Optimizer subclass generated in the fourth row. This setup method is executed to initialize an internal state of the Optimizer subclass for updating the weights included in the Function list passed by this method.

The sixth row describes loading of input data. That is, the sixth row illustrates processing of reading input data x and t from a file. In this example, x holds data of a large information amount such as an image or speech. t holds a label ID (data of a small information amount for answer check) associated with x.

The seventh row describes that a Variable object holds input data. That is, the seventh row generates an object of the Variable class which holds the input data. The "Define-by-Run" function is realized by mutual dependence between the Variable object and the Function object. Arbitrary input data does not have a mechanism which realizes the "Define-by-Run" function. Therefore, it is necessary to take a procedure that an instance of the Variable class explicitly holds the input data.

The eight row to the eleventh row describe execution of Forward processing. More specifically, the eighth row to the eleventh row execute the Forward processing based on description of a general programming language. The "Define-by-Run" function simultaneously executes this definition and generates a reference structure for the Backward processing. The instance of the Function class and the instance of the Variable class mutually refer to each other, so that it is possible to express the association relationship between arbitrary processing and data. It is obvious that the Variable class represents data and the Function class represents processing. A data structure which expresses the Backward calculation procedure illustrated in FIG. 2 by using this reference structure is defined as the reference structure for the Backward processing. The reference structure for the Backward processing grows every time basic calculation (fourth arithmetic operations and exponentiation) of the Variable object and Function call of making the Variable object an argument or a return value are performed. Therefore, even description of the Forward processing including branch, loop or function call for other than Function or Variable can generate the reference structure for the Backward processing. The basic calculation of the Variable object is also associated with each Function subclass.

The twelfth row describes execution of the Backward processing. More specifically, the twelfth row executes the Backward processing by calling a Backward method of a loss variable (the instance of the Variable class) obtained as an execution result of the Forward processing executed in the eighth row to the eleventh row. The Backward processing is automatically executed in reverse order of the Forward processing by tracking the reference structure for the Backward processing generated during execution of the Forward processing.

The thirteenth row describes weight update. More specifically, the thirteenth row calculates a weight gradient as a result of the execution of the Backward processing in the twelfth row. When an update method of the instance of the Optimizer subclass is called as in the thirteenth row, the weight is updated by using this weight gradient. Different functions are used to call the update method for the Optimizer subclass and call the backward method of the Variable class. Consequently, it is possible to partially execute the Backward processing, and then update the weights. This is effective when a weight does not need to be updated for already learned Function.

As contents processed during the Forward processing, the contents processed by the code described in the eighth row in particular is focused upon. The eight row describes h1=F.relu(model.l1(x)).

During execution of "model.l1(x)", a following reference structure for the Backward processing is generated.

$$x \leftarrow (\text{splitter}) \leftarrow x' \leftarrow l1' \leftarrow y \qquad \text{[Equation 4]}$$

In the reference structure, x' represents a Variable object obtained by copying x; l1' represents a copy (shallow copy) of l1; and y represents a value (Variable object) returned by the forward method of l1'. Splitter represents an instance of a class which manages network branch. The shallow copy is an object copy method for not copying data which an object internally refers to when copying the object. By performing the shallow copy, it is possible to avoid duplication of weight data of the Function instances, for example. Furthermore, an arrow means a reference direction of an object. For example, description of A←B means that a member of an object of B includes reference to an object of A.

The reference structure is the following reference structure for the Backward processing after execution of "F.relu(".

$$x \leftarrow (\text{splitter}) \leftarrow x' \leftarrow l1' \leftarrow y \leftarrow (\text{splitter}) \leftarrow y' \leftarrow relu' \leftarrow h1 \qquad \text{[Equation 5]}$$

Generation of the reference structure for the Backward processing during execution of the code described in the eighth row has been described. However, it goes without saying that reference structures are generated likewise during execution of the codes described in the ninth row and the tenth row, too. As described above, during execution of the Forward processing, function call in a natural format generates the reference structure for the Backward processing. At this point of time, the Backward processing is executable from h1 as a point of origin. A flow of processing executed by the Backward processing system when the Backward processing is actually executed from h1 is as follows:

relu' to which an instance of h1 refers to is tracked to call Backward processing of relu'. An input at this point of time is an error value held by h1, and an output result is stored in an instance of y'. An association of data inputted and outputted by this Function instance is defined for each of the Forward processing/Backward processing defined per Function subclass. Next, splitter tracked from relu' via y' copies an error value held by y' to y. (A reason for insertion of splitter will be described in a next section). Next, l1' is tracked from y to execute Backward processing of l1'. An input at this point of time is an error value held by y, and an output result is stored in an instance of x'. Furthermore, a weight error is also calculated. The weight error is calculated from an output value during Forward stored in x' and the error value held by y. When x which is an end of the reference structure for the Backward processing is tracked likewise below, the Backward processing ends.

In addition, the reason that Splitter is inserted in the reference structure will be described for confirmation. When "model.l1(x)" is called again immediately after creation of the reference structure, the following reference structure is generated.

$$x \leftarrow (\text{splitter}) + \begin{array}{l} \leftarrow x' \leftarrow l1' \leftarrow y \leftarrow (\text{splitter}) \leftarrow y' \leftarrow relu' \leftarrow h1 \\ \leftarrow x'' \leftarrow l1'' \leftarrow z \end{array} \qquad \text{[Equation 6]}$$

In the reference structure, l1" represents a copy (shallow copy) of l1 (an instance different from l1'); x" represents the Variable object obtained by copying x (an instance different from x'); and z represents a value (Variable object) returned by the forward method of l1".

When an error value is propagated from the output side layer during the Backward processing, a splitter instance sets as an error of x a result obtained by adding and synthesizing error values propagating to x' and x". By inserting splitter in this way, it is possible during the Backward processing to propagate the error from all Functions which use x as an input during the Forward processing.

Figure 14:
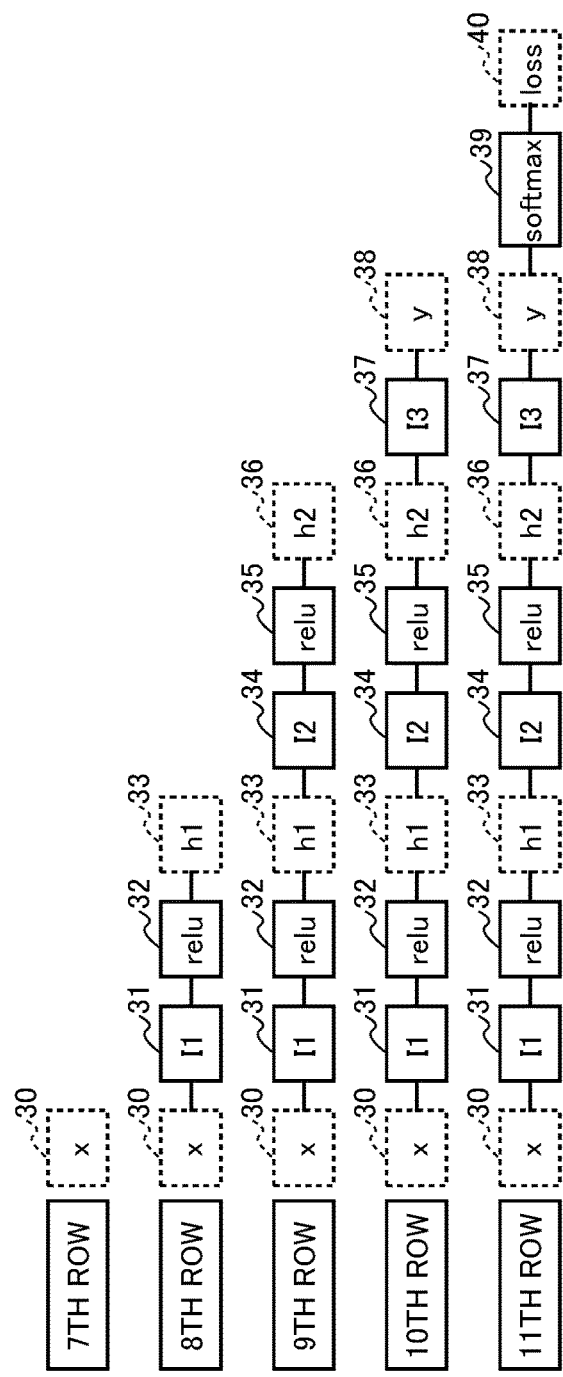
FIG. 14 is a schematic view conceptually illustrating a network configuration of a neural network generated by the source code illustrated in FIG. 13.

Next, the network configuration of the neural network generated when the source code illustrated in FIG. 13 is executed will be supplemented. FIG. 14 is a schematic view conceptually illustrating the network configuration of the neural network generated by the source code illustrated in FIG. 13. In addition, in FIG. 14, dotted line blocks indicate variable instances, and solid line blocks indicate functions.

First, at a time of execution of the seventh row, an instance 30 of a variable x and an instance of a variable t are generated. For ease of description, FIG. 14 illustrates only the instance 30 of the variable x. However, in reality, the instance of the variable t is also generated likewise. At the time of execution of the seventh row, the instance of the variable x actually holds data such as an image and speech.

Next, at a time when the executing unit 130 executes the eighth row, there is generated the neural network in a state where, subsequently to the instance 30 of the variable x, a function "l1" 31, a function "relu" 32 and an instance 33 of a variable h1 successively grow. It needs to be born in mind that, at the time of the execution of the eighth row, an execution result of the Forward processing described in the eight row has already been held by the instance 33 of the variable h1. Furthermore, at the time of the execution of the eighth row, the reference structure for the Backward processing generated at a current point of time is generated as described above.

Next, at a time when the executing unit 130 executes the ninth row, there is generated the neural network in a state where, subsequently to the instance 33 of the variable h1, a function "l2" 34, a function "relu" 35 and an instance 36 of a variable h2 successively grow. It needs to be born in mind that, at the time of the execution of the ninth row, an execution result of the Forward processing described in the ninth row has already been held by the instance 36 of the variable h2. Furthermore, at the time of the execution of the ninth row, the reference structure for the Backward processing generated at a current point of time is generated as described above.

Similarly, at a time when the executing unit 130 executes the tenth row, there is generated the neural network in a state where, subsequently to the instance 36 of the variable h2, a function "l3" 37 and an instance 38 of a variable y successively grow. It needs to be born in mind that, at the time of the execution of the tenth row, an execution result of the Forward processing described in the tenth row has been held by the instance 38 of the variable y. Furthermore, at the time of the execution of the tenth row, the reference structure for the Backward processing generated at a current point of time is generated as described above.

Lastly, at a time when the executing unit 130 executes the eleventh row, there is generated the neural network in a state where, subsequently to the instance 38 of the variable y, a function "Softmax" 39 and an instance 40 of a variable loss successively grow. It needs to be born in mind that, at the time of the execution of the eleventh row, an execution result of the Forward processing described in the eleventh row has already been held by the new stance 40 of the variable loss. Furthermore, at the time of the execution of the eleventh row, the reference structure for the Backward processing generated at a current point of time is generated as described above. At the time of the execution of the eleventh row, the Forward processing described in the source code has been finished. That is, at the time of the execution of the eleventh row, a difference between a result of identification performed by the finally generated neural network and a true identification result provided by the variable t is held by the instance 40 of the variable loss. By using this difference as an input, Backward processing of a next step is executed.

After the Forward processing described in the eighth row to the eleventh row is finished, the executing unit 130 next executes the twelfth row to execute the Backward processing. The reference structure for the generated Backward processing has already been generated. Therefore, by executing the Backward processing based on this reference structure, the executing unit 130 can calculate a weight gradient of each intermediate layer (only each intermediate layer having a weight) included in the neural network.

Next, the executing unit 130 executes the thirteenth row. Thus, the weight gradient calculated by executing the twelfth row is used to update the weight of each intermediate layer (only each intermediate layer having the weight). That is, learning is executed.

Thus, according to the learning device according to the present embodiment, the developers can construct the neural network by a method for describing one row by one row which instance of which variable holds an execution result obtained by giving which instance of which variable to which function in the Forward processing. Consequently, the developers can easily describe intuitively the Forward processing in the source code. Furthermore, by describing the Forward processing in the source code (without being conscious of the Backward processing) and causing the learning device according to the present embodiment to execute this source code, the developers can cause the learning device to automatically execute the Backward processing.

6. Comparative Example 1

Next, a case where processing equivalent to the processing executed by the source code illustrated in FIG. 13 is described by Caffe according to the conventional technique will be described to show superiority of the learning device according to the present embodiment. FIG. 15 illustrates a view illustrating an example of a source code described by Caffe according to the conventional technique.

As illustrated in FIG. 15, in a block surrounded by { } described immediately after a term "layer", a layer (corresponding to Function in the present embodiment) definition is described. A method according to this conventional technique needs to explicitly indicate an inter-layer dependence relationship in the code. For example, descriptions of "top" and "bottom" indicate the inter-layer dependence relationship. "bottom" represents from which layer an input to a layer is obtained; "top" represents to which layer a processing result of a layer is outputted.

This method according to the conventional technique needs to statically define a network configuration prior to learning and identification processing performed by the neural network. That is, the method needs to define the network configuration of the neural network first, and then cause this neural network to execute learning and identification. Therefore, it is difficult to dynamically change the network configuration according to a data property. By contrast with this, as described above with reference to FIG. 14, the learning device according to the present embodiment executes the Forward processing associated with each code at a time of execution of each code which defines the neural network configuration. That is, definition of the neural network configuration and execution of the Forward processing according to this configuration are executed at the same timing. Consequently, it is possible to easily change dynamically the network configuration according to a data property. For example, a branch may be added to the code in FIG. 13 to switch a layer which executes the Forward processing according to a value of the variable t or a data size of the variable x. Furthermore, the code in FIG. 19 can give a variable value as input data, for example instead of a constant "10" in the ninth row.

Furthermore, according to the method according to the conventional technique, when creating the source code, the developers need to describe a definition of the network configuration of the neural network so as to be able to appropriately perform both of the Forward processing and the Backward processing. By contrast with this, the learning device according to the present embodiment does not need to be conscious of whether or not it is possible to appropriately perform the Backward processing as described above with reference to FIG. 14. The Forward processing (network configuration) is simply described, and then the learning device is caused to execute the source code, so that the learning device automatically executes the Backward processing. Consequently, the developers can simply and efficiently construct the neural network and cause the neural network to execute identification and learning.

Furthermore, according to the method according to the conventional technique, when creating the source code, the developers take a procedure of defining the neural network and then substituting data (input data and teacher data) to the neural network defined in this way so as to be able to appropriately execute both of the Forward processing and the Backward processing. Therefore, it is difficult to intuitively describe the source code. On the other hand, according to the learning device according to the present embodiment, the developers describe the source code by a method for describing one row by one row which instance of which variable holds an execution result obtained by giving which instance of which variable to which function at a time at which the Forward processing (network configuration) is described one row by one row. Consequently, the developers can intuitively describe the source code.

7. Operation Example 2

Next, another specific example of an operation performed by the learning device 10 according to the embodiment employing the above configuration will be described. FIG. 16 illustrates a view illustrating another example of the source code inputted to the learning device according to the one embodiment of the present invention. In addition, it needs to be born in mind that the source code illustrated in FIG. 16 is intentionally simplified for a purpose of explaining features of the learning device according to the present embodiment. Furthermore, row numbers described at a left end in FIG. 16 are assigned to explain this specific example and are not included in the actual source code.

A point that the learning device according to the present embodiment can also easily construct the neural network by using a control syntax (a for sentence in this case) will be described with reference to a source code illustrated in FIG. 16.

The first row to the third row are the same as the first row to the fifth row in the source code illustrated in FIG. 13, and therefore will not be described in detail.
The fourth row describes performing loop processing of processing described in the fifth row to the tenth row until a value of i becomes 0 to 1000. The fifth row and the sixth row are the same as the sixth row and the seventh row in the source code illustrated in FIG. 13, and therefore will not be described in detail. The seventh row describes adding y which is the processing results of the function l1 and the function relu, to an argument of l1 again. The eighth row to the tenth row are the same as the eleventh row to the thirteenth row in the source code illustrated in FIG. 13, and therefore will not be described in detail.

Figure 17:
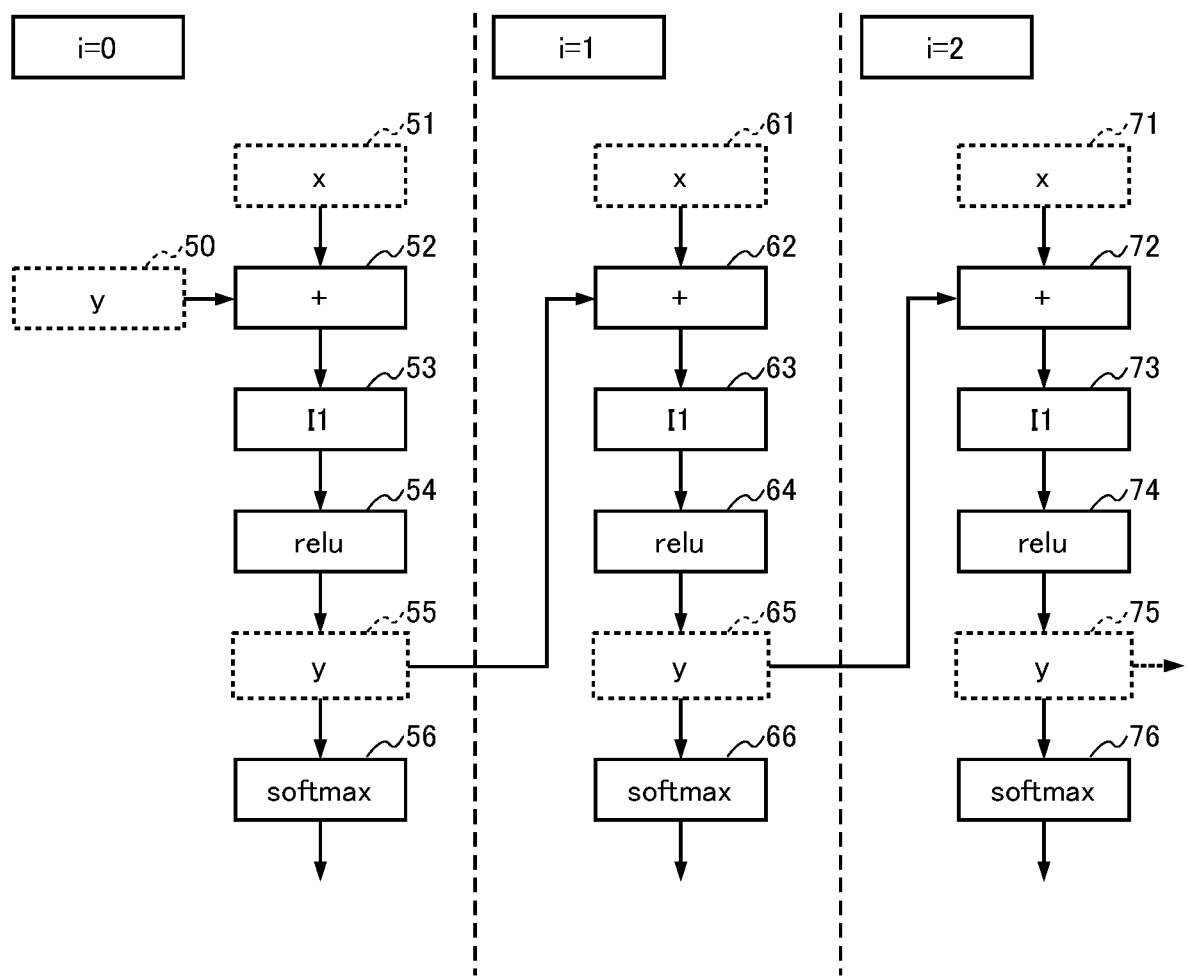
FIG. 17 is a schematic view conceptually illustrating the network configuration of the neural network generated by the source code illustrated in FIG. 16.

FIG. 17 is a schematic view conceptually illustrating the network configuration of the neural network generated by the source code illustrated in FIG. 16. In addition, in FIG. 17, dotted line blocks indicate variable instances, and solid line blocks indicate functions. Furthermore, FIG. 17 illustrates only a neural network configuration generated only when the variable i is 0 to 2 for ease of description.

As is obvious from FIGS. 16 and 17, the learning device according to the present embodiment can easily construct even the neural network in which the same configuration including instances of variables and functions is repeated a plurality of times (in this case, a configuration where, subsequently to a function 52 of adding an instance 51 of the variable x and an instance 50 of the variable y, a function "l1" 53 and a function "relu" 54 successively continue, and an output value of the function "relu" 54 is held by the instance of the variable y) by using a simple control syntax (the for sentence in this case). That is, the source code used by the learning device according to the present embodiment has a high affinity with control syntaxes of programming languages.

8. Comparative Example 2

Figures 18, 19:
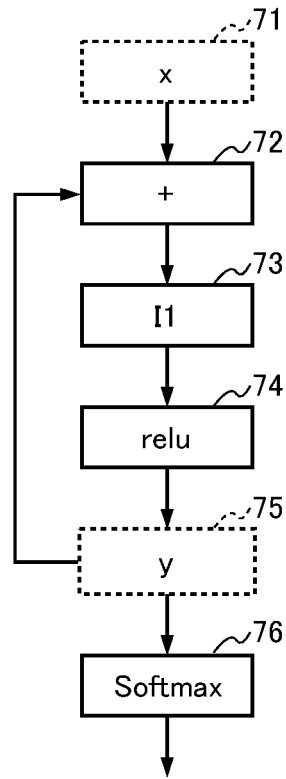
FIG. 18 is a schematic view conceptually illustrating the network configuration of the neural network generated by a source code described by Caffe according to the conventional technique.
FIG. 19 illustrates a view illustrating still another example of a source code inputted to the learning device according to the one embodiment of the present invention.

Next, a case where processing equivalent to the processing executed by the source code illustrated in FIG. 16 is described by Caffe according to the conventional technique will be described to show superiority of the learning device according to the present embodiment. FIG. 18 is a schematic view conceptually illustrating the network configuration of the neural network generated by a source code described by Caffe according to the conventional technique.

When the same neural network as those illustrated in FIGS. 16 and 17 is constructed by Caffe according to the conventional technique, a neural network configuration cannot be defined by using a control syntax. Therefore, the developers first define a basic configuration illustrated in FIG. 18. Next, the developers need to specially describe processing of giving an initial value of an instance 75 of the variable y to a function 72, and giving an instance 75 of the variable y of a previous time and an instance 71 of a variable x of a current time to the function 72 (a bold arrow portion in FIG. 18). When the neural network in which the basic configuration is repeated multiple times is constructed or the neural network including a multilayer structure is constructed, the developers need to make special description every time the basic configuration is repeated multiple times or per layer in the multilayer structure.

By contrast with this, according to the learning device according to the present embodiment, the source codes described as illustrated in FIGS. 16 and 17 do not need to be specially described by using a control syntax of a programming language and can be simply described. Consequently, the learning device according to the present embodiment can easily and efficiently construct a complicated or large-scale neural network.

9. Additional Function (1)

The learning device according to the one embodiment may be able to execute a function of unchaining the reference structure for the Backward processing. More specifically, when an unchain-backward method of the instance of the Variable class is called, the reference structure for the Backward processing traveling from this instance as a point of origin to the input side is unchained. For example, the following reference structure for the Backward processing is assumed to be generated by executing the Forward processing (a detailed configuration such as splitter is omitted).

A (input layer)←Convolution2D←B←Linear←C←Softmax←D (output layer)

In this regard, A, B, C and D represent instances of the Variable classes. Convolution2D, Linear and Softmax represent instances of the Function class. In this case, when B. unchain_backward( ) is called, the reference structure for the Backward processing is unchained from B as a point of origin, and there is a following change as a result.

B←Linear←C←Softmax←D (output layer)

An aspect of application of this unchain_backward method to the source code illustrated in FIG. 16 will be studied. In this source code, the seventh row adds y which is processing results of the function l1 and the function relu to the argument of the function l1 again. The "Define-by-Run" mechanism generates a copy of y when describing "x+y", and then couples the reference structure for the Backward processing generated by the Forward processing executed so far. Therefore, as the loop is repeated in this example, the reference structure for the Backward processing continues growing. The Backward processing executed by the ninth row is executed for the grown reference structure for the Backward processing. The processing in the ninth row is included in the loop, and therefore a calculation time of this entire loop processing is proportional to a square of a loop size.

FIG. 19 illustrates a view illustrating still another example of a source code inputted to the learning device according to the one embodiment of the present invention. Furthermore, row numbers described at a left end in FIG. 19 are assigned to explain this specific example and are not included in the actual source code.

By changing the source code illustrated in FIG. 16 and calling unchain_backward on a regular basis in the eleventh row as illustrated in FIG. 19, it is possible to suppress an increase in the calculation time. The ninth row describes execution of processing of the tenth row to the twelfth row every time loops subsequent to the fourth row are executed ten times. The eleventh row calls unchain_backward and discards the reference structure for the Backward processing from loss as the point of origin. Consequently, it is possible to suppress the calculation time of the entire loop processing to a short time.

Thus, even when the Forward processing including loops in the reference structure is learned by using unchain_backward, it is possible to suppress an excessive growth of the reference structure for the Backward processing and execute learning processing with a reasonable calculation amount. Furthermore, another embodiment can also use unchain_backward so as not to update a weight of specific Function.

10. Additional Function (2)

The learning device according to the one embodiment can designate a volatile attribute during initialization of the instances of the Variable class. When the volatile attribute is valid, the reference structure for the Backward processing is not generated by the Forward processing of inputting this Variable.

When only the Forward processing is executed by using a learned weight (i.e., when the Backward processing does not need to be executed), if processing of generating the reference structure for the Backward processing is executed during execution of the Forward processing, wastes of an execution speed and a memory usage are caused. In this case, by designating the volatile attribute during the initialization of the instances of the Variable class which holds input data of the Forward processing, it is possible to stop generation of the reference structure for the Backward processing, and efficiently execute only the Forward processing.

11. Additional Remark

The embodiment where the source code described by Python is inputted to the learning device has been described as the most preferable embodiment. However, the technique disclosed in this description is not limited to the case where the source code described by Python is used. That is, the technique disclosed in this description is applicable likewise even in a case of use of a source code which can realize at least one of calculating an output value of the Forward processing described in each code based on an input value at a time when the learning device executes each code, generating the reference structure for the Backward processing every time the learning device executes the Forward processing described in each code (to be able to execute the Backward processing based on this reference structure), and defining the neural network configuration by using the control syntax, and which is described by a programming language (such as R, Julia, Sparkz and MLib) equivalent to Python.

The technique disclosed in this description can be realized by executing the source code described by Python and the programming language equivalent to Python. Instead, the technique may be realized by executing a module or a library described by Python or the programming language equivalent to Python.

In this description, names used to identify the variables, the functions, the methods, the classes and the subclasses do not limit the technique disclosed in this description and may be arbitrary names.

The processes and the procedures described in this description can be realized not only by the components explicitly described in the embodiment but also by software, hardware or a combination thereof. More specifically, the processes and the procedures described in this description are realized by implementing logics corresponding to the processes in media such as an integrated circuit, a volatile memory, a non-volatile memory, a magnetic disk and an optical storage. Furthermore, the processes and the procedures described in this description can be implemented as computer programs and executed by various computers.

Even though that the processes and the procedures described in this description are executed by a single device, software, a component or a module is described, these processes or procedures can be executed by a plurality of devices, a plurality of software, a plurality of components and/or a plurality of modules. Furthermore, even though that data, a table or a database is stored in a single memory is described in this description, such data, table or database can be stored in a distributed manner in a plurality of memories of a single device or in a plurality of memories arranged in a distributed manner in a plurality of devices. Furthermore, software and hardware elements described in this description can be realized by being integrated into a fewer components or being disintegrated into more components.

Part 2 (Method for Implementing Algorithm in Built-In Chip)

1. Background

Deep learning is an algorithm which can obtain high performance yet requires a large-scale computation amount and memory usage and a learning sample amount to the contrary. The spread of GPUs and clouds which can provide abundant calculation resources at low cost and a web infrastructure which can share learning samples is a background which supports a recent rise of the deep learning. There are various environments (libraries and frameworks) which assist deep learning algorithm development. Multiple development environments have functions of improving a learning speed by using a GPU.

Fields such as automobile full automatic driving and high versatile robot control require high information processing capability for analyzing information obtained from various sensors such as cameras and a LIDAR (Light Detection and Ranging or Laser Imaging Detection and Ranging) in real time and controlling an infinite number of motors and solving a task. Therefore, an application of deep learning which has capability completely different from the conventional deep learning is greatly expected. However, these fields depend on built-in environment of poor calculation resources compared to GPUs and clouds due to demands of safety, chip prices and consumption power. Therefore, an application of deep learning which needs high calculation resources is slow. Factors that the application of the deep learning to the built-in environment is slow include that requests for such algorithm calculation resources exceed performance of realistic and economic built-in environment, and, in addition, implementations such as software environment in the first place which support the deep learning are not sufficient. In the built-in environment, too, hardware performance is improving year by year. The deep learning algorithm is continuing to improve to relax demands for the calculation resources. Therefore, the former factor is expected to be gradually solved.

A task solved by the embodiment of the present invention is to develop a framework for designing the deep learning algorithm which operates while meeting a product level request of a built-in chip to break through a barrier against application to the built-in environment of the deep learning mainly remaining in terms of the software environment and accelerate a development speed. Expanding, for the built-in environment, functions of the learning device according to the embodiment which is a GPU-based framework yet provides high productivity for development of the deep learning algorithm, and is described in above Part 1 is regarded as optimal means for solving the task. Therefore, the task of the application to the built-in environment which focuses on the learning device according to the embodiment will be described hereinafter in the next paragraph.

2. Task of Implementing a Method According to an Embodiment

The learning device according to the embodiment described in above Part 1 depends on an advanced language function and library. Therefore, operating on a built-in semiconductor chip an algorithm which operates in this learning device as is is likely to bring following problems. First, in terms of security, an increase in a scale of a library or a language increases a degree of dependence of an application on an unknowable implementation in reality. Accordingly, there is a higher risk that a failure included in such an implementation becomes a failure of a chip product. Next, in terms of a footprint, an implementation of a library and a language runs short of memory resources of the chip product. Furthermore, in terms of an overhead, calculation resources of the chip product cannot be fully used via a library having a highly abstracted API. It is indispensable to tune low-level performance specialized in a chip for at least large-scale calculation required by the neural network. For the above reasons, it is highly probable that simply operating the algorithm which operates in the learning device according to the embodiment on the built-in semiconductor chip cannot satisfy the product level request.

3. Concept of Implementing a Method According to an Embodiment

The implementing method according to the embodiment realizes in the shortest period a state where an algorithm of a new neural network (NN) designed in a personal computer having rich calculation resources satisfies the product level requirement of an arbitrary built-in chip (built-in semiconductor integrated circuit) and is operable. For this purpose, desirably, developers who design the algorithm and developers who are deeply conscious of hardware can work independently. The present embodiment proposes a technical idea related to a device (framework) which helps the developers work independently.

4. Development Step Assumed During Built-In Chip Development

The following three steps are assumed as steps taken to develop the built-in chip.

Step I: A state where a code (a code described by Python, for example) used for the learning device according to the embodiment is operating on a PC (+a GPU). This state is a state where design and inspection of the algorithm which uses a neural network employing a complicated configuration is realized by a small number of code descriptions. This is a concept of the above "Define-by-Run" method.

Step II: A state where there is an implementation optimized for a chip and a Python code in a mixed manner. This state is a state where operation check and performance inspection on the chip of the algorithm designed for the learning device according to the embodiment are realized without substantially changing the Python code.

Step III: A state where the algorithm designed for the learning device according to the embodiment is operated only by the implementation optimized for the chip. This state is a state where the product level specification requirement of the chip is satisfied and then the algorithm operates (a highly real-time collaborating operation with another module or a control mechanism can be performed on the chip).

The implementing method according to the present embodiment proposes the framework which allows advancement of development in a short term by skipping an effort of recorrection, redesign and relearning during above steps I to III when a new algorithm is developed by using the learning device according to the embodiment.

4-1. Step I

Figure 20:
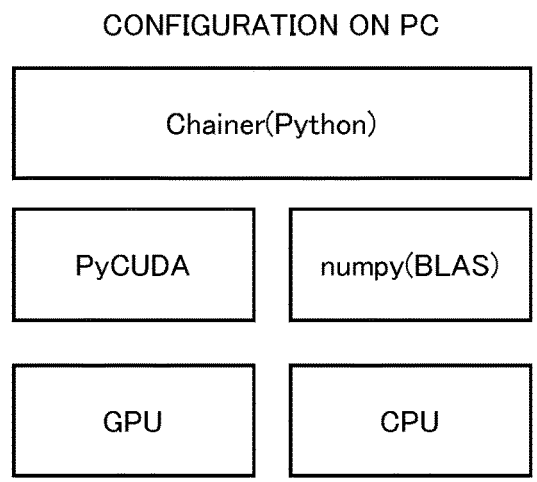
FIG. 20 illustrates a schematic view for explaining step I of an implementing method according to the embodiment of the present invention.

FIG. 20 illustrates a schematic view for explaining step I of the implementing method according to the embodiment of the present invention. A configuration illustrated in FIG. 20 is a configuration supposed by the learning device according to the embodiment described in above Part 1. That is, according to this configuration, the source code described by Python according to one aspect of the programming language uses PyCUDA according to one aspect of a library and numpy (BLAS) according to one aspect of a library, and these libraries drive the GPU and a general-purpose calculator, respectively. In addition, "Chainer" illustrated in FIG. 20 is a name given by the applicant of this invention to the framework for describing the source code used by the learning device according to the embodiment described in above Part 1.

4-2. Step II

Figure 21:
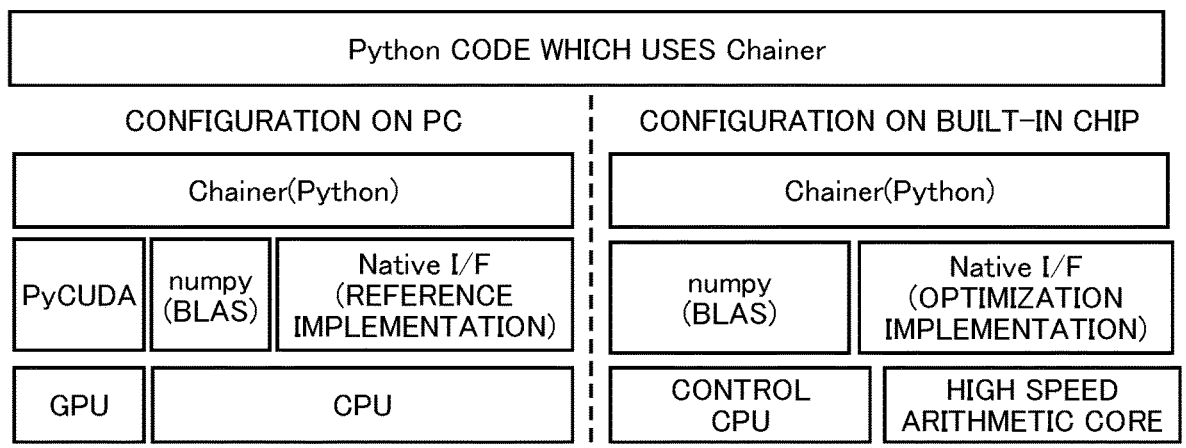
FIG. 21 illustrates a schematic view for explaining step II of the implementing method according to the embodiment of the present invention.

FIG. 21 illustrates a schematic view for explaining step II of the implementing method according to the embodiment of the present invention. A configuration illustrated in FIG. 21 executes a front end of Chainer on Python. As illustrated in FIG. 21, the present embodiment provides the Native I/F (e.g., an interface for calling an implementation equivalent to a main function of Chainer described by a low-standard language such as the C language). Consequently, the same code can carry out execution on the PC and execution optimized for the built-in chip.

Figure 22:
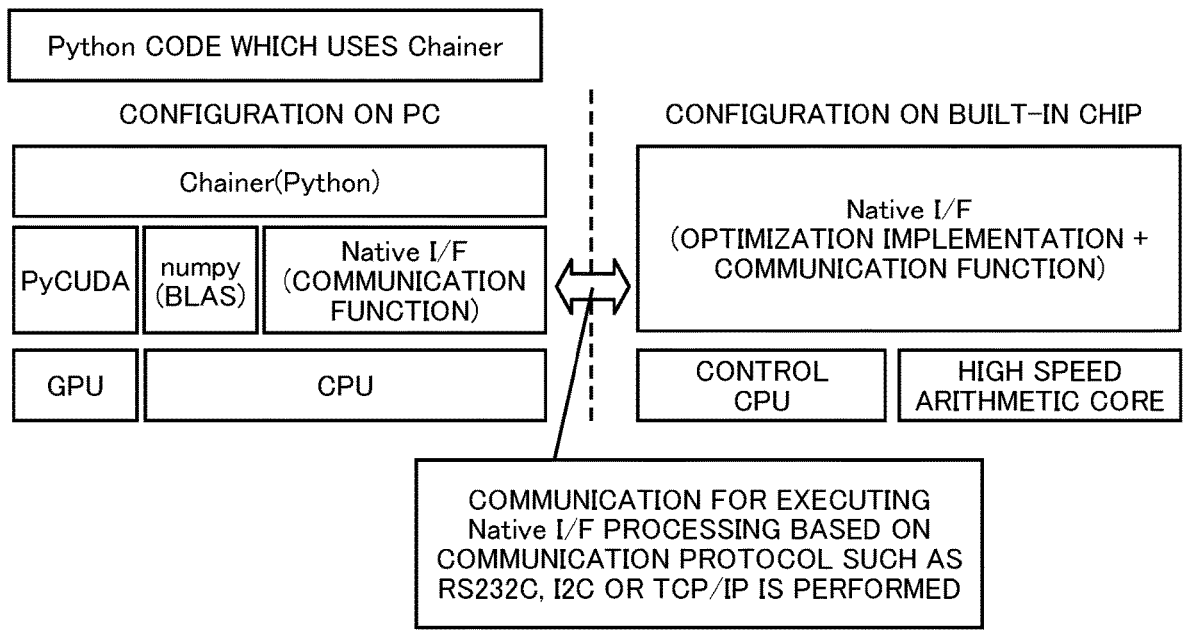
FIG. 22 illustrates a schematic view for explaining that an executing unit which uses Python and an executing unit which uses a chip communicate.

FIG. 22 illustrates a schematic view for explaining that the executing unit which uses Python and the executing unit which uses a chip communicate. As illustrated in FIG. 22, it is also possible to remove dependence on Python from the configuration on the built-in chip by providing the communication function to the implementation of the Native I/F (drive the optimization implementation on the built-in chip from Chainer on the PC).

Implementation of Native I/F: A reference code (e.g., a low-standard language such as the C language is assumed) is implemented in Function and Optimizer of Chainer. This reference code is implemented without depending on an external library such as numpy. Furthermore, a mechanism of a memory pool suitable for a dynamic network definition is implemented. Furthermore, a data convert function for numpy is created in addition to Function/Optimizer. Furthermore, a floating point version reference code of above Function/Optimizer is created. Furthermore, a fixed point version reference code of above Function/Optimizer is created. Furthermore, a data convert function between the floating point and the fixed point is created in addition to Function/Optimizer. A reason for creating the fixed point version reference code is that not few chips are provided with FPUs. A code optimized for various chips based on the reference code is implemented.

4-3. Step III

Figure 23:
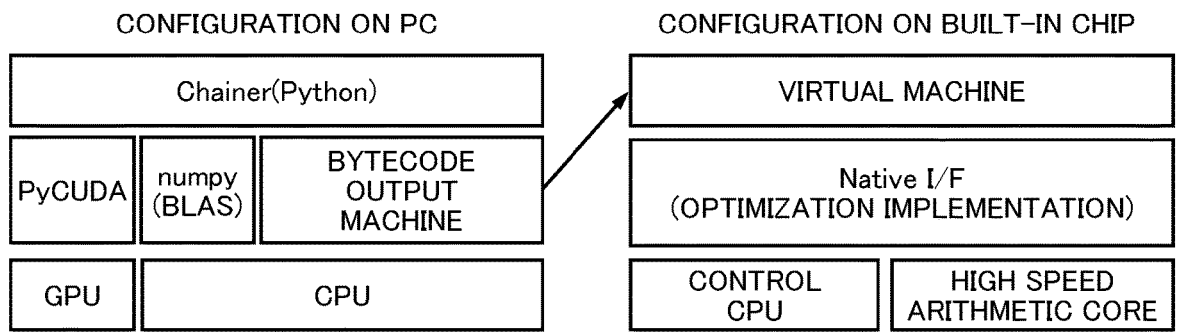
FIG. 23 illustrates a schematic view for explaining step III of the implementing method according to the embodiment of the present invention.

FIG. 23 illustrates a schematic view for explaining step III of the implementing method according to the embodiment of the present invention. As illustrated in FIG. 23, a method for outputting a network definition and a weight as bytecodes from Chainer is added. Furthermore, there is provided a virtual machine which interprets the bytecodes and executes processing of the neural network (the Forward processing, the Backward processing and weight update). It is possible to appropriate the optimization implementation for the Native I/F chip.

Figure 42:
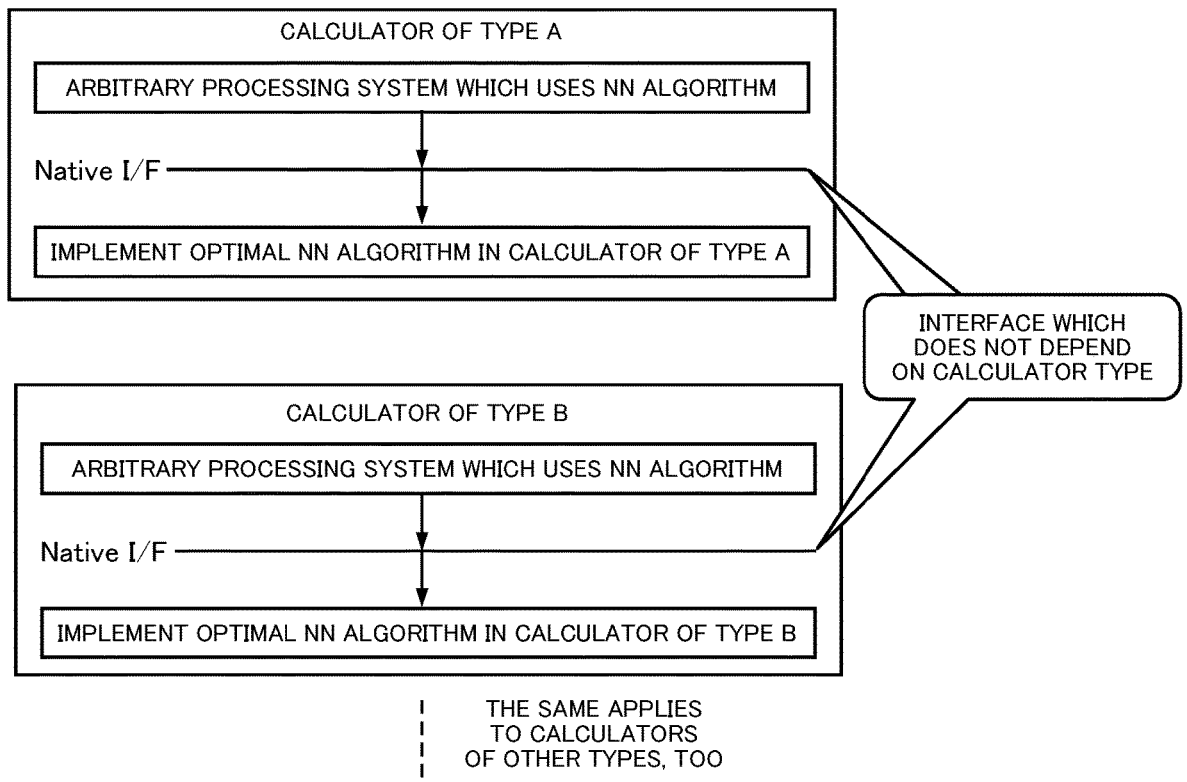
FIG. 42 illustrates a view illustrating a configuration example of a Native OF according to the one embodiment of the present invention.

Configuration 1 (Configuration of Native IF): FIG. 42 illustrates a view illustrating a configuration example of the Native I/F according to the one embodiment of the present invention. This configuration is a configuration including an interface which does not depend on a calculator type per NN algorithm. A processing system which uses the NN algorithm instructs a specific calculator to execute the algorithm via this interface. The interface described herein is a unit which defines an input data format and an output data format, and an association between an input data format processing method and the output data format. When the interface is the same, the same output result is obtained from the same input. For example, this applies to a function described by the C language and a function declaration of this function. A processing system on a side which uses an NN algorithm is not limited in particular. For example, the processing system on the side which uses NN algorithm is an existing framework (e.g., Chainer) for NN design. Furthermore, the processing system on the side which uses the NN algorithm includes the processing system, too, developed together with algorithm development.

The calculator described herein means a device which executes calculation. The calculator is a device which includes an arithmetic core, a memory hierarchy and necessary hardware resources to execute calculation. The general-purpose calculator means a generally used calculator. The general-purpose calculator is a calculator on which a Linux (registered trademark) OS and a conventional algorithm including Python easily operate. The accelerator described herein means a device which executes specific calculation including calculation of the NN algorithm at a high speed. The GPU described herein is a calculator which is a calculator specialized in image processing yet has capability to execute general-purpose calculation, too. The GPU includes one mode of the accelerator. These components are software assets such as CUDA, and therefore, easiness to implement the NN algorithm is an intermediate level between the general-purpose calculator and a general accelerator.

Figure 43:
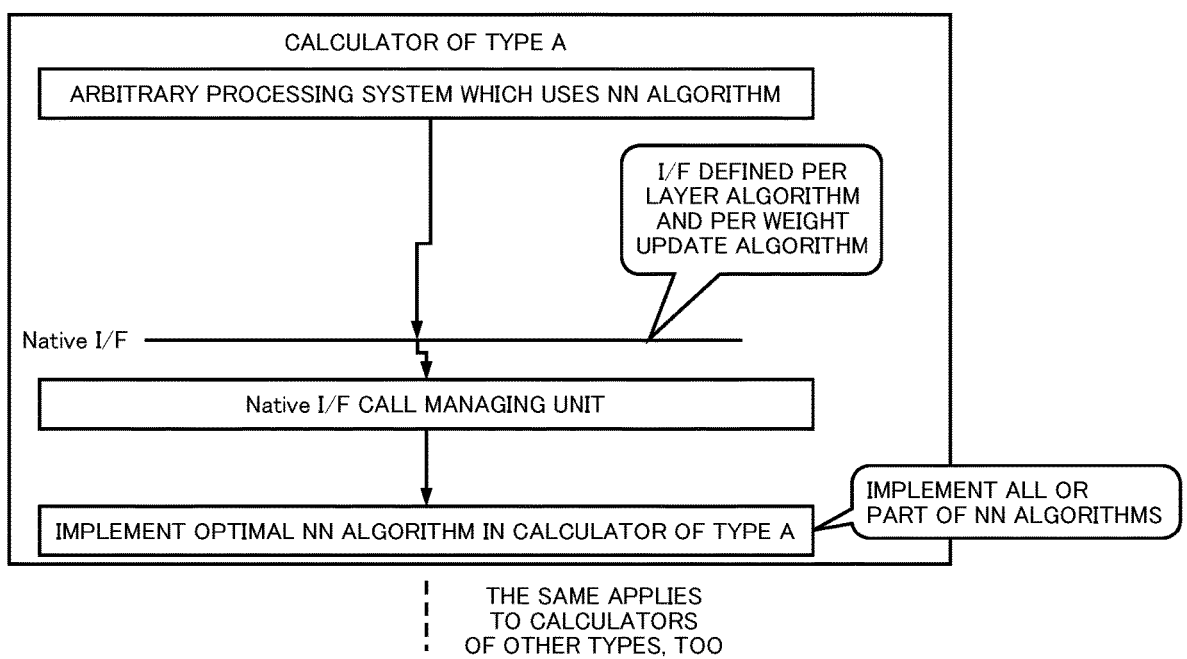
FIG. 43 illustrates a view illustrating a configuration example which executes identification and learning of an NN according to the one embodiment of the present invention.

Configuration 1-1 (Configuration for executing identification and learning of NN): FIG. 43 illustrates a view illustrating a configuration example which executes identification and learning of the NN according to the one embodiment of the present invention. The Native I/F includes at least a Forward processing unit. This configuration enables the Native I/F to execute identification processing by using the NN algorithm. Furthermore, the Native I/F includes at least the Forward processing unit, a Backward processing unit, a weight update algorithm internal state initialization processing unit and a weight update processing unit. This configuration enables the Native I/F to execute identification processing and learning processing by using the NN algorithm. The Forward processing unit and the Backward processing unit are included per layer algorithm. The weight update algorithm internal state initialization processing unit and the weight update processing unit are included per weight update algorithm.

Furthermore, the Native I/F includes a Forward processing call interface and a Backward processing call interface per layer algorithm, and a weight update algorithm internal state initialization processing interface and a weight update processing call interface per weight update algorithm. Furthermore, an implementation on a side called via the Native I/F includes a Native I/F call managing unit. This configuration enables the implementation on the side called via the Native I/F to change an implementation which can optimally execute an operation of the Native I/F based on a difference in a parameter of the Native I/F. In this regard, when there is no implementation which can execute the operation of the Native I/F, the Native I/F call managing unit returns an error to this call source. Consequently, the implementation on the side called via the Native I/F can select and execute the implementation which can optimally execute this operation.

Figure 44:
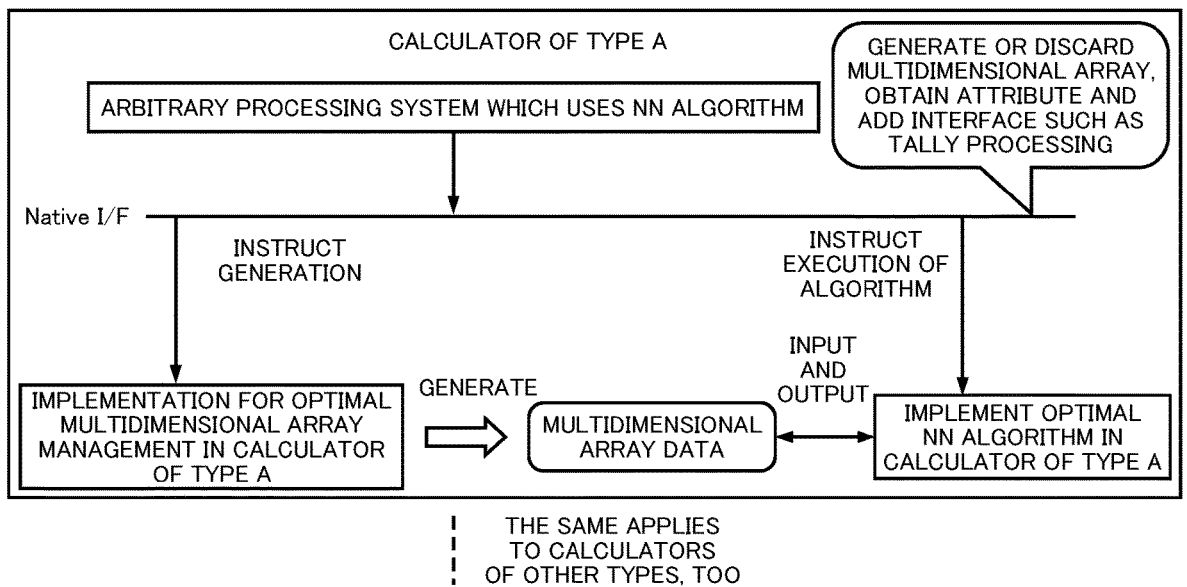
FIG. 44 illustrates a view illustrating a configuration example of multidimensional array management according to the one embodiment of the present invention.

Configuration 1-1-1 (Configuration 1 for executing identification and learning of NN; component (multidimensional array managing unit) which manages multidimensional array): FIG. 44 illustrates a view illustrating a configuration example of multidimensional array management according to the one embodiment of the present invention. The Native I/F further includes a multidimensional array managing unit. The multidimensional array managing unit can perform at least one operation selected from a group of generation and discarding of multidimensional arrays, obtaining of an attribute (the number of axes and the number of elements per axis), obtaining of a tally result (a total sum, an average and a variance of each axis) and four arithmetic operations per element of multidimensional arrays.

Configuration 1-2 (Configuration for Sharing Data)

Figure 45:
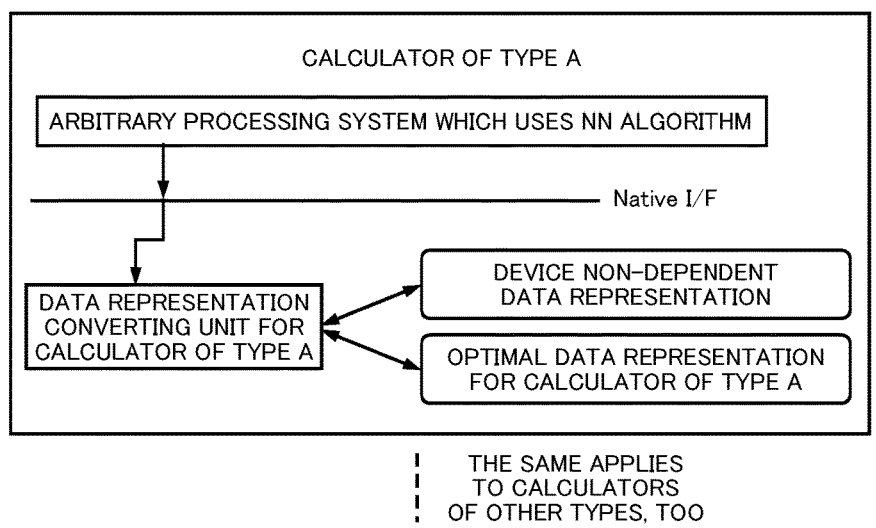
FIG. 45 illustrates a view illustrating a configuration example of a data representation converting unit according to the one embodiment of the present invention.

Configuration 1-2-1 (Configuration 1 for sharing data; data representation converting unit): FIG. 45 illustrates a view illustrating a configuration example of the data representation converting unit according to the one embodiment of the present invention. Furthermore, the Native I/F includes the data representation converting unit. The data representation converting unit can mutually convert a data representation (device dependent data representation) which depends on a specific calculator and a data representation (device non-dependent data representation) which does not depend on the specific calculator in the Native I/F.

Configuration 1-2-2 (Configuration 2 for sharing data; configuration including+external storage medium): Furthermore, the processing system on a side which calls the Native I/F includes an external storage medium. The external storage medium can store weight data converted into device non-dependent data.

Figure 46:
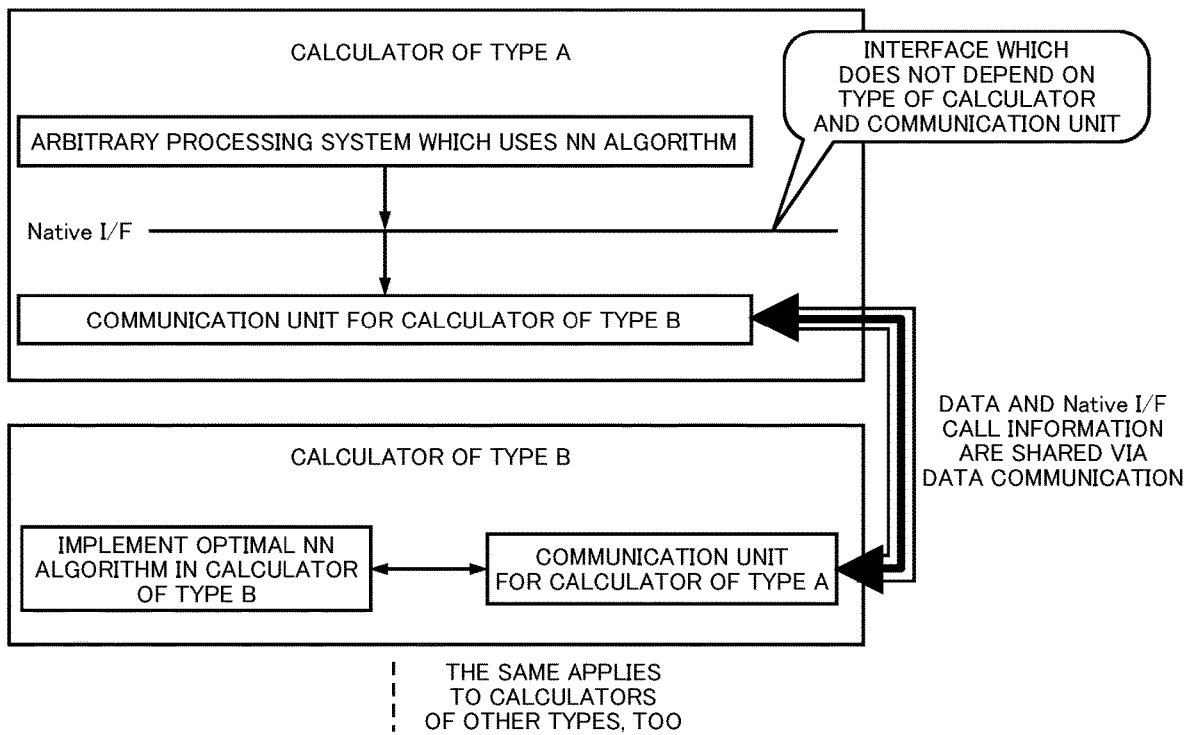
FIG. 46 illustrates a view illustrating a configuration example of a communication unit according to the one embodiment of the present invention.

Configuration 1-2-3 (Configuration 3 for sharing data; configuration including+communication unit): FIG. 46 illustrates a view illustrating a configuration example of the communication unit according to the one embodiment of the present invention. Furthermore, an implementation on the side called via the Native I/F includes the communication unit. The communication unit can communicate Native I/F call information with the implementation on the called side. Furthermore, when an arbitrary processing system which uses the NN algorithm calls the Native I/F which does not have to do with whether or not the call information is communicated, the implementation on the side called via the Native I/F can execute optimal communication processing as needed. This process can conceal a physical distance of a calculator, whether or not a memory is shared and a difference in a communication protocol from the arbitrary processing system which uses the NN algorithm. For example, the Native I/F which does not have to do with whether or not the call information is communicated includes an interface which executes the layer algorithm, an interface which executes the weight update algorithm and an interface which executes data representation conversion.

Configuration 2 (Configuration of Native IF Expanded Version)

Figure 47:
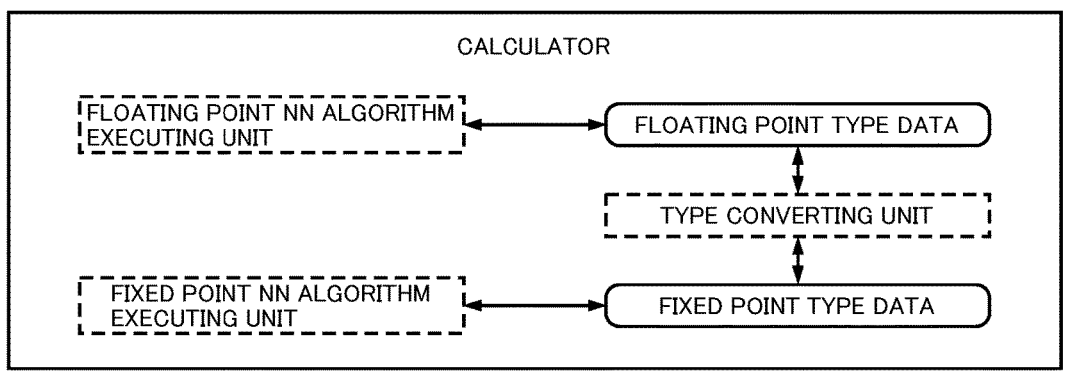
FIG. 47 illustrates a view illustrating configuration examples of floating point and fixed point executing units and a type converting unit according to the one embodiment of the present invention.

Configuration 2-1 (Configuration 1 of Native I/F expanded version; configuration including type converting unit, and floating point NN algorithm executing unit and/or fixed point NN algorithm executing unit): FIG. 47 illustrates a view illustrating configuration examples of the floating point and fixed point executing units and the type converting unit according to the one embodiment of the present invention. The Native I/F includes the type converting unit, a floating point NN algorithm executing unit and/or a fixed point NN algorithm executing unit. For example, there is a calculator B which includes only the type converting unit, a calculator A which includes only the floating point NN algorithm executing unit, or a calculator C which includes only the fixed point NN algorithm executing unit. When the calculator A, the calculator B and the calculator C are combined with a basic configuration of the Native I/F, floating point type data generated by the calculator A is transferred to the calculator B. Then, the data transferred from the calculator A to the calculator B is converted into the fixed point type data by the calculator B. Furthermore, the fixed point type data converted by the calculator B is transferred to the calculator C. Furthermore, the fixed point type data transferred from the calculator B becomes input data of the calculator C, so that the entire operation of the NN algorithms is executed. This process can be also executed in reverse order.

Figure 48:
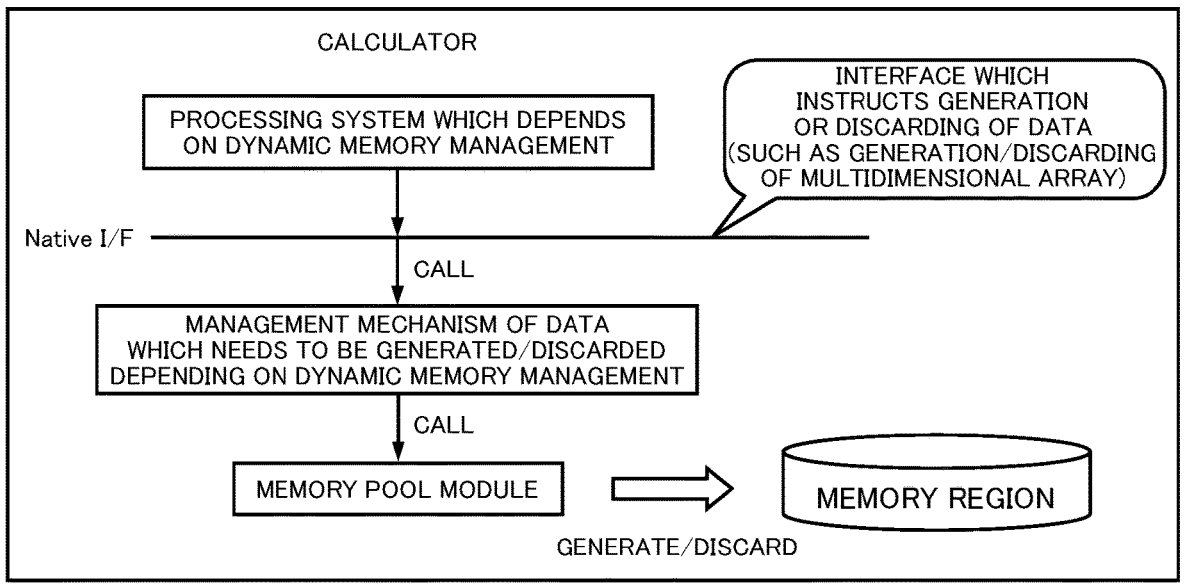
FIG. 48 illustrates a view illustrating a configuration example of a memory pool according to the one embodiment of the present invention.

Configuration 2-2 (Configuration 2 of Native I/F Expanded Version; configuration including memory pool module): FIG. 48 illustrates a view illustrating a configuration example of the memory pool according to the one embodiment of the present invention. Furthermore, the implementation on the side called via the Native I/F includes the memory pool module. The memory pool module can realize dynamic memory management.

Figure 49:
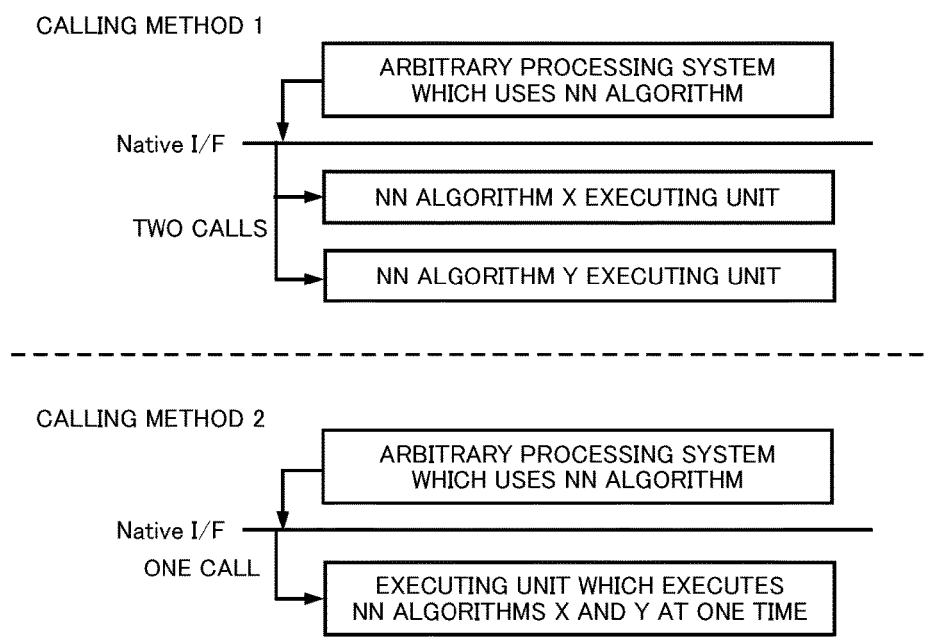
FIG. 49 is a view illustrating a configuration example of an algorithm executing unit which integrates a plurality of NN algorithms according to the one embodiment of the present invention.

Configuration 2-3 (Configuration 3 of Native I/F Expanded Version; configuration including algorithm executing unit which integrates a plurality of NN algorithms): FIG. 49 is a view illustrating a configuration example of the algorithm executing unit which integrates a plurality of NN algorithms according to the one embodiment of the present invention. Furthermore, the Native I/F includes the algorithm executing unit which integrates a plurality of NN algorithms. The algorithm executing unit which integrates a plurality of NN algorithms simultaneously executes a plurality of algorithms with respect to a combination of frequently appearing NN algorithms.

Figure 50:
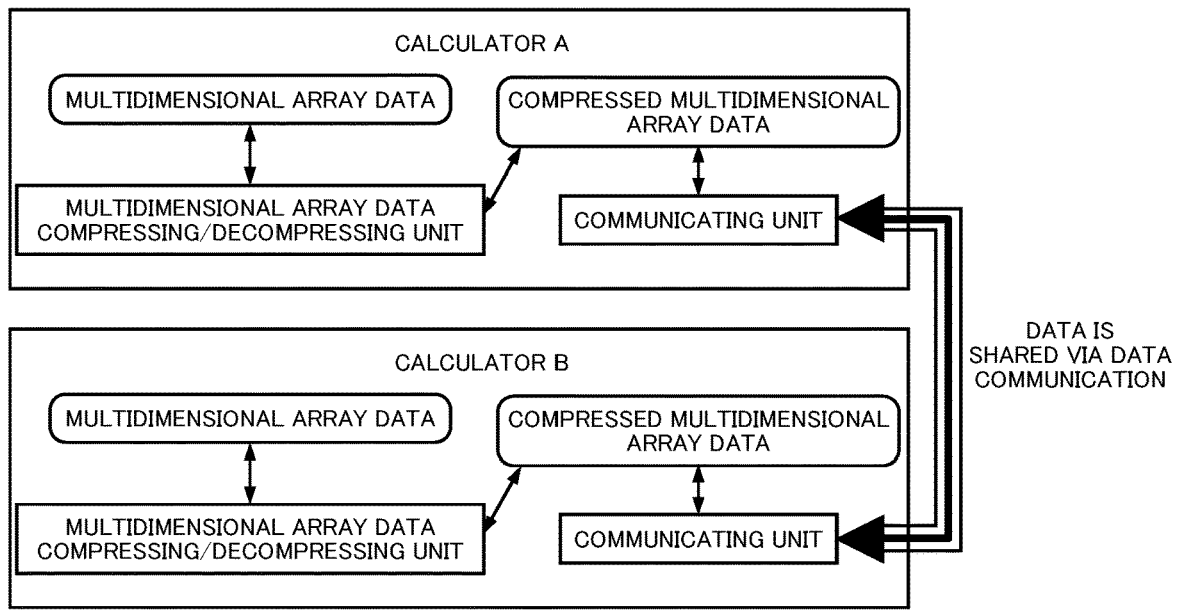
FIG. 50 is a view illustrating a configuration example of a multidimensional array data communication amount reducing unit according to the one embodiment of the present invention.

Configuration 2-4 (Configuration 4 of Native I/F Expanded Version; configuration including multidimensional array data compressing/decompressing unit): FIG. 50 is a view illustrating a configuration example of the multidimensional array data communication amount reducing unit according to the one embodiment of the present invention. Furthermore, the implementation on the side called via the Native I/F includes a multidimensional array data compressing/decompressing unit. The multidimensional array data compressing/decompressing unit is provided to the communication unit.

Figure 51:
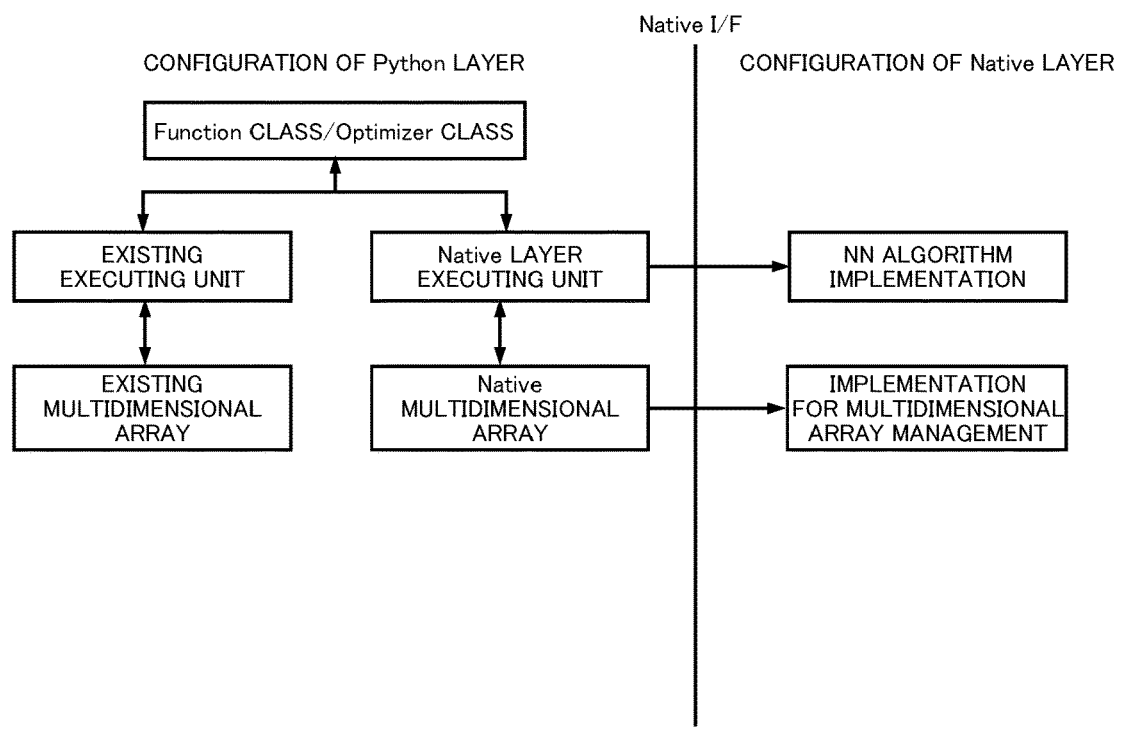
FIG. 51 illustrates a view illustrating an example of cooperation with an existing executing unit according to the one embodiment of the present invention.

Configuration 3 (Configuration of Native I/F+Chainer Executing Unit): FIG. 51 illustrates a view illustrating an example of cooperation with an existing executing unit according to the one embodiment of the present invention.

Configuration 3-1 (Configuration 1 of Native I/F+Chainer Executing Unit; configuration including bytecode generating unit and virtual machine): FIG. 53 illustrates a view illustrating configuration examples of the bytecode generating unit and the virtual machine according to the one embodiment of the present invention. Furthermore, the Chainer executing unit includes the bytecode generating unit. The bytecode generating unit receives an input of a Backward calculation procedure and a weight to output as a bytecode. For example, the bytecode generating unit is provided to a Python layer of Chainer. Furthermore, the Native I/F includes the virtual machine. The virtual machine interprets the bytecode and executes NN algorithm processing. The NN algorithm processing described herein is one of the Forward processing, the Backward processing and the weight update, or a combination thereof.

Figure 54:
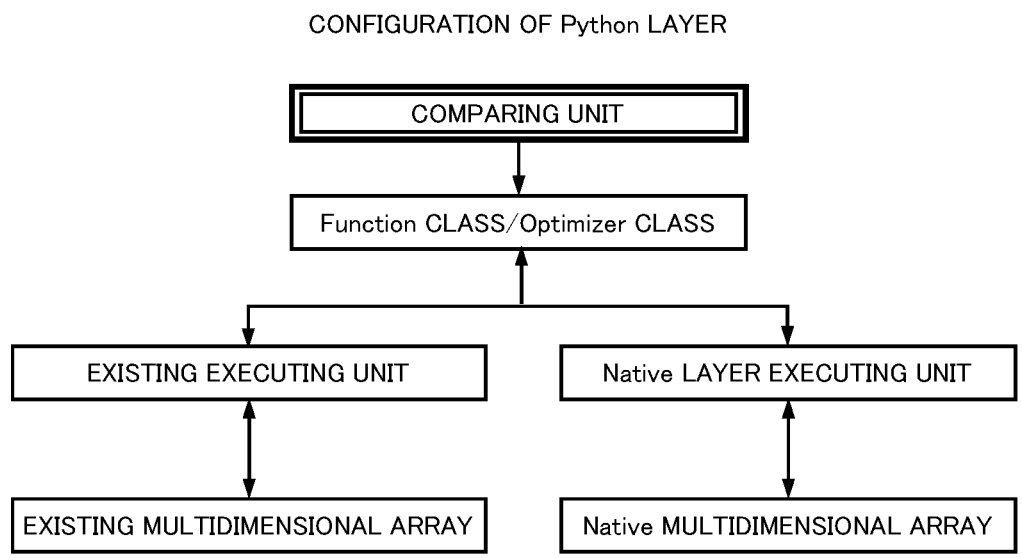
FIG. 54 illustrates a view illustrating a configuration example of a comparing unit according to the one embodiment of the present invention.

Configuration 3-2 (Configuration 2 of Native I/F+Chainer Executing Unit; configuration including comparing unit): FIG. 54 illustrates a view illustrating a configuration example of the comparing unit according to the one embodiment of the present invention. Furthermore, the Chainer executing unit includes the comparing unit. The comparing unit compares input/output results of the existing executing unit and a Native layer executing unit associated with the same NN algorithm, or input/output results of Native layer executing units which call Native layer executing units of different implementations of the same Native I/F.

Figure 55:
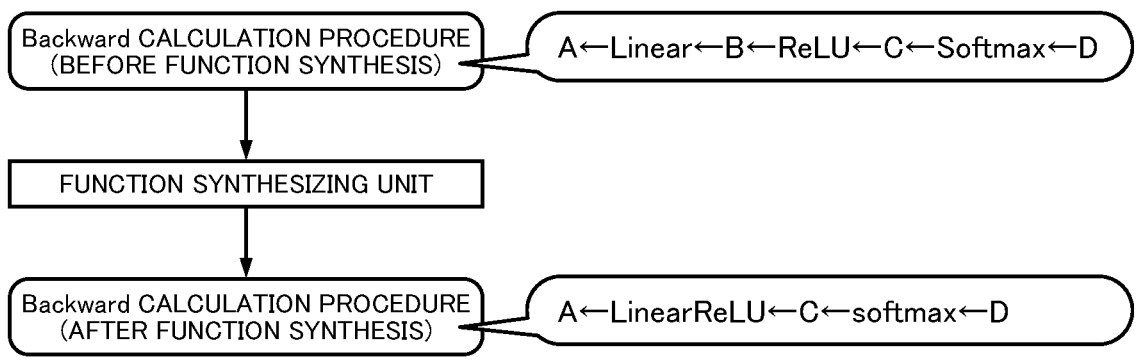
FIG. 55 illustrates a view illustrating a configuration example of a function synthesizing unit according to the one embodiment of the present invention.

Configuration 3-3 (Configuration 3 of Native I/F+Chainer Executing Unit; configuration including function synthesizing unit): FIG. 55 illustrates a view illustrating a configuration example of the function synthesizing unit according to the one embodiment of the present invention. Furthermore, the Chainer executing unit includes the function synthesizing unit. The function synthesizing unit receives an input of the Backward calculation procedure and replaces a combination of instances of the Function classes which can be supported by the "Native I/F which simultaneously executes a plurality of algorithms", with instances of Function classes which are supported by the "Native I/F which simultaneously executes a plurality of algorithms". However, when the implementation of the Native layer for a calculator which executes the Backward calculation procedure does not include the "Native I/F which simultaneously executes a plurality of algorithms", the above replacement is not performed. The replacement described herein can be executed by partial match search when the Backward calculation procedure is regarded as a character string. For example, the function synthesizing unit is provided to the Python layer of Chainer.

Configuration 4 (Configuration of Optimizing Device Specialized in Execution of Forward Processing)

Configuration 4-1 (Configuration 1 of optimizing device specialized in execution of Forward processing; configuration including weight optimization processing unit): Furthermore, the Chainer executing unit includes the weight optimization processing unit. The weight optimization processing unit executes weight optimization processing which is suitable for a Function class.

Configuration 4-2 (Configuration 2 of optimizing device specialized in execution of Forward processing; configuration including data memory region reuse unit): Furthermore, the Chainer executing unit and the Native I/F include data memory region reuse units. The data memory region reuse unit reuses a memory region of data inputted and outputted between layers. The reuse unit is provided to a Forward processing executing unit or the virtual machine. For example, a flag for identifying that only the Forward processing is executed is provided to an argument of an interface (defined by the Native I/F) which executes the Forward processing of the virtual machine. A condition for executing this processing is that the volatile attribute is designated to the Variable variable inputted by the instance of the Function class of Chainer, or that a flag for identifying that only the Forward processing is executed when the Forward processing of the virtual machine is executed is valid.

Function 1 (Function of configuration of Native IF): The developers who design and use the NN algorithm, and the developers who are deeply conscious of a calculator hardware configuration can easily separately work. For example, for the developers who design and use the algorithm, an identity of an interface per NN algorithm which needs to be executed is guaranteed by the Native I/F. Consequently, various calculators can execute processing without changing software on the side which calls the Native I/F. More specifically, it is possible to reduce a risk that software developed by the developers depends on a specific calculator. As a result, it is possible to select a calculator according to more essential standards such as a calculator price and weaknesses and strengths for specific use. If the developers who are deeply conscious of the calculator hardware configuration provide an optimal implementation for a calculator which supports the Native I/F, a wide range of users of the NN algorithms can use the calculator developed by the developers.

Function 1-1 (Function of configuration for executing identification and learning of NN): The developers who design and use the NN algorithm can realize the entire operation of the NN algorithms by calling an interface of the Native I/F by using the arbitrary processing system which uses the NN algorithm. Furthermore, the developers who design and use the NN algorithm can realize the entire operation of the NN algorithms by using the optimal implementation for the calculator used without being conscious of a specific configuration of the calculator.

Function 1-1-1: (Function of configuration 1 for executing identification and learning of NN; component (multidimensional array managing unit) which manages multidimensional array): The developers who design and use the NN algorithm can combine and execute arbitrary NN algorithms without extra data conversion processing when executing the entire operation of the NN algorithms. In this case, by confirming a tally result of multidimensional array contents which is a processing result of the arbitrary NN algorithms, it is possible to confirm whether or not calculation can be executed as intended by the NN algorithms.

Function 1-2 (Function of Configuration for Sharing Data)

Function 1-2-1 (Function of configuration 1 for sharing data; data representation converting unit): By way of conversion into a device non-dependent data representation, it is possible to convert data which is necessary to realize the entire operation of the NN algorithms between calculators of different hardware configurations.

Function 1-2-2: It is possible to conceal unique information per calculator (Configuration 2 for sharing data; configuration including+external storage medium): By converting weight data into a device non-dependent data representation and then storing the device non-dependent data representation in the external storage medium, it is possible to execute identification processing on an arbitrary calculator by using the learned weight using a specific calculator.

Function 1-2-3 (Function of configuration 3 for sharing data; configuration including+communication unit): Irrespectively of the calculator hardware configuration, a physical distance and whether or not the memory is shared, it is possible to convert data which is necessary to realize the entire operation of the NN algorithms. A calculator on which the processing system on the side which uses the NN algorithms can operate can also call an NN algorithm implementation implemented in a calculator on which the processing system on the side which uses the NN algorithms cannot operate. Consequently, it is possible to realize the entire operation of the NN algorithms by using a plurality of calculators connected with a computer network.

Function 2 (Function of Configuration of Native IF Expanded Version)

Function 2-1 (Function of Configuration 1 of Native I/F Expanded Version; configuration including type converting unit, and floating point NN algorithm executing unit and/or fixed point NN algorithm executing unit): A hardware configuration including the calculator which does not include the floating point unit (FPU) and the calculator which includes the FPU in a mixed manner can realize the entire operation of the NN algorithms by using a data type suitable for each calculator. By using a floating point arithmetic or a fixed point arithmetic, it is possible to realize the entire operation of the NN algorithms. More specifically, the calculator A transfers to the calculator B floating point type data generated by the floating point NN algorithm executing unit of the calculator A. Next, after the type converting unit converts the floating point type data transferred from the calculator A into fixed point type data, the calculator B transfers the fixed point type data to the calculator C. The calculator C transfers to the calculator B the fixed point type data generated by the fixed point NN algorithm executing unit of the calculator C. Next, after the type converting unit converts the fixed point type data transferred from the calculator C into floating point type data, the calculator B transfers the floating point type data to the calculator A.

Function 2-2 (Function of Configuration 2 of Native I/F Expanded Version; configuration including memory pool module): When calling the Native I/F which performs generation and discarding of data, and executing the entire operation of the NN algorithms, the processing system which depends on the dynamic memory management mechanism can realize this operation with a light processing load.

Function 2-3 (Function of Configuration 3 of Native I/F Expanded Version; configuration including algorithm executing unit which integrates a plurality of NN algorithms): It is possible to avoid an unnecessary access to a global memory. Furthermore, it is possible to reduce an overhead of function call. Consequently, it is possible to execute a combination of the frequently appearing NN algorithms at a high speed.

Function 2-4 (Function of Configuration 4 of Native I/F Expanded Version; configuration including multidimensional array data compressing/decompressing unit): When a plurality of calculators connected with the computer network is used to execute the entire operation of the NN algorithms, it is possible to reduce the multidimensional array data communication amount. Consequently, it is possible to improve an operation speed.

Function 3 (Function of Native I/F+Chainer Executing Unit): By combining the NN algorithm which is supported by the Native I/F and the NN algorithm which is not supported by the Native I/F, it is possible to define and execute the entire operations of the NN. By optionally replacing the NN algorithm with the Native I/F as soon as the NN algorithm is supported by the Native I/F, it is possible to execute the entire operation of the NN. Consequently, it is not necessary to correct existing software. When the Native I/Fs are combined, too, it is possible to enjoy the existing advantage of Define-By-run.

Function 3-1 (Function of configuration 1 of Native I/F+Chainer Executing Unit; configuration including bytecode generating unit and virtual machine): The Chainer executing unit includes the bytecode generating unit and the Native I/F includes the virtual machine, so that it is possible to reduce dependency on a high-level library or a programming language. Consequently, various calculators such as an accelerator having poor execution environment can satisfy product level requirement and execute the entire operations of the NN designed by Chainer.

Function 3-2 (Function of configuration 2 of Native I/F+Chainer executing unit; configuration including comparing unit): The comparing unit compares the input/output results of the existing executing unit and the Native layer executing unit associated with the same NN algorithm, and the input/output results of the Native layer executing units which call the Native layer executing units of the different implementations of the same Native I/F. There is provided this comparing unit, so that it is possible to compare accuracy of the processing result of the floating point NN algorithm executing unit and accuracy of the processing result of the fixed point NN algorithm executing unit. Consequently, it is possible to compare a processing result of an executing unit which has been sufficiently tested as to whether or not the executing unit can correctly calculate the NN algorithm, and a processing result of a Native layer to be newly created. Accordingly, it is possible to guarantee that an implementation of the Native layer to be newly created can correctly calculate the NN algorithm.

Function 3-3 (Function of configuration 3 of Native I/F+Chainer executing unit; configuration including function synthesizing unit): The function synthesizing unit receives an input of the Backward calculation procedure, and replaces a combination of instances of the Function classes which can be supported by the "Native I/F which simultaneously executes a plurality of algorithms", with instances of Function classes associated on a one-to-one basis with the "Native I/F which simultaneously executes a plurality of algorithms". In addition, when there is no "Native I/F which simultaneously executes a plurality of algorithms", this function synthesizing unit does not perform the above replacement. By providing this function synthesizing unit to the configuration of the Python layer of Chainer, the Backward calculation procedure is automatically processed irrespectively of whether or not there is the "Native I/F which simultaneously executes a plurality of algorithms". When there is the "Native I/F which simultaneously executes a plurality of algorithms", the process of the Backward calculation procedure calls the Native I/F and replaces the Native I/F with an instance of a corresponding Function class. Consequently, it is possible to realize the entire operation of the NN algorithms at a high speed at all times. Furthermore, even when there is a combination of functions without the "Native I/F which simultaneously executes a plurality of algorithms", the function synthesizing unit provides the advantage in some cases. More specifically, this combination is a combination of Convolution2D+BatchNormalization limited to the Forward processing, and a combination of Linear+BatchNormalization.

BatchNormalization is processing of making a variance between elements uniform and removing the average for each element of a multidimensional array which is an input, based on long-term statistical information obtained by learning of the NN. When only the Forward processing is performed instead of performing learning, it is not necessary to update the variance and the average. This processing is only processing of performing conversion such as y=ax+b where, for example, a and b are constants per array element. The Linear processing is processing of performing a matrix product. Furthermore, Convolution2D is processing of calculating a combination of convolution and the matrix product. These processes include the conversion such as y=ax+b described above. Consequently, by adjusting weights and biases of Linear and Convolution2D, it is possible to obtain the same result as a result obtained by inputting output results of these Functions to BatchNormalization and processing the output results. By adjusting the weights and the biases in this way, the function synthesizing unit can convert Convolution2D+BatchNormalization into single Convolution2D. The same applies to conversion from Linear+BatchNormalization into single Linear.

Function 4 (Function of configuration of optimizing device specialized in execution of Forward processing): By reducing a weight information amount of the Forward processing or a data memory amount of input data, and executing the Forward processing, it is possible to reduce the memory. Furthermore, by executing the Forward processing without reducing the number of weight elements or calculating a weight of 0, it is possible to reduce the calculation amount.

Function 4-1 (Function of optimizing device 1 specialized in execution of Forward processing; configuration including weight optimization processing unit): The weight optimization processing unit specialized in execution of the Forward processing is provided to the Function class of Chainer. Consequently, it is possible to perform weight optimization processing on an instance of an arbitrary Function class included in a learned network configuration. Consequently, it is possible to execute the weight optimization processing, so that it is possible to reduce the memory and the calculation amount during the Forward processing. Consequently, it is possible to execute the entire operation of the NN algorithms at a high speed.

Function 4-2 (Function of optimizing device 2 specialized in execution of Forward processing; configuration including data memory region reuse unit): By giving the flag which executes only the Forward processing as an argument to the Forward processing executing unit (Chainer or the virtual machine), it is possible to reduce the memory during the Forward processing. Consequently, it is possible to execute the entire operation of the NN algorithms at a high speed.

5. Specific Procedure of Implementing a Method According to an Embodiment

The implementing method according to the embodiment includes a first method and a second method.

Figure 24:
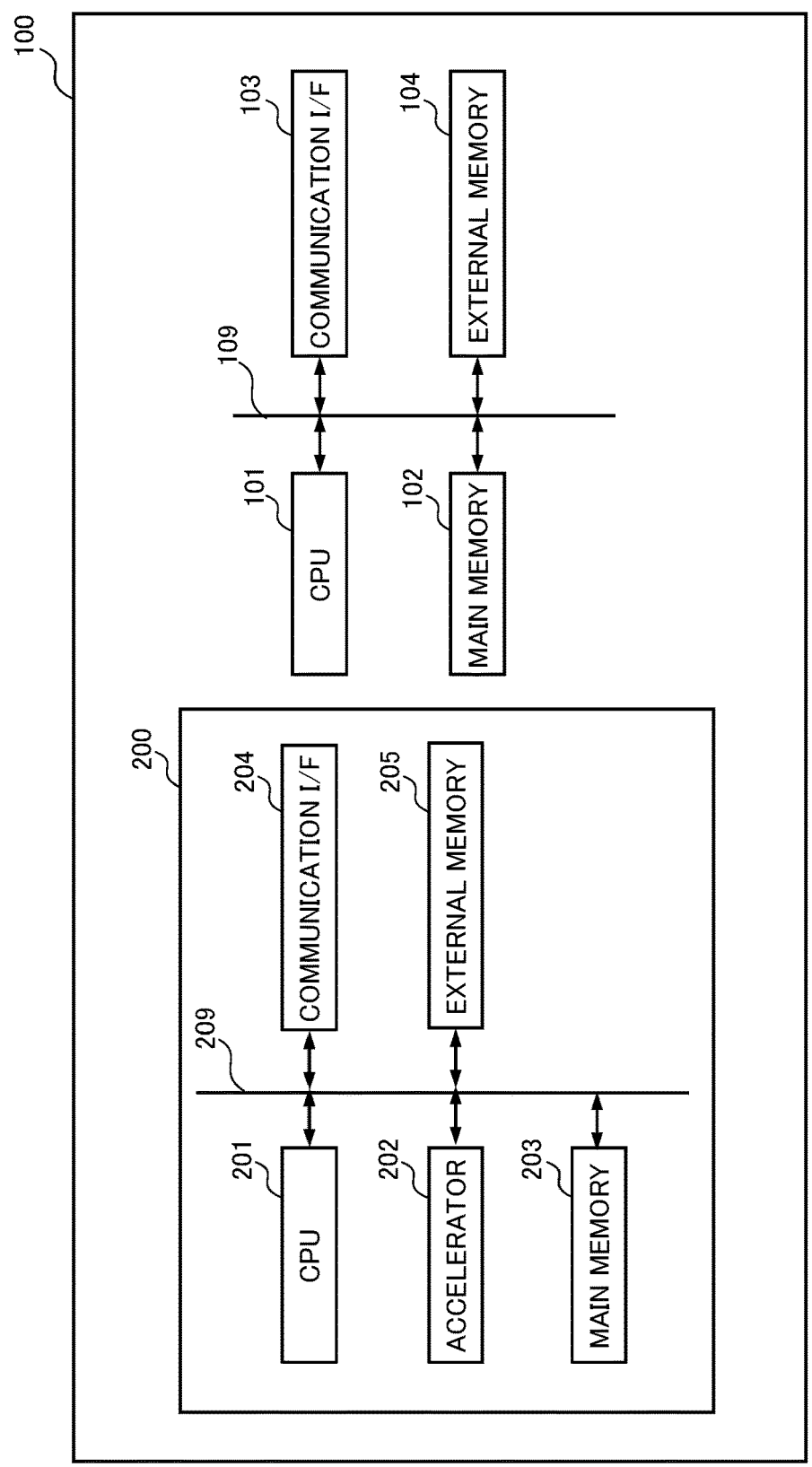
FIG. 24 illustrates a schematic view illustrating a configuration example of an implementing device used for the implementing method (first method) according to the one embodiment of the present invention.

5-1. First Method: FIG. 24 illustrates a schematic view illustrating a configuration example of an implementing device used for the implementing method (first method) according to the one embodiment of the present invention. As illustrated in FIG. 24, the implementing device according to the one embodiment mainly includes an evaluation board (mother board) 100, and a built-in chip (built-in semiconductor integrated circuit) 200 which is detachably mounted on the evaluation board 100.

The evaluation board 100 mainly includes a CPU 101, a main memory 102, a communication I/F 103 and an external memory 104. These components are electrically connected with each other via an internal bus 109. The CPU 101 loads various programs such as an operating system from the external memory 103 to the main memory 102, and executes a command included in the loaded program. The main memory 102 is used to store the programs to be executed by the CPU 101, and is composed of a DRAM, for example.

The communication I/F 103 is implemented as hardware, firmware, communication software such as a TCP/IP driver or a PPP driver or a combination thereof. The communication I/F 103 is configured to be able to communicate with an unillustrated calculator and input/output device operated by the developers via a communication network (not illustrated) including the Ethernet (registered trademark) or the Internet. Furthermore, the communication I/F 103 can communicate with a communication I/F 204 of the built-in chip 200 described below, as well. The external memory 104 is composed of a flash memory, for example, and stores various programs such as the operating system.

Next, the built-in chip 200 includes a CPU 201, an accelerator (auxiliary arithmetic device) 202, a main memory 203, the communication I/F 204 and an external memory 205. These components are electrically connected with each other via an internal bus 209. In addition, the built-in chip can selectively include a GPU (not illustrated), too. The CPU 201 loads a source code (e.g., a source code described by Python) received from (the communication I/F 103 of) the evaluation board 100 to the main memory 203 via the communication I/F 204, and executes each code included in the loaded source code. The accelerator 202 loads a source code (e.g., the C language or an assembler) received from (the communication I/F 103 of) the evaluation board 100 to the main memory 203 via the communication I/F 204, and executes each code included in the loaded source code. The main memory 203 is used to store the source code executed by the CPU 201 and the accelerator 202, and is composed of a DRAM, for example.

The communication I/F 204 communicates with the communication I/F 103 of the evaluation board 100 and transmits and receives various pieces of information. The external memory 205 is composed of a flash memory, for example, and stores various items of data.

Figure 25:
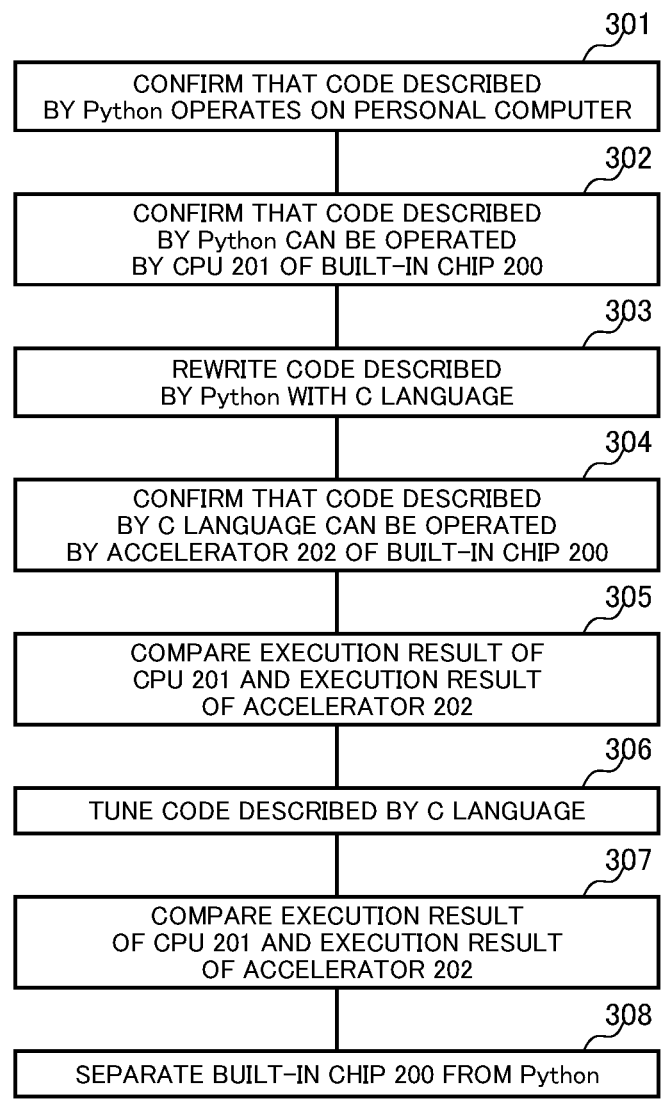
FIG. 25 is a flowchart illustrating an example of a procedure used for the implementing method according to the one embodiment of the present invention.

FIG. 25 is a flowchart illustrating an example of a procedure used for the implementing method according to the one embodiment of the present invention. First, in step 301, a personal computer is caused to execute a source code described by a first programming language (e.g., Python). The developers confirm whether or not the source code operates on the personal computer, based on an execution result. The personal computer described herein refers to a calculator having rich calculation resources including, for example, the learning device according to the embodiment described in above Part 1. A state where the source code operates on the personal computer in this step 301 is the same state as step I described in above "4-1".

In step 302, the evaluation board 100 is used to cause the CPU 201 of the built-in chip 200 to execute the source code which has been confirmed in step 301 to be operable on the personal computer and is described by Python. The developers confirm whether or not this source code can be operated by the CPU 201, based on the execution result. In addition, this operation can be realized by causing the CPU 101 of the evaluation board 100 to load and execute a predetermined program stored in the external memory 104. In this regard, the source code described by Python can be passed to the CPU 201 via the communication I/F 103 of the evaluation board 100 and the communication I/F 204 of the built-in chip 200. When it turns out that this source code cannot be operated by the CPU 201, the developers correct this source code and repeats step 302. When it is confirmed that this source code can be operated by the CPU 201, the developers move to next step 303.

In step 303, the developers rewrite (at least part of) the source code which has been confirmed in step 302 to be able to be operated by the CPU 201, with a second programming language (e.g., the C language or the assembler) such that the source code is operated by the accelerator 202.

In step 304, the evaluation board 100 is used to cause the accelerator 202 of the built-in chip 200 to execute the source code rewritten by the C language in step 303. The developers confirm whether or not this rewritten source code can be operated by the accelerator 202, based on the execution result. This operation can be realized by causing the CPU 101 of the evaluation board 100 to load and execute a predetermined program stored in the external memory 104. In this regard, the source code described by the C language can be passed to the accelerator 202 via the communication I/F 103 of the evaluation board 100 and the communication I/F 204 of the built-in chip 200. When it turns out that this source code cannot be operated by the accelerator 202, the developers correct this source code and repeats step 304. When it is confirmed that this source code can be operated by the accelerator 202, the developers move to next step 305.

In step 305, the evaluation board 100 compares a result obtained when the CPU 201 executes a first specific code (inspection target code) of the source code described by Python, and a result obtained when the accelerator 202 executes a second specific code which is the second specific code of the source code described by the C language and is obtained by rewriting the first specific code from Python to the C language (by, for example, using a module called a unit test executed by the built-in chip 200), and outputs a comparison result. The developers inspect whether or not the same output can be obtained from the same input of the both execution results, based on the comparison result. This operation can be realized by causing the CPU 101 of the evaluation board 100 to load and execute a predetermined program stored in the external memory 104. Until this inspection is finished, the developers repeat above steps 303 to 305. When this inspection is finished, the developers move to next step 306.

In step 306, the developers tune this source code such that the source code described by the C language in step 305 is operated at a higher speed by the accelerator 202.

In step 307, the evaluation board 100 compares a result obtained when the CPU 201 executes the source code described by Python, and a result obtained when the accelerator 202 executes the source code described by the C language tuned in step 306 (by, for example, using a module called a unit test executed by the built-in chip 200), and outputs a comparison result. The developers inspect whether or not the same output can be obtained from the same input of the both execution results, based on the comparison result. This operation can be realized by causing the CPU 101 of the evaluation board 100 to load and execute a predetermined program stored in the external memory 104. Until this inspection is finished, the developers repeat above steps 306 and 307. When this inspection is finished, the developers move to next step 308.

Figure 26:
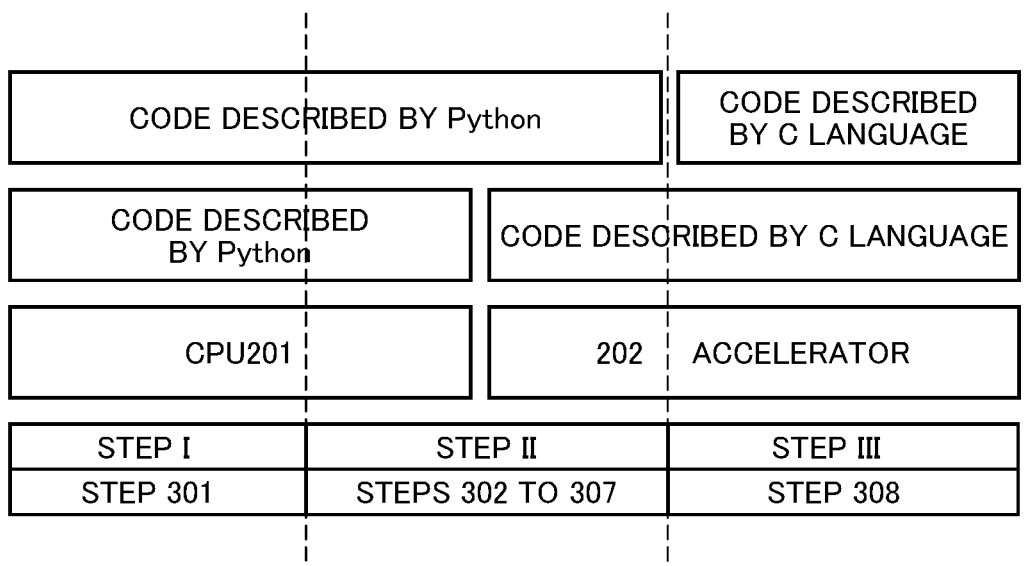
FIG. 26 illustrates a schematic view illustrating an operation state of a built-in chip according to the implementing method according to the one embodiment of the present invention.

In a state where step 307 is finished, the built-in chip 200 is in a state to be operated by two source codes of Python and the C language. This state will be described with reference to FIG. 26. FIG. 26 illustrates a schematic view illustrating an operation state of the built-in chip according to the implementing method according to the one embodiment of the present invention.

As illustrated in FIG. 26, in step 301 (corresponding to step I), a function call side (i.e., a subject which calls a function) is described by Python, and a called side (i.e., a function to be called) is also described by Python. Next, in steps 302 to 307, the function call side is still described by Python, and some called sides are described by Python and some called sides are described by the C language in a mixed manner. That is, in a state where step 307 is finished, the built-in chip 200 is in a state operated by two source codes of Python and the C language.

A final object of the implementing method according to the present embodiment is a state where both of the call side and the called side are described by the C language as illustrated at a right end in FIG. 26, i.e., a state where the built-in chip 200 is operated only by the source code described by the C language.

Hence, back to FIG. 25, in step 308, the developers rewrite all portions of the source code which are described by Python and are not yet rewritten with the C language, to the C language such that the built-in chip 200 is operated only by the source code described by the C language. In this step 308, the built-in chip 200 is separated from Python. The source code generated in this way and described by the C language is stored in the external memory 205 of the built-in chip 200. Consequently, the built-in chip 200 can read the source code stored in the external memory 205 and cause the accelerator 202 to execute the source code, so that it is possible to execute machine learning. This state is a state targeted by the implementing method according to the embodiment, and a state where the task described in above "1" and "2" is solved.

5-2. Second Method

Figure 27:
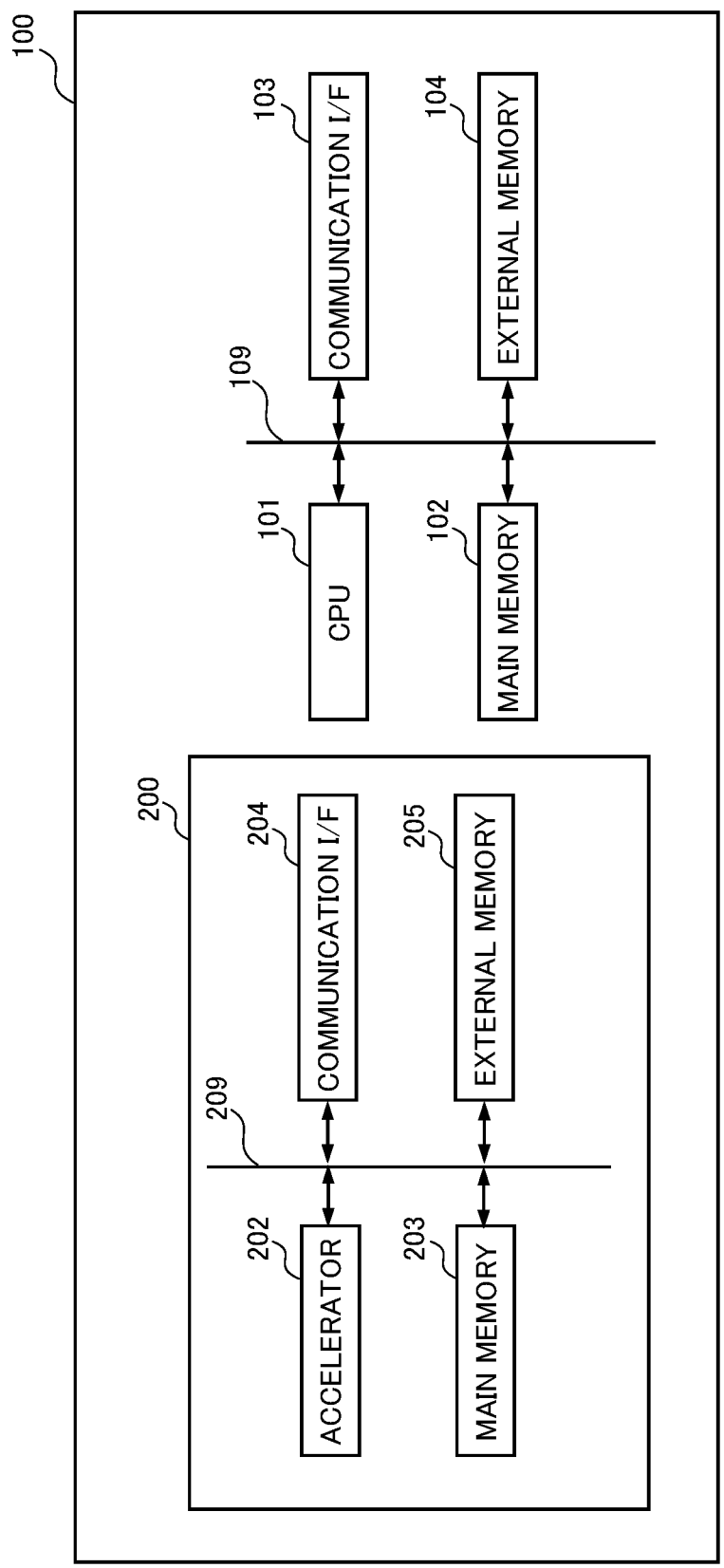
FIG. 27 illustrates a schematic view illustrating a configuration example of the implementing device used for the implementing method (second method) according to the one embodiment of the present invention.

FIG. 27 illustrates a schematic view illustrating a configuration example of the implementing device used for the implementing method (second method) according to the one embodiment of the present invention. The implementing device (FIG. 27) used for the second method differs from the implementing device (FIG. 24) used for the first method in that the built-in chip 200 does not include the CPU. According to the second method, an operation performed by the CPU 201 of the built-in chip 200 according to the first method is performed by a CPU provided to an externally arranged and unillustrated calculator (personal computer). For example, the calculator (personal computer) described herein may be the learning device (the personal computer illustrated in FIG. 11) described in above Part 1.

The implementing method performed by the second method makes such a change that the operation executed by the CPU 201 of the built-in chip 200 in steps 302, 305 and 307 according to the implementing method described with reference to FIG. 25 is performed by the CPU provided to the externally arranged calculator (not illustrated). To realize this change, the evaluation board 100 illustrated in FIG. 27 may be connected to be able to communicate with the externally arranged calculator (not illustrated) via, for example, the communication I/F 103 to cause the CPU provided to this calculator to execute the source code described by Python and receive an execution result.

6. Configuration of Implementing Device

Next, a configuration which is necessary for the implementing device 100 according to the above embodiment to realize the method described in above "5" will be described.

6-1. Term Definition for Explaining Configuration of Present Invention (Difference Between Class and Module)

A module is a procedure and a data set defined and implemented to realize a specific object (a concept irrelevant to whether or not there is an assist of a specific programming language). A class is a module defined and implemented by using an assist of an object-oriented language such as Python.

(Python layer and Native layer): The Native layer refers to a hierarchy of the Native I/F and an implementation (software and hardware) called from the Native I/F. The Python layer refers to a software hierarchy assumed to be executed on a Python language. Currently, Chainer is described by the Python language, yet it is thought that Chainer will be ported to another programming language in future. Functions described as the Python layer do not necessarily mean that the functions are specialized in the Python language. As role division of the Python layer and the Native layer, the Python layer assumes development environment of a high abstraction level which is more suitable for algorithm design, and the Native layer assumes development environment of a low abstraction level which is more specifically conscious of a hardware configuration.

(Association between calculator and executing unit): FIG. 52 illustrates a view illustrating an example of cooperation with the existing executing unit according to the one embodiment of the present invention. The executing unit is a method of a Function/Optimizer class for actually calculating an algorithm of the neural network. The existing executing unit is a general-purpose calculator executing unit, a GPU executing unit or both. The general-purpose calculator executing unit calculates the NN algorithm by using a general-purpose calculator. The GPU executing unit calculates the NN algorithm by using a GPU. The Native executing unit calculates the NN algorithm by using an implementation of the Native layer. The Native layer is implemented per calculator type, and therefore can be operated by all calculator types (the general-purpose calculator, the GPU and the accelerator) via the Native I/F.

6-2. Configuration of Implementing Unit

Figure 28:
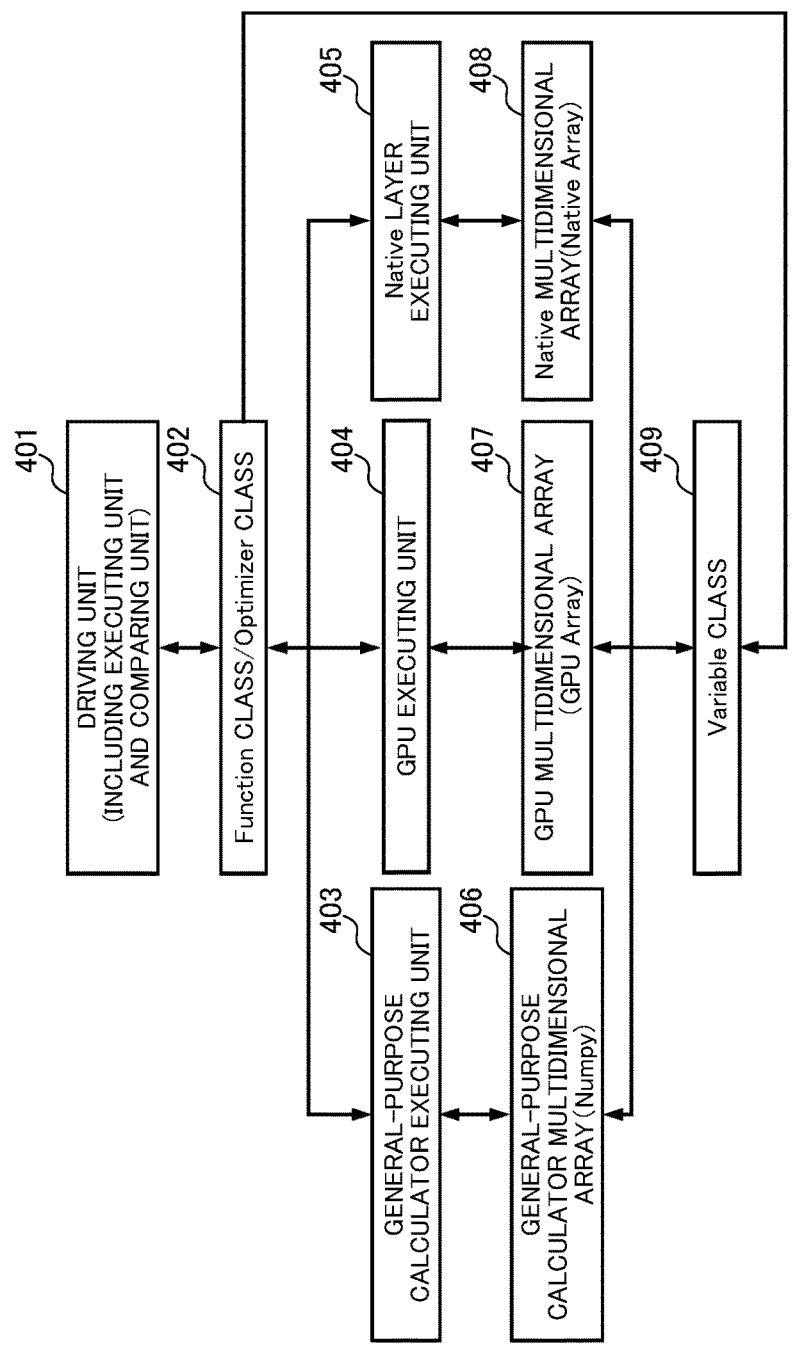
FIG. 28 illustrates a schematic view conceptually illustrating functions of the implementing device according to the one embodiment of the present invention.

FIG. 28 illustrates a schematic view conceptually illustrating functions of the implementing device according to the one embodiment of the present invention. As illustrated in FIG. 28, an implementing unit 400 mainly includes a driving unit 401, a Function class/Optimizer class 402, a general-purpose calculator executing unit 403, a GPU executing unit 404, a Native layer executing unit 405, a general-purpose calculator multidimensional array 406, a GPU multidimensional array 407, a Native multidimensional array 408 and a Variable class 409.

The driving unit 401 mainly includes an executing unit which commands the Function class/Optimizer class 402 to execute a given algorithm (function), and a comparing unit which compares an execution result of this algorithm (function) of the general-purpose calculator executing unit 403 (an execution result of the GPU executing unit 404) and an execution result of the Native layer executing unit 405 by using, for example, the module called the unit test, and outputs a comparison result.

The Function class/Optimizer class 402 causes at least one of the general-purpose calculator executing unit 403, the GPU executing unit 404 and the Native layer executing unit 405 to execute the algorithm (function) commanded by the driving unit 401.

The general-purpose calculator executing unit 403 obtains from the general-purpose calculator multidimensional array 406 a multidimensional array associated with the algorithm (function) commanded by the Function class/Optimizer class 402 and executes this algorithm (function) by using the CPU. This execution result is returned to the driving unit 401 via the Function class/Optimizer class 402.

The GPU executing unit 404 obtains from the GPU multidimensional array 407 the multidimensional array associated with the algorithm (function) commanded by the Function class/Optimizer class 402, and executes this algorithm (function) by using the GPU. This execution result is returned to the driving unit 401 via the Function class/Optimizer class 402.

The Native layer executing unit 405 obtains from the Native multidimensional array 408 the multidimensional array associated with the algorithm (function) commanded by the Function class/Optimizer class 402, and executes this algorithm (function) by using the accelerator. This execution result is returned to the driving unit 401 via the Function class/Optimizer class 402.

The Variable class 409 holds all multidimensional arrays used by the general-purpose calculator multidimensional array 406, the GPU multidimensional array 407 and the Native multidimensional array 408, and supplies corresponding multidimensional arrays to the general-purpose calculator multidimensional array 406, the GPU multidimensional array 407 and the Native multidimensional array 408.

In addition, when the first method described in above "5-1" is adopted as the implementing method, all components illustrated in FIG. 28 are arranged in the built-in chip 200 (see FIG. 24). In this case, the general-purpose calculator executing unit 403 executes the algorithm (function) by using the CPU 201 mounted on the built-in chip 200. The GPU executing unit 404 executes the algorithm (function) by using the GPU (not illustrated) mounted on the built-in chip 200. The Native layer executing unit 405 executes the algorithm (function) by mainly using the accelerator 202 mounted on the built-in chip 200.

On the other hand, when the second method described in above "5-2" is adopted as the implementing method, the Function class/Optimizer class 402, the general-purpose calculator executing unit 403, the GPU executing unit 404, the general-purpose calculator multidimensional array 406, the GPU multidimensional array 407 and the Variable class 409 among the components illustrated in FIG. 28 are arranged in the externally arranged calculator (personal computer). In this case, the implementation of the Native layer is still arranged in the built-in chip 200, too. Furthermore, in this case, the general-purpose calculator executing unit 403 executes the algorithm (function) by using the CPU of the externally arranged calculator. The GPU executing unit 404 executes the algorithm (function) by using the GPU of the externally arranged calculator.

6-3. Configuration of Native Layer Executing Unit

Figure 29:
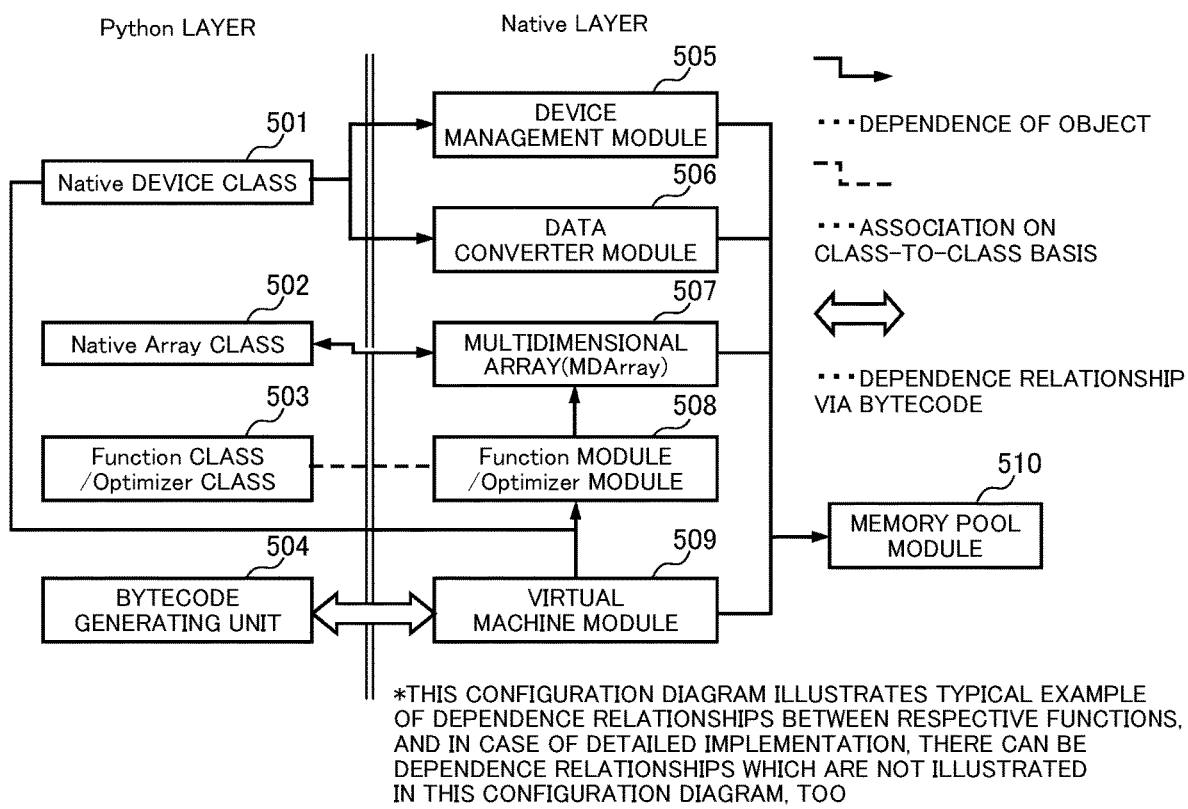
FIG. 29 is a schematic view illustrating a configuration example of a Native layer executing unit included in the implementing device according to the one embodiment of the present invention.

Next, a configuration of the above Native layer executing unit 405 will be described. FIG. 29 is a schematic view illustrating the configuration example of the Native layer executing unit included in the implementing device according to the one embodiment of the present invention. As illustrated in FIG. 29, the Native layer executing unit 405 mainly includes a Native Device class 501, a Native Array class 502, a Function class/Optimizer class 503 and a bytecode generating unit 504 in the Python layer. In addition, the Function class/Optimizer class 503 illustrated in FIG. 29 and the Function class/Optimizer class 402 illustrated in FIG. 28 are the same component. The Native Array class 502 illustrated in FIG. 29 and the Native multidimensional array 408 illustrated in FIG. 28 are the same component. Furthermore, the Native layer executing unit 405 mainly includes a device management module 505, a data converter module 506, a multidimensional array module 507, a Function module/Optimizer module 508, a virtual machine module 509 and a memory pool module 510 in the Native layer.

The Native Device class 502 wraps the device management module of the Native layer with the Python layer and conceals function call and data input/output to the Native layer. The Native Array class 502 wraps the multidimensional array of the Native layer with the Python layer. A Function class of the Function class/Optimizer class 503 wraps a Function module of the Native layer with the Python layer. An Optimizer class wraps an Optimizer module of the Native layer with the Python layer. In this regard, the Function class and the Optimizer class have already been implemented in Chainer and have a function of concealing a difference of execution between the general-purpose calculator and the GPU. By expanding this function, it is possible to conceal execution in the Native layer, too. The bytecode generating unit generates a bytecode. In addition, each component illustrated in FIG. 29 will be described in detail below.

7. Effect of Implementing a Device According to an Embodiment

The deep learning is a developing technique which is actively researched and developed. Therefore, it is assumed that a new layer algorithm having better performance than a conventional technique is invented during a development period for a built-in chip and there is a demand for importing this new algorithm in developing software or a hardware implementation. To realize a state where neural network configuration including the new layer algorithm satisfies a product level specification in built-in environment, and in addition, the new layer algorithm operates, it is necessary to take following development steps.

1. An algorithm is implemented and inspected in environment in which abundant calculation resources such as a GPU can be obtained.

2. The algorithm implemented and inspected in 1 is coupled with a module of the neural network whose optimal implementation has been finished on a built-in chip to inspect an operation. Optimization specialized for the chip is applied to the algorithm implemented and inspected in 1 according to an inspection result.

3. After the operation in 2 is finished, only the implementation of the neural network optimized for the chip is used and coupled with modules (a sensor and a motor control system) other than this module to inspect whether or not the product level specification is satisfied based on various test items.

The implementing device according to the embodiment employs a configuration of, when operating the algorithm of the neural network on Python, separately calling per layer the executing unit which uses the Python language which operates on the general-purpose calculator, the executing unit which uses the GPU and the executing unit which uses the optimization implementation for a specific chip. Furthermore, the implementation device employs a configuration of operating the entire algorithms of the neural network by using only the optimization implementation for this specific chip via a bytecode. An algorithm implementation code created in the step in 1 can be appropriated between steps 1 and 2 described in the previous paragraph, and a difference between operation results of steps 1 and 2 can be easily compared and studied. Furthermore, between steps 2 and 3, the optimization implementation created for step 2 can be appropriated for step 3, and, by contrast with this, failure correction related to the optimization implementation found in step 3 can be also appropriated for step 2. As a result, a state where the neural network configuration including the new layer algorithm can satisfy the product level specification in the built-in environment and can be operated can be realized at minimum development cost.

Term Definition

A following term is defined to describe the embodiment of the present invention in detail. The "entire operation" indicates a processing unit of the single Forward processing or repeated execution of the Forward processing, the Backward processing and the weight update processing. This entire operation is assumed as the embodiment of learning and identification of the typical neural network.

8. Native Layer

Next, the configuration related to the Native layer of the implementing device according to the embodiment illustrated in FIG. 29 will be described.

8-1. Device Management Module

The device management module 505 performs processing of initializing and releasing a device (software and hardware states which depend on the optimization implementation).

More specifically, the processing performed in the device management module 505 differs depending on a device mode. Typical processing contents includes, for example, securing or releasing a memory pool described below. The device does not need to exist on the same chip as the general-purpose calculator which executes Chainer and Python or on the same substrate. An optimization implementation which communicates with a device on another substrate and performs initialization and release is also possible.

A definition example of a function which initializes or releases the device is as follows.

(Example 1) Device*chnr_init_device(void)

Consequently, it is possible to initialize the device.

(Example 2) void chnr_release_device(Device*device)

Consequently, it is possible to release the device.

8-2. Function Module

The Function module 508 is a function group which performs calculation per layer of the neural network and defines the following function per layer type.

chnr_forward_xxxx( . . . )

Implement Forward processing (floating point version)

chnr_backward_xxxx( . . . )

Implement Backward processing (floating point version)

chnr_forward_xxxx_fx( . . . )

Implement Forward processing (fixed point version)

chnr_backward_xxxx_fx( . . . )

Implement Backward processing (fixed point version)

In this regard, xxxx represents a name assigned per layer type.

Specific processing contents of each function includes the contents exemplified in above "2-6" to "2-12" of above Part 1.

8-3. Multidimensional Array (MD Array) Module

The multidimensional array module 507 manages a multidimensional array inputted and outputted between Functions of the Native layer. The multidimensional array module 507 can manage an arbitrary size and dimensionality. Furthermore, the multidimensional array module 507 includes a mechanism of mutual conversion with a multidimensional array library for Numpy (a multidimensional array class of the python layer on which Chainer depends) and the GPU. Furthermore, this multidimensional array module 507 can hold not only a floating point type but also a fixed point type. Consequently, even hardware which does not have an FPU (floating point unit) can easily calculate the neural network. Furthermore, this multidimensional array module 507 has a function of mutual conversion with a floating point multidimensional array.

Figures 30, 31:
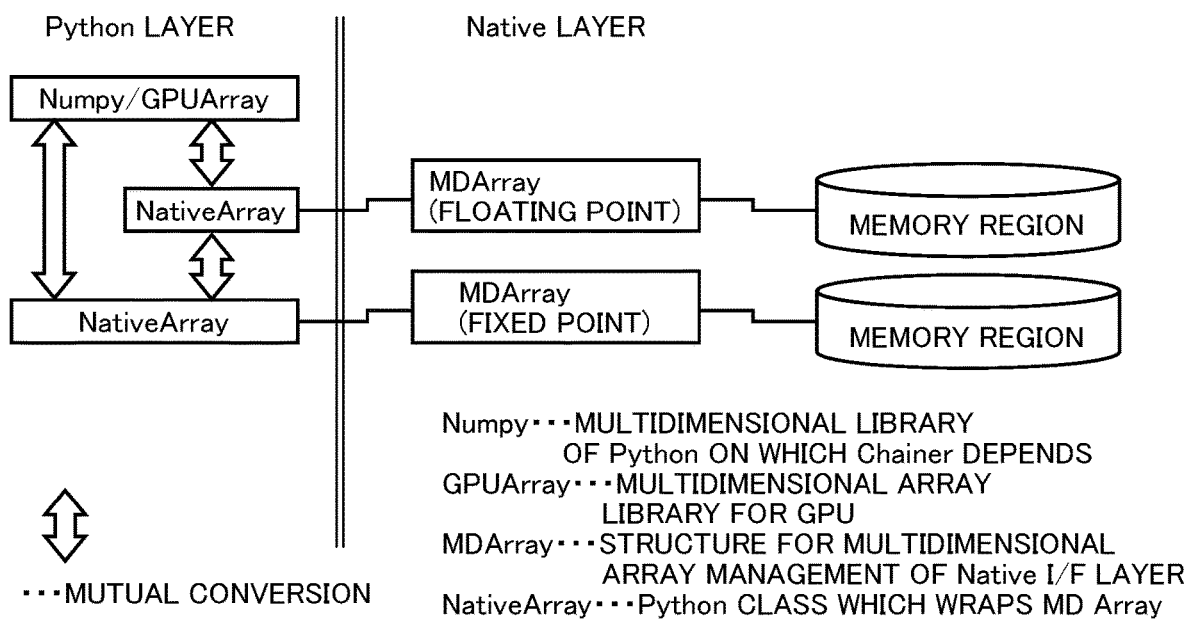
FIG. 30 illustrates a view illustrating a structure definition example of a multidimensional array module of the implementing device according to the one embodiment of the present invention.
FIG. 31 illustrates a view illustrating mutual interchangeability and a reference relationship of multidimensional array data of the multidimensional array module of the implementing device according to the one embodiment of the present invention.

An implementation example of the multidimensional array module 507 will be described. FIG. 30 illustrates a view illustrating a structure definition example of the multidimensional array module of the implementing device according to the one embodiment of the present invention. Next, a function definition example is as follows.

(Example 1) MDArray chnr_create_md_array(dimensions[ ], numaxis, type)

Consequently, it is possible to generate and initialize the multidimensional array.

(Example 2) void chnr_delete_md_array (MDArray*mdrray)

Consequently, it is possible to delete the multidimensional array.

(Example 3) void chnr_md_array_add(MDArray*dst, MDArray*a, MDArray*b)

Consequently, it is possible to add multidimensional array elements.

Next, memory management of the multidimensional array of the multidimensional array module 507 will be described.

Management (generation/discarding) of a memory region which stores a multidimensional array entity is realized by the Native layer. In a case of the built-in environment, there is also an environment employing a memory configuration which cannot be managed by a memory management mechanism (malloc/free) provided as standard equipment by a Linux (registered trademark) OS. Taking into account the role division of the software hierarchy such as the algorithm development in the Python layer and the development which is strongly conscious of hardware, it is appropriate to implement in the Native layer a management mechanism which is responsible for features of this hardware environment. When the virtual machine described below is used (when dependence on the Python layer is removed), too, it is possible to repeatedly use this memory management mechanism. A class which wraps the multidimensional array of the Native layer with the Python layer is prepared, and a timing to generate or release the memory region is matched with an instance lifetime of this Python class. This mechanism is necessary to naturally handle a multidimensional array by a code on Python. The "Define-by-Run" function also depends on a memory management mechanism of Python.

FIG. 31 illustrates mutual conversion and a reference relationship of multidimensional array data.

8-4. Memory Pool Module

The memory pool module 510 is a mechanism which repeatedly uses the memory region secured once to reduce the number of times of call for the memory management mechanism of high cost (e.g., the number of processing cycles). The function definition example is as follows.

(Example 1) void chnr_momory_pool_init (MemoryPool*momory_pool)
Consequently, it is possible to initialize the memory pool.
(Example 2) void chnr_momory_pool_release (MemoryPool*momory_pool)
Consequently, it is possible to discard the memory pool.
(Example 3) void*chnr_momory_pool_alloc_buffer (MemoryPool*momory_pool, int byte_size, void*old_addr)
Consequently, it is possible to secure the memory pool.
(Example 4) void chnr_momory_pool_free_buffer (MemoryPool*momory_pool, void*addr)
Consequently, it is possible to release the memory.

Background (1) that Native layer needs memory pool module: "Define-by-Run" of Chainer depends on the dynamic memory management mechanism of Python. FIG. 32 illustrates this example (the Forward processing of Linear Function). In this example, description of Wx=x.dot (self.W.T) in the third row newly generates an instance (multidimensional array) of Wx. At a time at which Wx is not referred from any variable, Wx is automatically discarded by the memory management mechanism of Python. A size of data (Wx in the above example) outputted by Function can be dynamically changed depending on an input data size or a parameter. The entity (memory region) is also secured in a code flow of the Forward processing or the Backward processing. To realize (define during execution of the network configuration) "Define-by-Run", it is necessary to provide a mechanism which secures a memory corresponding to a necessary size at a necessary timing.

Background (2) that Native layer needs memory pool module: By preparing the class which wraps the multidimensional array of the Native layer with the Python layer and making a device to match a lifetime of the multidimensional array of the Native layer and the Python layer, it is possible to enjoy flexibility of "Define-by-Run" and use the implementation of the Native layer. However, Function is generally called highly frequently. Therefore, every time the call is made, calling the costly memory mechanism such as malloc or free of the Native layer is likely to lower a processing speed. Hence, it is necessary to prepare a function (memory pool) of repeatedly using the memory region secured once.

Implementation example (1) of memory pool: FIG. 33 illustrates a structure definition example. A processing flow for securing the memory is as follows.

1. An index whose released flag is 1 and whose previously secured size matches a size which currently needs to be secured is searched from a Buffer_size array. When the index is found, the released flag is set to 0 and then a buffer_addr value (a memory buffer address) of the same index is returned. In this regard, the released flag is managed using, for example, a sign bit of a buffer_size array element. By searching an array element based on a combination of the previously secured size and address, it is also possible to reduce address rearrangement.

2. When the matching index is not found, a memory is actually secured (malloc is called), an address and a size of the memory are added to an array, and then the address is returned.

Implementation example (2) of memory pool: Processing during memory release searches an address which needs to be released from the buffer_addr array, and, when the address is found, sets the released flag to 1. Processing during memory pool release releases from the buffer_addr array the memory (calls a free function) for an element to which the address is set.

Effect of implementation of memory pool: Combinations of memory sizes in most of neural networks do not change per learning iteration and are fixed. Consequently, by using the above implementation example of the memory pool, it is possible to suppress call for malloc only during the first iteration.

8-6. Optimizer Module

The Optimizer module 508 is a function group which updates a weight per layer having a weight of the neural network. The Optimizer module 508 defines the following functions per weight update algorithm.

(Example 1) chnr_op_init_state_xxxx( . . . )
Consequently, it is possible to implement weight update algorithm internal state initialization processing (floating point version).
(Example 2) chnr_op_update_one_xxxx( . . . )
Consequently, it is possible to implement weight update processing (floating point version).
(Example 3) chnr_op_init_state_xxxx_fx ( . . . )
Consequently, it is possible to implement the weight update algorithm internal state initialization processing (fixed point version).
(Example 4) chnr_op_update_one_xxxx_fx ( . . . )
Consequently, it is possible to implement the weight update processing (fixed point version). In this regard, xxxx represents a name assigned per weight update algorithm. In addition, the weight update algorithm can include the algorithm described in above "2-13" in above Part 1.

8-7. Data Converter Module (1)

The data converter module 506 is a function group which converts a data format. The function definition example is as follows.

(Example 1) chnr_float_to_fixed(MDArray*dst, MDArray*src, int Q)
Consequently, it is possible to convert the floating point type into the fixed point type.

(Example 2) chnr_fixed_to_float(MDArray*dst, MDArray*src)

Consequently, it is possible to convert the fixed point type into the floating point type.

(Example 3) chnr_host_to_device(MDArray*dst, float*src_data, int src_dimensions[ ], int src_num_axis, int Q, int async, . . . )

Consequently, it is possible to convert a device non-dependent data representation (described below) into a device dependent data representation (described below).

(Example 4) chnr_device_to_host(float*dst_data, int dst_dimensions[ ], int*dst_num_axis, MDArray*src, int async, . . . )

Consequently, it is possible to convert the device dependent data representation into the device non-dependent data representation.

Effect of convention of floating point type and fixed point type: The FPU (floating point unit) is omitted and circuit design which does not use the FPU for at least large-scale parallel calculation is employed for the built-in semiconductor chip to reduce hardware resources (the number of transistors and consumption power) for the calculation amount. When the neural network executes a numerical calculation algorithm without using the FPU, a data type called a fixed point type which represents a numerical value including information equal to or less than a decimal point by using an integer arithmetic unit and a shift arithmetic unit is frequently used. In terms of that the floating type allows more intuitive handling of an actual value, the floating point type is a data type suitable for algorithm design. The fixed point type is a data type suitable for effectively using hardware resources. By preparing such an inter-data type converting function in a framework which designs and executes the neural network, it is possible to advance neural network algorithm development from a mathematical stage to an implementation stage which is conscious of hardware under standardized environment stepwise while confirming the degree of influence of type conversion in Function units.

The device non-dependent data representation refers to a data representation which does not have information which does not depend on a specific calculator. A typical implementation of this data representation is a multidimensional array in a C language format whose memory address is continuous. By using a library such as numpy in the Python layer, it is possible to easily handle this data representation. However, the data representation does not specify a library or a host language. The device dependent data representation refers to a data representation which is suitable for an optimization implementation specialized in a specific calculator. By preparing a function of mutually converting these two data representations, it is possible to perform an entire operation by cooperation of the optimization implementation which is strongly conscious of hardware and an implementation (e.g., an easy-to-read code which has a structure similar to a numerical equation described by Python) which is conscious of an algorithm.

Requirement examples which need to be considered for conversion into device dependent data representation:

(1) Memory configuration

Arrange in shared memory, or arrange in memory region unique to hardware?

(2) Memory alignment

Head address, head address of each dimension, padding (3) Byte order

Little-endian, big-endian (4) Data type

Fixed point (Q value)/floating point, and byte width (32 bits, 16 bits, 8 bits, . . . )

(5) Scheduling of data input and output by execution by a multicore (6) Data communication Communication processing in a case where a device having an optimal implementation is on another chip or another substrate 8-8. Communication Unit By applying a following change to the implementation of the function group (Native I/F) of the Native layer described so far, it is possible to communicate with the device on another chip or another substrate and execute the entire operation at a high speed.

(1) RPC(remote procedure call)

(2) Command cue (3) Reduction of data communication amount of multidimensional array (4) Asynchronous processing of transfer and calculation The following terms are defined to explain these change policies: "Host device": a device which executes the entire operation (a device which executes a code of Chainer on Python in a case of a normal implementation); "Remote device": A device which needs to perform communication processing for a reason that the device is on another chip or another substrate.

RPC (remote procedure call): There is provided a mechanism which, when the function defined by the Native I/F is called, does not directly execute processing requirement (securing of a memory or execution of an arithmetic operation), but generates information (a function type or an argument) which indicates a processing request, and transmits the information to the remote device, the remote device executes processing based on this instruction, and the host device receives this processing result. Command cue: Communication of the processing request by an RPC is not executed every time the function defined by the Native I/F is called. Instead, the information which indicates the processing request is accumulated in a cue (FIFO buffer) once to make a communication schedule efficient. Reduction of data communication amount of multidimensional array: The multidimensional array has an enormous data size, and therefore it is an important task to reduce the communication amount to improve the entire operation speed. There are roughly two following measures for reducing the communication amount.

(1) Reduce the number of times of transfer of multidimensional array (2) Reduce data communication amount of individual multidimensional array Method for reducing the number of times of transfer of multidimensional array: Data inputted and outputted between layers of intermediate layers (other than the input layer and the output layer of the neural network), and a weight gradient only need to exist in the remote device and do not need to be communicated between the devices. Furthermore, the "weight" also needs to be transferred to the remote device at a first stage of definition of a network structure, and transferred to the host device at an end of learning. The conversion function of the device non-dependent data representation and the device dependent data representation explained for the data converter module 506 are suitable to manage these transfer timings. More specifically, the following processing is performed by using each function. When the device non-dependent data representation is converted into the device dependent data representation, data is transferred from the host device to the remote device. When the device dependent data representation is converted into the device non-dependent data representation, data is transferred from the remote device to the host device.

Method for reducing data communication amount of individual multidimensional array: Various data compression algorithms are known.

(1) Lossless compression (Huffman coding, run-length compression, and etc.)

(2) Lossy compression (DCT, scalar quantization, vector quantization, and etc.)

An argument of a function (which assumes the conversion function of the device non-dependent data representation and the device dependent data representation) which requests data communication is used to designate a compression algorithm type and a parameter. Consequently, it is possible to reduce the communication amount by using an optimal data compressing unit based on consideration of a data property and accuracy requirement.

Asynchronous processing of transfer and calculation: Multiple built-in chips employ a configuration where different hardware execute data communication and arithmetic operation processing in an asynchronous manner. By preparing a function which is executed in an asynchronous manner (non-blocking) for the function (which assumes the conversion function of the device non-dependent data representation and the device dependent data representation) which requests data communication, this coding which is conscious of the hardware configuration (a method generally called pipelining) can realize a high speed operation of the entire algorithms. FIG. 34 illustrates coding of pipelining which uses a pseudocode.

8-9. Virtual Machine Module

The virtual machine module 509 is a function group which realizes a function of interpreting a bytecode and executing learning/identification processing (the Forward processing, the Backward processing and the weight update) of the neural network. The bytecode supposes a bytecode generated by a bytecode output machine of the Python layer described below. However, even a bytecode generated by another software can be interpreted and executed by the virtual machine module as long as this bytecode has a correct format. The function definition example is as follows.

(Example 1) void chnrinitwithbytecode(VMState*state, char*byte_code)

Consequently, it is possible to analyze a syntax of the bytecode and initialize the internal state of the virtual machine.

(Example 2) void chnr_forward(VMState*state)

Consequently, it is possible to execute the Forward processing.

(Example 3) void chnr_backward(VMState*state)

Consequently, it is possible to execute the Backward processing.

(Example 4) void chnr_update_weight(VMState*state)

Consequently, it is possible to execute the weight update processing.

Bytecode format example: The following information is stored in a binary format.

(1) Input/output data information

{Array dimensionality size, data type(float32, Fixed-Point)}*the number of Variables (2) Weight information {Array dimensionality size, data type(float32, Fixed-Point), instance}*the number of weights (3) Function call information during Backward processing {Function type, input/output data index, weight information index, unique parameter per Function type}*the number of Functions (4) Weight update type and parameter Furthermore, a multidimensional array index which is an input or an output of the entire processing of the neural network may be added to the bytecode. By storing this index in the bytecode, a user code which uses the virtual machine can appropriately link for function call the multidimensional array which is the input of the entire processing of the neural network and the multidimensional array which is the output.

For example, the following flow can perform this linking.

(Step 1) By calling a function prepared in the configuration of the virtual machine, the user code obtains the input multidimensional array of the entire processing.

(Step 2) The user code copies input data to the multidimensional array obtained in above step 1.

(Step 3) The user code calls a function which is prepared in the configuration of the virtual machine and executes the entire operation.

(Step 4) By calling the function prepared in the configuration of the virtual machine, the user code obtains the output multidimensional array of the entire processing (this multidimensional array is in a state where a processing result of the entire operation executed in step 3 is stored. The functions in step 3 and step 4 do not necessarily need to be separated, and may be an integrated function.).

(Step 5) The user code obtains contents of output data from the multidimensional array obtained in step 4.

Implementation example of internal state initialization processing flow of virtual machine:

(1) "Input/output data information" in the bytecode is interpreted to generate a list of multidimensional arrays inputted and outputted by Function.

(2) "Weight information" in the bytecode is interpreted to generate lists of weights and weight gradients (which are both multidimensional arrays).

(3) "Function call information during Backward" in the bytecode is interpreted to generate lists of structures (Function State) having the following information for Forward and Backward (identification IDs of functions of executing Forward processing/Backward processing, an input/output data address, a weight address, a weight gradient address, and a unique parameter per Function type).

(4) "A weight update type and a parameter" in the bytecode are interpreted to initialize a multidimensional array of the internal state of the weight update algorithm and a structure (OptimizerState) which has the following information (an address of a function of executing the weight update, a weight address, a weight gradient address, an internal state of the weight update algorithm, and a unique parameter per weight update type).

Figure 35:
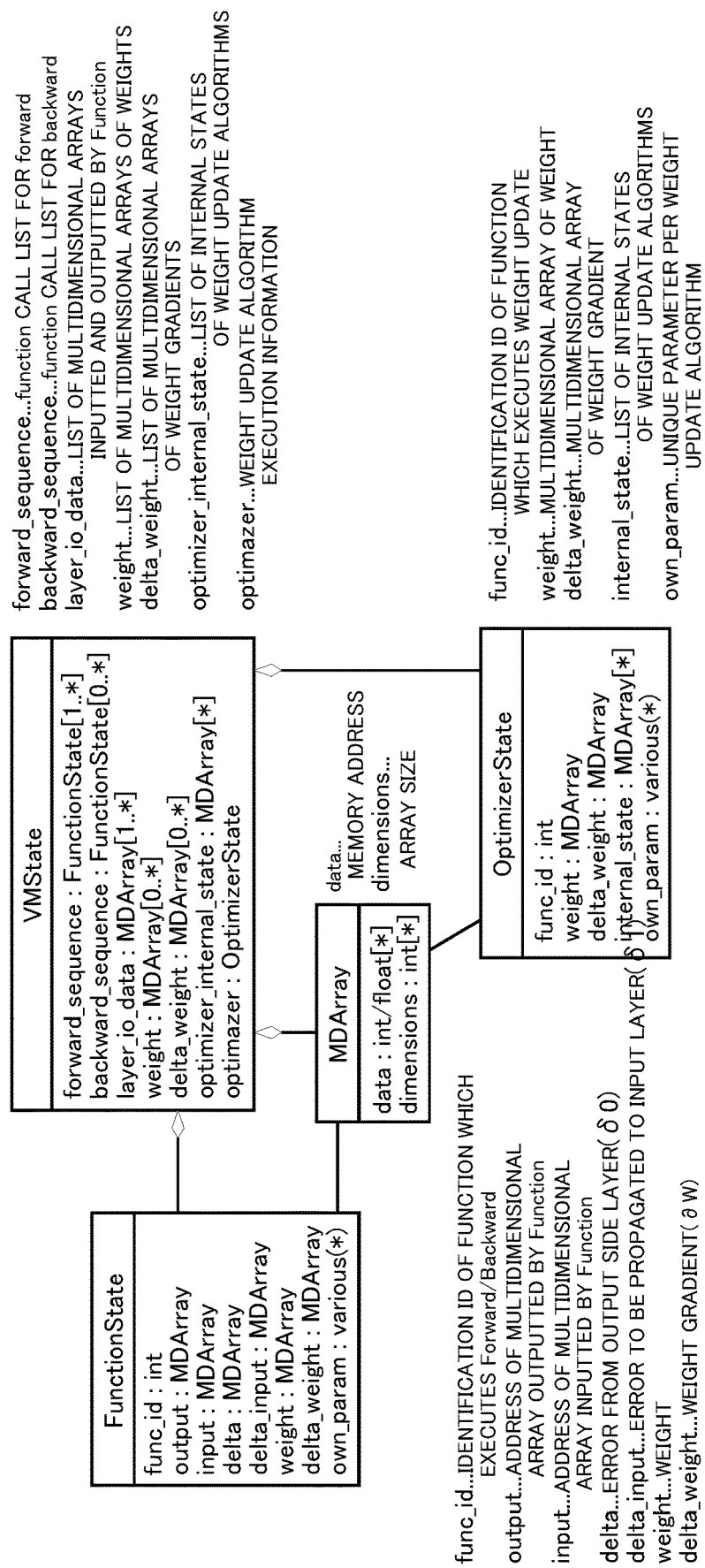
FIG. 35 illustrates a view illustrating an internal state of a virtual machine module of the implementing device according to the one embodiment of the present invention.

FIG. 35 illustrates a configuration diagram of an internal state of the virtual machine.

Execution flow example (1) of virtual machine module (Forward processing and Backward processing): The virtual machine module executes processing similar to the pseudocode illustrated in FIG. 36.

Execution flow example (2) of virtual machine (Optimizer): The virtual machine module executes processing similar to the pseudocode illustrated in FIG. 37.

Configuration 2 of optimizing device specialized in execution of Forward processing; configuration including data memory region reuse unit (1): When the entire operation is executed and only the identification processing is executed without performing learning (weight update), only the Forward processing needs to be executed. In this case, items of following data are unnecessary.

(1) Data which currently executed Function does not access among data inputted and outputted between layers (2) Weight gradient (3) Internal state of weight update algorithm During the internal state initialization of the virtual machine, it is not necessary to secure the weight gradient and the internal state of the weight update algorithm. For the data inputted and outputted between the layers, it is possible to suppress the amount of secured memory by, for example, a procedure described in the next paragraph.

Configuration 2 of optimizing device specialized in execution of Forward processing; configuration including data memory region reuse unit (2): Procedure example of internal state initialization of virtual machine module:

(1) A sum of data sizes (memory sizes) inputted and outputted per Function is calculated to select a maximum size.

(2) An address is set to repeatedly use a memory region secured as 1 during initialization of a structure (MD Array) which handles multidimensional arrays.

The address setting is made to alternately switch and use a left end and a right end of the memory region as an input and an output per layer, and prevent occurrence of copy of array data. When Function which provides an input and an output having loops is included, output data carried over to a next iteration is excluded from a reuse target described in this procedure, and a memory region is individually secured for this output data.

Figure 38:
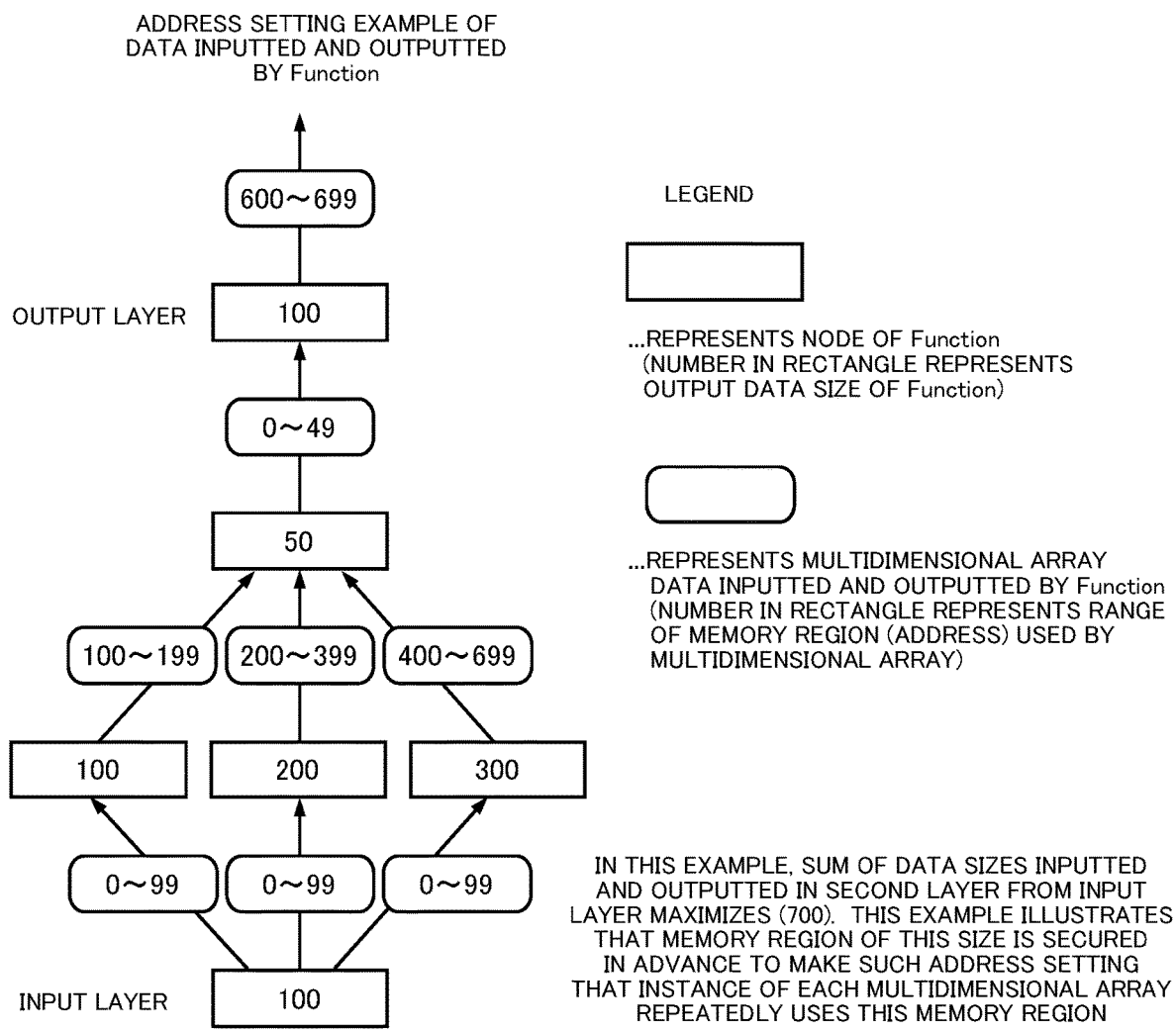
FIG. 38 illustrates a view illustrating an address setting example of the virtual machine module of the implementing device according to the one embodiment of the present invention.

Configuration 2 of optimizing device specialized in execution of Forward processing; configuration including data memory region reuse unit (3): FIG. 38 illustrates an address setting example of data inputted and outputted by Function.

Supplement Related to Bytecode Format

The above description is an example where information stored in the "Function call information during Backward processing" is simply implemented in ascending order or descending order. However, by storing a plurality of execution orders in a bytecode or repeatedly storing a branch instruction in a bytecode, it is also possible to execute higher level processing of dynamically changing a neural network configuration according to an input data property during execution of the virtual machine. The memory management mechanism described above in relation to the memory pool module can be used to realize this dynamic mechanism.

Linking of data inputted and outputted from virtual machine to external code: The "internal state initialization processing of the virtual machine" creates the list of items of data inputted and outputted between Functions. However, an external code which calls a function of the virtual machine is the simplest method for directly accessing elements of this list. By storing a variable name of the Variable instance of Python in the "input/output data information" during generation of a bytecode, it is possible to link an input and an output by using this name.

9. Python Layer

Next, the configuration related to the Python layer of the implementing device according to the embodiment illustrated in FIG. 29 will be described.

9-1. Native Array Class

The Native Array class 502 is a class which wraps the multidimensional array of the Native layer with the Python layer. The Native Array class 502 is generated as an instance associated with the multidimensional array of the Native layer on a one-to-one basis. Furthermore, the Native Array class 502 has a lifetime managing function which performs reference count as a basic function of a Python object. Furthermore, the Native Array class 502 has a function of requesting release of the multidimensional array of the Native layer at a time when the lifetime ends. Furthermore, the Native Array class 502 has a function of having a copy of type information of the multidimensional array of the Native layer and propagating another object of the Python layer of the copy. Furthermore, the Native Array class 502 has a function of data copy and addition of each array element, and has a function of requesting execution of this function to the Native layer. In addition, the Native Array class 502 additionally has a function of operating compatibly with a multidimensional array library of the Python layer such as Numpy and GPU Array on which Chainer depends.

9-2. Native Device Class

The Native Device class 501 is a class which abstracts an optimization implementation and a reference implementation of the Native layer. The Native Device class 501 has a function of requesting the following processing to the Native layer in response to a request from another object of the Python layer.

(1) Initialization and release of device (2) Generation and copy of multidimensional array (a Native Array instance of the Python layer which wraps multidimensional array is generated)

(3) Conversion between device non-dependent data representation and device dependent data representation (it is possible to instruct conversion between the floating point and the fixed point)

(4) Execution of processing of Function and Optimizer (individual functions of the Native layer are separately called)

9-3. Function Class

The Function class 503 is a class defined by pairing the Forward processing and the Backward processing. The Function class 503 is a class which exists in Chainer, and additionally has a function of requesting the Forward processing and the Backward processing to the Native layer.

Method implementation examples are as follows.

(Example 1) forward_native( . . . )

Consequently, it is possible to request the Forward processing to the Native layer.

(Example 2) backward_native( . . . )

Consequently, it is possible to request the Backward processing to the Native layer.

Processing flow assumed during call of Forward_native or backward_native (1) An output data size is calculated from an input data size or a parameter during initialization of a Function instance.

(2) The output data size calculated in (1), an input data instance (Native Array) and a Function distinction (Linear, ReLU, . . . ) are passed to a Native Device instance to request function call of the Native layer.

(3) The Native Device instance executes the following processing in response to this call.

(4) Generation of a multidimensional array of output data is requested to the Native layer. In case of Function which overwrites input data, this processing is not performed.

(B) The function of the Native layer which is actually called is determined based on an input data type (floating point or a fixed point) and a Function distinction, and is called (the function of the Native layer writes a processing result in the multidimensional array secured in A)

(C) A Native Array instance which wraps the multidimensional array secured in above (A) is generated.

(4) The Native Array instance generated in above (C) is returned as a return value of Function.

9-4. Optimizer Class

The Optimizer class 503 is a class which updates a weight. The Optimizer class 503 is a class which exists in Chainer, and additionally has a function of requesting state initialization and weight update processing to the Native layer. Method implementation examples are as follows.

(Example 1) init_state_native( . . . )

Consequently, it is possible to request the weight update algorithm internal state initialization processing to the Native layer.

(Example 2) update_one_native( . . . )

Consequently, it is possible to request the weight update processing to the Native layer. The processing flows during method call are the same as those described in above "Function class".

9-5. Specific Example of Entire Configuration of Cooperation with Native Layer

Figure 39:
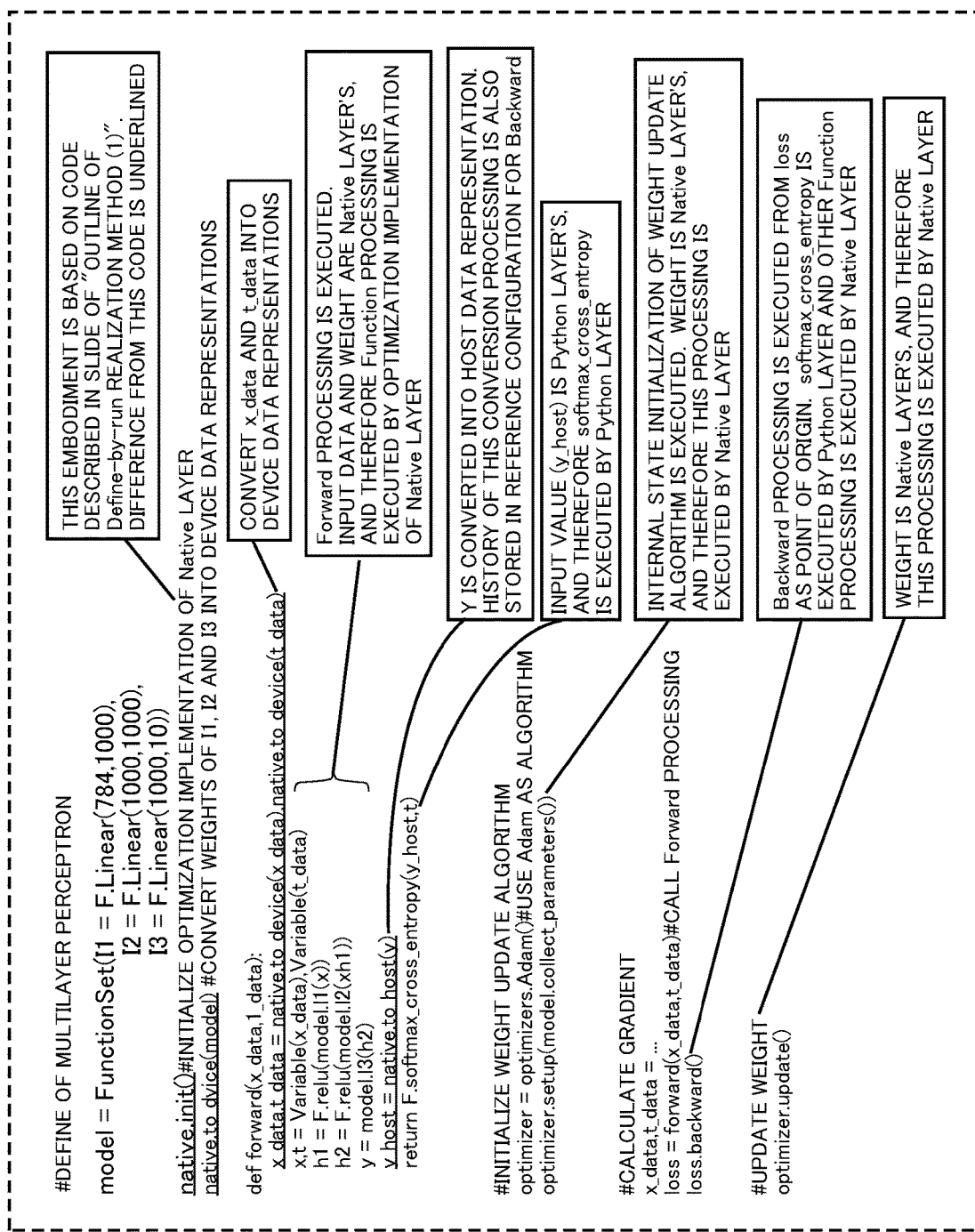
FIG. 39 illustrates a view illustrating a specific example of an entire operation performed by cooperation of a Python layer and a Native layer of the implementing device according to the one embodiment of the present invention.

FIG. 39 illustrates a specific example.

9-6. Bytecode Generating (Output) Unit

The bytecode generator 504 is a mechanism which converts the network configuration of the neural network defined by "Define-by-Run" into a bytecode (an interpretable and executable data format) and outputs the bytecode. The bytecode format is, for example, a format described above in relation to the "virtual machine module". However, in addition to this format, an output to the following formats can be considered, for example.

(1) Neural network definition format of Caffe. This format can be executed by Caffe (Caffe is one of typical frameworks which design and execute the neural network).

(2) Programming languages such as C language and Java (registered trademark). These programming languages can generate software which execute the entire operation.

(3) Hardware description languages such as HDL and Verilog. These hardware description languages can synthesize hardware which executes the entire operation.

A function definition example of the bytecode generating unit is as follows: Function name: write_network_definition (output_node, path, format). Function specification: A network configuration connected from output_node to the input side is outputted in a format designated by format to a file designated by path. output_node can be designated by the list (a plurality of nodes can be used as points of origin).

Example of procedure of outputting bytecode from reference structure for Backward processing: As described in above Part 1, Chainer has a function of generating the reference structure for the Backward processing according to description of calculation of the natural Forward processing. The Forward processing can be calculated by tracking the reference structure for the Backward processing in reverse order. Consequently, by generating a bytecode from this reference structure, it is possible to execute both processes of the Forward processing and the Backward processing. This procedure is roughly classified into the following steps.

(1) Generation of element information for creating bytecode:
Generation of input/output data information
Generation of weight information
Generation of Function call information during Backward processing (2) Conversion of element information into bytecode Procedure of generating element information for creating bytecode: The "reference structure for the Backward processing" is tracked from output_node as a point of origin passed to write_network_difinition to execute the following processing.

(1) When a current node is Variable, information of this multidimensional array (a size•dimensionality, and a floating point/fixed point (Q value)) is added to the list of the "input/output data information".

(2) When the current node is Function, the following processing is performed.

(i) Information of a weight multidimensional array (a size•dimensionality, a floating point/fixed point (Q value), and a weight instance) is added to the list of the "weight information" without permitting duplication (to share the same weight between a plurality of Function instances).

(ii) A Function type, an input/output data index, a weight index, a and unique parameter per Function type are added to a list of the "Function call information during Backward".

When a plurality of origin nodes is passed to output_node, a procedure in the next paragraph is taken to avoid overlapping registration of the same node.

Procedure of creating element information in case where a plurality of start nodes is passed:

(1) The list (empty) of the "Function call information during Backward processing" is created.

(2) The following procedure is performed per origin node in output_node.

(A) A list of the "Function call information during Backward processing" unique to the origin node is created.

(B) The registration procedure described in the previous paragraph is performed on the list created in above (A). In this case, the registration procedure is not executed with respect to nodes already registered in the list created in above (1) to avoid overlapping registration.

(C) The list created in above (A) is joined to a front of the list created in above (1).

Python layer: bytecode output machine (6). Conversion of element information into bytecode: The following information created by the procedure of "generation of element information for creating bytecode" is converted into a format designated by a format argument of write_network_difinition.

(1) Generation of input/output data information.

(2) Generation of weight information.

(3) Generation of Function call information during Backward processing. The format is, for example, a format previously exemplified in relation to the "bytecode generating unit".

Outputs of a plurality of network configurations: The write_network_definition function described above in relation to the "bytecode generating unit" employs a specification of directly writing out the network configuration to the file passed by the argument path However, it is also possible to pass to this path argument an object for writing out a plurality of network configurations to a bytecode. The network configurations described herein refer to configuration elements in (1), (2) and (3) described in "Python layer: bytecode output machine (6) conversion of element information into bytecode". This "object for writing out a plurality of network configurations to a bytecode" shares the same "(2) weight information" between "a plurality of network configurations", and reduces the weight information to be written out to the bytecode. "(1) generation of input/output data information" and "(3) generation of Function call information during Backward processing" are independently performed by the above step even when the information partially overlaps. FIG. 40 illustrates a code example where this object is used. The sixth row of this code example tracks the reference structure for the Backward processing from a node A, and outputs a network configuration. Furthermore, the seventh row tracks the reference structure for the Backward processing from a node B, and outputs a network configuration. The eighth row outputs these two network configurations to one file (./bytecode.bin).

Method for designating different Function call orders between Forward processing and Backward processing of same network: As described in above Part 1, Chainer has a function (unchain_backward method) of unchaining the reference structure for Backward traveling from a specific Variable instance as a point of origin to the input layer side. By combining this unchain_backward method and "outputs of a plurality of network configurations" described in the previous paragraph, it is also possible to designate different Function call orders to the Forward processing and Backward processing calculations of the same network. In the code example illustrated in FIG. 41, a call in #1 outputs a network definition which executes all processing from A to D. On the other hand, a call in #2 outputs a network definition which executes only processing from B to D. The Forward processing is executed with respect to the network configuration outputted in #1 during execution of the bytecode by the virtual machine, and the Backward processing is executed with respect to the network configuration in #2, i.e., the Forward processing and the Backward processing can be separately used.

10. Common Configuration of Native Layer and Python Layer 10-1. Algorithm Executing Unit which Integrates a Plurality of NN Algorithms A general neural network configuration includes a combination of Functions which frequently appear.

(Example 1) Linear→ReLU, Linear→ReLU→Linear→ReLU (Example 2) Convolution2D→ReLU, Convolution2D→ReLU Convolution2D→ReLU By defining the combination of frequently appearing Functions as one Function and making an implementation specialized in calculation of this Function both in the Python layer and the Native layer, it is possible to enjoy the following advantage in terms of both of algorithm design and hardware execution efficiency.

(1) It is possible to reduce an overhead (function call and communication) for calling Function.

(2) An implementation which considers a data dependence relationship and parallelism over a plurality of Functions can provide high execution efficiency (a cache memory is effectively used to reduce a data amount for directly accessing the main memory).

(3) Using more abstracted Function during algorithm design makes it easy to understand and define a complicated network configuration.

While calculators in recent years generally show remarkable improvement in arithmetic core speeds, a memory access performance speed is not increased so much. Therefore, there is a problem that, in terms of entire calculator performance, the performance speed is limited by a memory access, and sufficient calculation performance cannot be achieved. A solution of this problem is to use a mechanism that a special high speed memory of a small capacity called a cache memory or a register file is disposed at a location physically close to an arithmetic core, and most of calculations are performed on the cache memory to fill a gap between speeds of both of the arithmetic core and the memory.

By the way, the neural network configuration includes the following combination of frequently appearing Functions.

Convolution2D→ReLU

Convolution2D→ReLU→Convolution2D→ReLU

Convolution2D needs a large calculation amount for a data size to be inputted and outputted, and therefore provides a great chance that it is possible to effectively use the mechanism such as the cache memory and exhibit calculation core performance. By contrast with this, ReLU needs a small calculation amount for the data size to be inputted and outputted, and therefore this chance is less. When Convolution2D and ReLU are executed as individual Functions, it is necessary to write out all items of data of a processing result of Convolution2D to the main memory, then transfer contents of the data to surroundings of the arithmetic core again and calculate ReLU. The reason is that whether or not ReLU immediately uses the result after processing of Convolution2D is finished is unknown.

Therefore, by executing Convolution2D and ReLU as integrated Function, it is possible to directly use the processing result of Convolution2D as an input of processing of ReLU on the cache memory or the register file before writing out the processing result in the main memory. Consequently, it is possible to reduce a frequency of data transfer to the main memory and increase a chance of execution of more efficient (high speed) processing. When it is possible to execute more Functions such as Convolution2D→ReLU→Convolution2D→ReLU as integrated Function, it is possible to further increase a chance of processing efficiency improvement. This is because it is possible to further actively reduce the amount of access to the main memory considering a cache memory size and the data dependence relationship of the Function combination.

10-2. Configuration 1 of Optimizing Device Specialized in Execution of Forward Processing; Configuration Including Weight Optimization Processing Unit Some layer algorithms of the neural network can reduce a calculation amount and a memory usage by optimizing a weight specialized in execution of only the Forward processing without performing the Backward processing. A reason that this optimization is possible is as follows. Learning the neural network by using the stochastic gradient descent method requires high numerical accuracy and a high degree of freedom of a range of a weight vector. This is because it is necessary to accumulate updates of small values during learning and it is not possible to sufficiently assume a changing range of the weight vector in advance. By contrast with this, when only the Forward processing is executed, both of the accuracy and the degree of freedom do not need to be compatible. Consequently, by reducing the weight information amount and then executing the Forward processing, it is possible to reduce the memory and the calculation amount. The calculation amount can be reduced since it is possible to take a measure of reducing the number of weight elements and not calculating a weight of 0. For example, Linear (inter-layer inner product) processing is known to adopt a technique of performing singular value decomposition on weight information (a matrix of the number of input nodes*the number of output nodes), deleting elements of small diagonal components, thereby compressing a weight data size and reducing a calculation size. (J. Xue, J. Li, and Y. Gong. Restructuring of deep neural network acoustic models with singular value decomposition. In Interspeech, 2013). By adding to the Function class of Chainer a method for executing weight optimization processing specialized in Forward, it is possible to reduce the calculation resources for executing only the Forward processing by using the already learned weight. Similar to an existing Forward method and Backward method of the Function classes, this method has a function of concealing (separately calling a reinitialization implementation) a difference between hardware implementations (the general-purpose calculator, the GPU or the Native) depending on a weight multidimensional array type held by Function.

Supplement Related to Software/Hardware Configurations

That specific functions are subordinated to the functions and the classes of the Python layer and the Native layer has been exemplified to describe the embodiment in detail. However, the role division of these software hierarchy, classes and functions have been exemplified to specifically describe the configurations of the functions according to the embodiment of the present invention. As described in the following examples, the individual functions according to the embodiment of the present invention are also considered to be implemented in classes, hierarchies or hardware different from the above description.

(1) The processing contents described in "configuration 2 of optimizing device specialized in execution of Forward processing; configuration including data memory region reuse unit" can be executed in advance by the bytecode output machine instead of the virtual machine module.

(2) Function described in "Function obtained by combining a plurality of Functions" can be implemented in specialized hardware (an FPGA or an ASIC) instead of optimization at a software level.

Consequently, the configuration according to the embodiment of the present invention does not directly depend on the functions and the classes of the Python layer and the Native layer and an implementation which supposes software.

REFERENCE SIGNS LIST

10 LEARNING DEVICE
100 EVALUATION BOARD
110 OBTAINING UNIT
120 STORAGE UNIT
130 EXECUTING UNIT
200 BUILT-IN CHIP (BUILT-IN SEMICONDUCTOR INTEGRATED CIRCUIT)
401 DRIVING UNIT
402 FUNCTION CLASS/OPTIMIZER CLASS
405 Native LAYER EXECUTING UNIT
408 Native MULTIDIMENSIONAL ARRAY
409 Variable CLASS
504 BYTECODE GENERATING UNIT
505 DEVICE MANAGEMENT MODULE
506 DATA CONVERTER MODULE
507 MULTIDIMENSIONAL ARRAY MODULE
508 Function MODULE/Optimizer MODULE
509 VIRTUAL MACHINE MODULE
510 MEMORY POOL MODULE

The invention claimed is:

1. A neural network training system comprising:
at least one memory configured to store first code for executing a forward processing of a neural network and second code for executing a backward processing of the neural network; and
at least one processor configured to:
calculate, by executing the first code, an output value of the forward processing based on an input value,
define, by executing the first code, at least one part of a calculation procedure for the backward processing of the neural network to complete a definition of the calculation procedure, wherein the output value of the forward processing is calculated before the definition of the calculation procedure is completed,
calculate an error based on the output value of the forward processing,
execute, by executing the second code, the backward processing based on the defined calculation procedure using the error, and
update, after the execution of the backward processing, one or more parameters of the neural network.

2. The neural network training system according to claim 1, wherein
the at least one processor is configured to concurrently execute both the calculation of the output value of the forward processing and the definition of the at least one part of the calculation procedure for the backward processing by the execution of the first code.

3. The neural network training system according to claim 1, wherein
the at least one processor is configured to execute the backward processing in reverse order of the forward processing in accordance with the defined calculation procedure.

4. The neural network training system according to claim 1, wherein
the neural network is a Recurrent Neural Network.

5. The neural network training system according to claim 1, wherein
the at least one memory is further configured to store third code for executing another forward processing of the neural network, and
the at least one processor is further configured to:
select, according to the input value, execution of the first code or execution of the third code, and
define, based on a result of the selection, the calculation procedure for the backward processing of the neural network.

6. The neural network training system according to claim 1, wherein
the at least one memory is further configured to store fourth code for unchaining the calculation procedure for the backward processing, and
the at least one processor is further configured to unchain the calculation procedure from a corresponding layer as a point of origin to an input layer by executing the fourth code.

7. The neural network training system according to claim 6, wherein
the at least one processor is configured to execute the fourth code according to the input value.

8. A neural network training system comprising:
at least one memory; and
at least one processor configured to:
calculate, by executing a forward processing of a neural network using an input value, an output value,
generate, by the execution of the forward processing, at least one part of a calculation procedure for a backward processing of the neural network to complete generation of the calculation procedure, wherein the output value is calculated before the generation of the calculation procedure is completed, calculate an error based on the output value of the forward processing, execute, based on the generated calculation procedure, the backward processing of the neural network using the error, and update, after the execution of the backward processing, one or more parameters of the neural network.

9. The neural network training system according to claim 8, wherein the at least one processor is configured to concurrently execute both the generation of the at least one part of the calculation procedure and the calculation of the output value by the execution of the forward processing.

10. The neural network training system according to claim 8, wherein the neural network is a Recurrent Neural Network.

11. A method for generating a neural network using at least one memory and at least one processor, the at least one memory being configured to store first code for executing a forward processing of a neural network and second code for executing a backward processing of the neural network, the method comprising:

calculating, by the at least one processor executing the first code, an output value of the forward processing based on an input value, defining, by the at least one processor executing the first code, at least one part of a calculation procedure for the backward processing of the neural network to complete a definition of the calculation procedure, wherein the output value is calculated before the definition of the calculation procedure is completed, calculating, by the at least one processor, an error based on the output value of the forward processing, executing, by the at least one processor executing the second code, the backward processing based on the defined calculation procedure by using the error, and updating, after the execution of the backward processing, one or more parameters of the neural network.

12. The method according to claim 11, further comprising:

concurrently executing, by the at least one processor executing the first code, both the calculation of the output value and the definition of the at least one part of the calculation procedure for the backward processing.

13. The method according to claim 11, further comprising:

executing the backward processing in reverse order of the forward processing in accordance with the defined calculation procedure.

14. The method according to claim 11, further comprising:

selecting, according to the input value, execution of the first code or execution of third code for executing another forward processing of the neural network, and defining, based on a result of the selection, the calculation procedure for the backward processing of the neural network.

15. The method according to claim 11, further comprising:

unchaining, by the at least one processor executing fourth code for unchaining the calculation procedure, the calculation procedure from a corresponding layer as a point of origin to an input layer.

16. The method according to claim 15, wherein the unchaining of the calculation procedure includes unchaining the calculation procedure according to the input value.

17. A method for generating a neural network using at least one memory and at least one processor comprising:

calculating, by the at least one processor, executing a forward processing of a neural network using an input value, an output value, generating, by the at least one processor, at least one part of a calculation procedure for a backward processing of the neural network to complete generation of the calculation procedure, wherein the output value is calculated before the generation of the calculation procedure is completed, calculating, by the at least one processor, an error based on the output value of the forward processing, executing, by the at least one processor, based on the generated calculation procedure, the backward processing of the neural network by using the error, and updating, after the execution of the backward processing, one or more parameters of the neural network.

18. The method according to claim 17, further comprising:

concurrently executing, by the at least one processor, both the generation of the at least one part of the calculation procedure and the calculation of the output value by the execution of the forward processing.

19. The neural network training system according to claim 1, wherein the calculation procedure is represented by a data structure that enables the at least one processor to refer to an object based on another object.

20. The neural network training system according to claim 1, wherein the at least one memory is further configured to store third code for executing another forward processing of the neural network, and the at least one processor is further configured to:

calculate, by executing the third code, another output value of the another forward processing based on the output value, and define, by executing the third code, another part of the calculation procedure for the backward processing of the neural network to complete the definition of the calculation procedure, wherein the error is calculated based on the another output value.

21. The neural network training system according to claim 8, wherein the calculation procedure is represented by a data structure that enables the at least one processor to refer to an object based on another object.

22. The neural network training system according to claim 8, wherein the at least one processor is further configured to:

calculate, by executing another forward processing of the neural network, another output value based on the output value, and generate, by the execution of the another forward processing, another part of the calculation procedure for the backward processing of the neural network to complete the generation of the calculation procedure, wherein the error is calculated based on the another output value.

23. The method according to claim 11, wherein
the calculation procedure is represented by a data structure that enables the at least one processor to refer to an object based on another object.

24. The method according to claim 11, further comprising:
calculating, by the at least one processor executing third code for executing another forward processing of the neural network, another output value based on the output value, and
defining, by the at least one processor executing the third code, another part of the calculation procedure for the backward processing of the neural network to complete the definition of the calculation procedure,
wherein the error is calculated based on the another output value.

25. The method according to claim 17, wherein
the calculation procedure is represented by a data structure that enables the at least one processor to refer to an object based on another object.

26. The method according to claim 17, further comprising:
calculating, by the at least one processor, executing another forward processing of the neural network using the output value, another output value, and
generating, by the at least one processor, another part of the calculation procedure for the backward processing of the neural network to complete the generation of the calculation procedure,
wherein the error is calculated based on the another output value.

* * * * *